United States Patent
Li et al.

(10) Patent No.: US 10,785,753 B1
(45) Date of Patent: Sep. 22, 2020

(54) METHOD AND APPARATUS OF HANDLING DEVICE-TO-DEVICE FEEDBACK TRANSMISSION IN A WIRELESS COMMUNICATION SYSTEM

(71) Applicant: ASUSTek Computer Inc., Taipei (TW)

(72) Inventors: Ming-Che Li, Taipei (TW); Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/815,451

(22) Filed: Mar. 11, 2020

Related U.S. Application Data

(60) Provisional application No. 62/821,731, filed on Mar. 21, 2019.

(51) Int. Cl.
*H04L 12/28* (2006.01)
*H04W 72/02* (2009.01)
(Continued)

(52) U.S. Cl.
CPC ........... *H04W 72/02* (2013.01); *H04L 1/0027* (2013.01); *H04L 5/0082* (2013.01); *H04W 92/18* (2013.01)

(58) Field of Classification Search
CPC ........ H04W 4/46; H04W 92/18; H04W 76/14
(Continued)

(56) References Cited

U.S. PATENT DOCUMENTS

2018/0242190 A1* 8/2018 Khoryaev ............. H04L 47/283
2019/0110325 A1   4/2019 Gulati et al.
(Continued)

FOREIGN PATENT DOCUMENTS

EP   3553985   10/2019

*Primary Examiner* — John Pezzlo
(74) *Attorney, Agent, or Firm* — Blue Capital Law Firm, P.C.

(57) ABSTRACT

A method and apparatus are disclosed from the perspective of a first device, wherein the first device is configured with a sidelink resource pool comprising a frequency region of sidelink data transmission and multiple frequency regions of sidelink feedback transmission, wherein the multiple frequency regions of sidelink feedback transmission in one TTI (Transmission Time Interval) are separately associated with the one frequency region of sidelink data transmission in multiple TTIs, and wherein the multiple frequency regions of sidelink feedback transmission in the one TTI are non-overlapped with each other in frequency domain and fully overlapped in time domain. In one embodiment, the method includes the first device receiving a sidelink data transmission from a second device within the frequency region of sidelink data transmission in a first TTI. The method further includes the first device generating a feedback information associated with the sidelink data transmission. The method also includes the first device determining or deriving a sidelink feedback resource within one frequency region of sidelink feedback transmission among the multiple frequency regions of sidelink feedback transmission, wherein the one frequency region of sidelink feedback transmission is determined or derived based on association with the first TTI. In addition, the method includes the first device performing a sidelink feedback transmission for delivering the feedback information to the second device on the sidelink feedback resource.

23 Claims, 32 Drawing Sheets

(51) Int. Cl.
 _H04L 1/00_  (2006.01)
 _H04L 5/00_  (2006.01)
 _H04J 1/16_  (2006.01)
 _H04W 92/18_  (2009.01)

(58) Field of Classification Search
 USPC .............. 370/252, 278, 329, 386, 430, 442
 See application file for complete search history.

(56) References Cited

U.S. PATENT DOCUMENTS

2019/0253198 A1\* 8/2019 Baldemair ............ H04W 72/14
2020/0113015 A1\* 4/2020 Basu Mallick ....... H04W 76/16

\* cited by examiner

| PUCCH format | Length in OFDM symbols $N_{symb}^{PUCCH}$ | Number of bits |
|---|---|---|
| 0 | 1 – 2 | ≤2 |
| 1 | 4 – 14 | ≤2 |
| 2 | 1 – 2 | >2 |
| 3 | 4 – 14 | >2 |
| 4 | 4 – 14 | >2 |

METHOD AND APPARATUS OF HANDLING DEVICE-TO-DEVICE FEEDBACK TRANSMISSION IN A WIRELESS COMMUNICATION SYSTEM

CROSS-REFERENCE TO RELATED APPLICATIONS

The present Application claims the benefit of U.S. Provisional Patent Application Ser. No. 62/821,731 filed on Mar. 21, 2019, the entire disclosure of which is incorporated herein in its entirety by reference.

FIELD

This disclosure generally relates to wireless communication networks, and more particularly, to a method and apparatus of handling device-to-device feedback transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first device, wherein the first device is configured with a sidelink resource pool comprising a frequency region of sidelink data transmission and multiple frequency regions of sidelink feedback transmission, wherein the multiple frequency regions of sidelink feedback transmission in one TTI (Transmission Time Interval) are separately associated with the one frequency region of sidelink data transmission in multiple TTIs, and wherein the multiple frequency regions of sidelink feedback transmission in the one TTI are non-overlapped with each other in frequency domain and fully overlapped in time domain. In one embodiment, the method includes the first device receiving a sidelink data transmission from a second device within the frequency region of sidelink data transmission in a first TTI. The method further includes the first device generating a feedback information associated with the sidelink data transmission. The method also includes the first device determining or deriving a sidelink feedback resource within one frequency region of sidelink feedback transmission among the multiple frequency regions of sidelink feedback transmission, wherein the one frequency region of sidelink feedback transmission is determined or derived based on association with the first TTI. In addition, the method includes the first device performing a sidelink feedback transmission for delivering the feedback information to the second device on the sidelink feedback resource.

BRIEF DESCRIPTION OF THE DRAWINGS

FIG. 5 is a reproduction of Table 6.3.2.1-1 of 3GPP TS 38.211 V15.1.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.213 V15.3.0, "E-UTRA; Physical layer procedures (Release 15)"; TS 36.212 V15.2.1, "E-UTRA; Physical layer; Multiplexing and channel coding (Release 15)"; TS 36.211 V15.2.0, "E-UTRA; Physical layer; Physical channels and modulation (Release 15)"; TS 36.214 V15.1.0, "E-UTRA); Physical layer; Measurements (Release 15)"; TS 38.211 V15.4.0 (2018-12), "NR; Physical channels and modulation (Release 15)"; TS 38.213 V15.4.0 (2018-12), "NR; Physical layer procedures for control (Release 15)"; RP-182111, "Revised SID: Study on NR V2X", LG Electronics; R1-1810051, "Final Report of 3GPP TSG RAN WG1 #94 v1.0.0 (Gothenburg, Sweden, 20-24 Aug. 2018); R1-1812101, "Final Report of 3GPP TSG RAN WG1 #94bis v1.0.0 (Chengdu, China, 8-12 Oct. 2018)"; R1-1901482, "Final Report of 3GPP TSG RAN WG1 #95 v0.1.0 (Spokane, USA, 12-16 Nov. 2018)"; R1-1901483, "Final Report of 3GPP TSG RAN WG1 # AH_1901 v1.0.0 (Taipei, Taiwan, 21-25 Jan. 2019)"; Draft Report of 3GPP TSG RAN WG1 #96 v0.1.0 (Athens, Greece, 25 Feb.-1 Mar. 2019); R1-1901052, "Considerations on sidelink HARQ procedure", Samsung; R1-1901683, "Physical layer procedure for NR sidelink", vivo; R1-1901931, "Discussion on physical layer procedure for NR V2X", LG Electronics; R1-1901993, "Discussion on physical layer procedures in NR V2X", CATT; R1-1903769, "Feature lead summary #3 for agenda item 7.2.4.1.1 Physical layer structure", LG Electronics; R1-1903597, "Feature lead summary #2 for agenda item 7.2.4.1.2 Physical layer procedures", LG Electronics; and 3GPP TS 38.331 V15.4.0 (2018-12), "NR; Radio Resource Control (RRC) protocol specification (Release 15)". The standards and documents listed above are hereby expressly incorporated by reference in their entirety.

Figure 1:
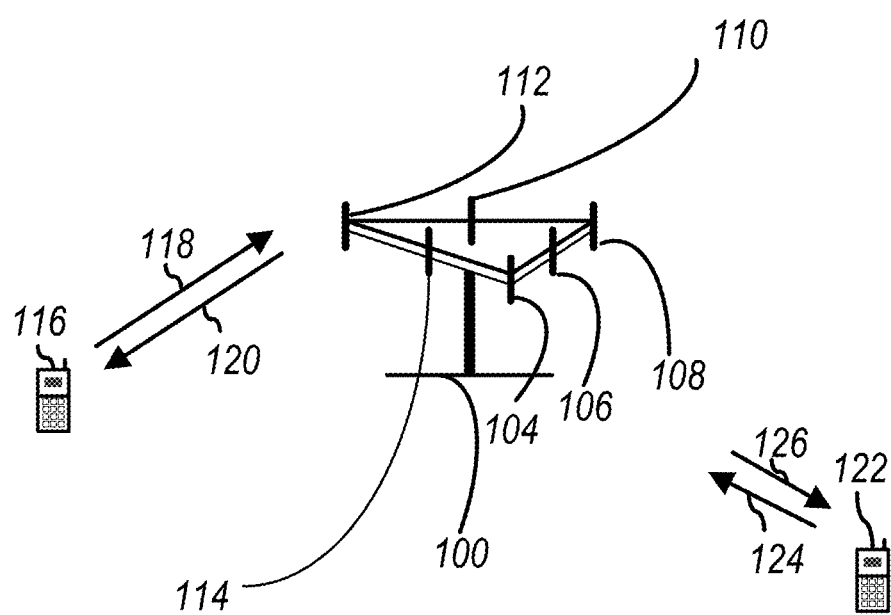
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
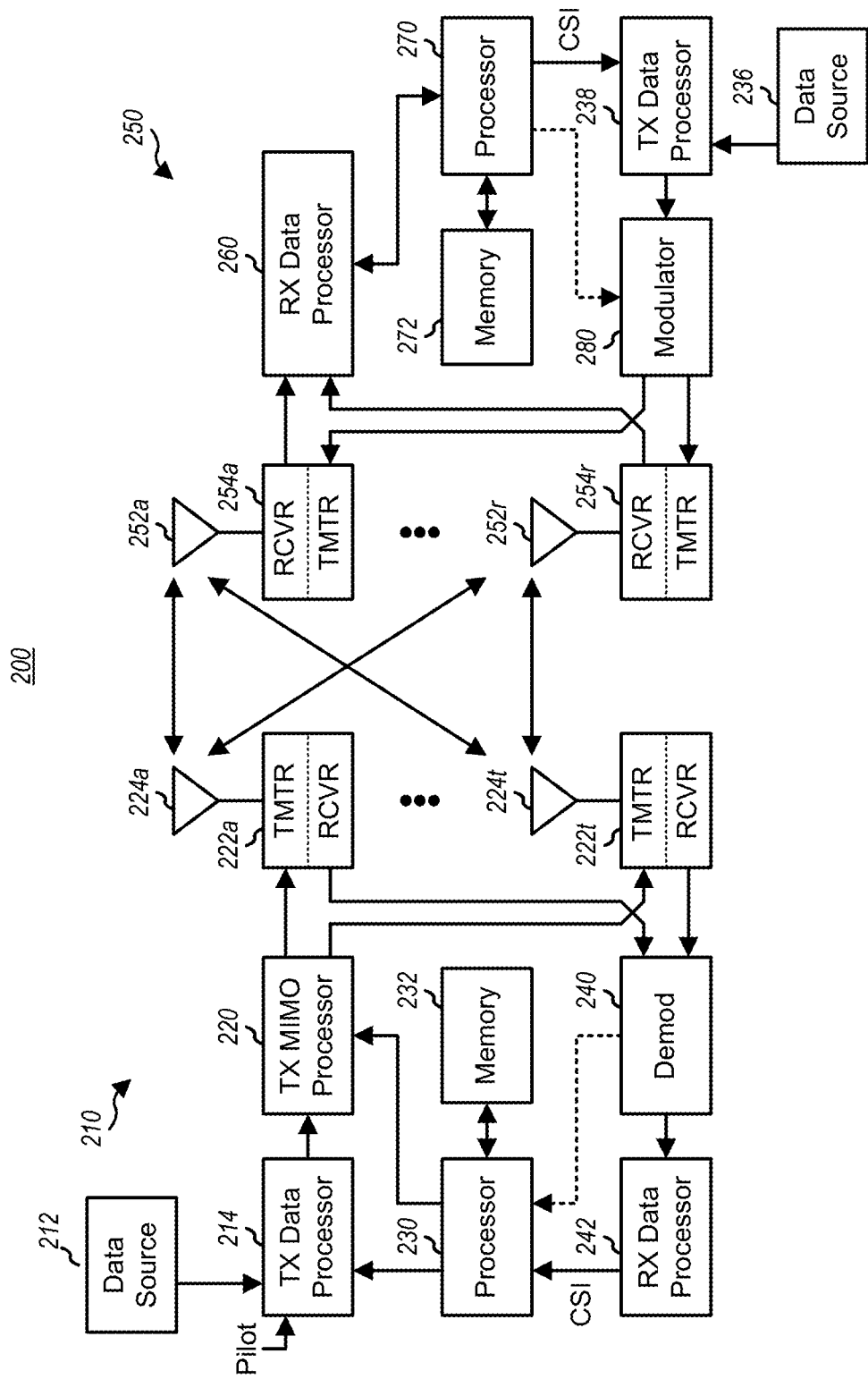
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
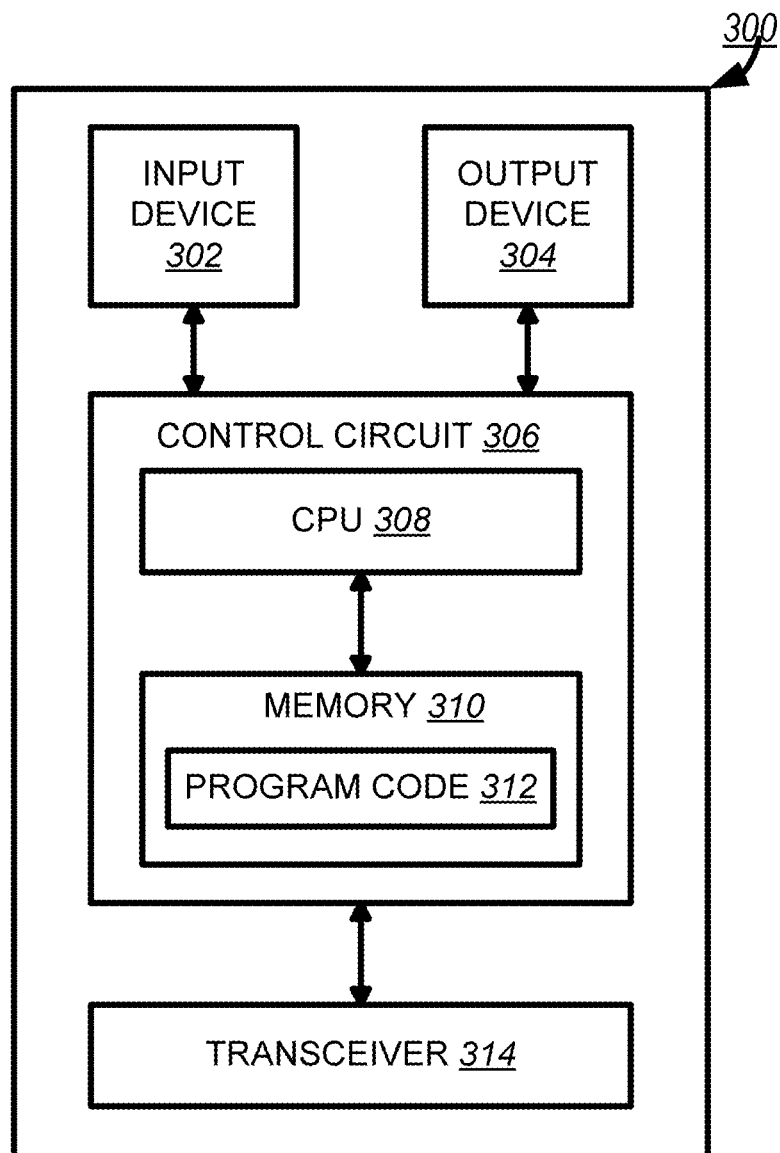
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
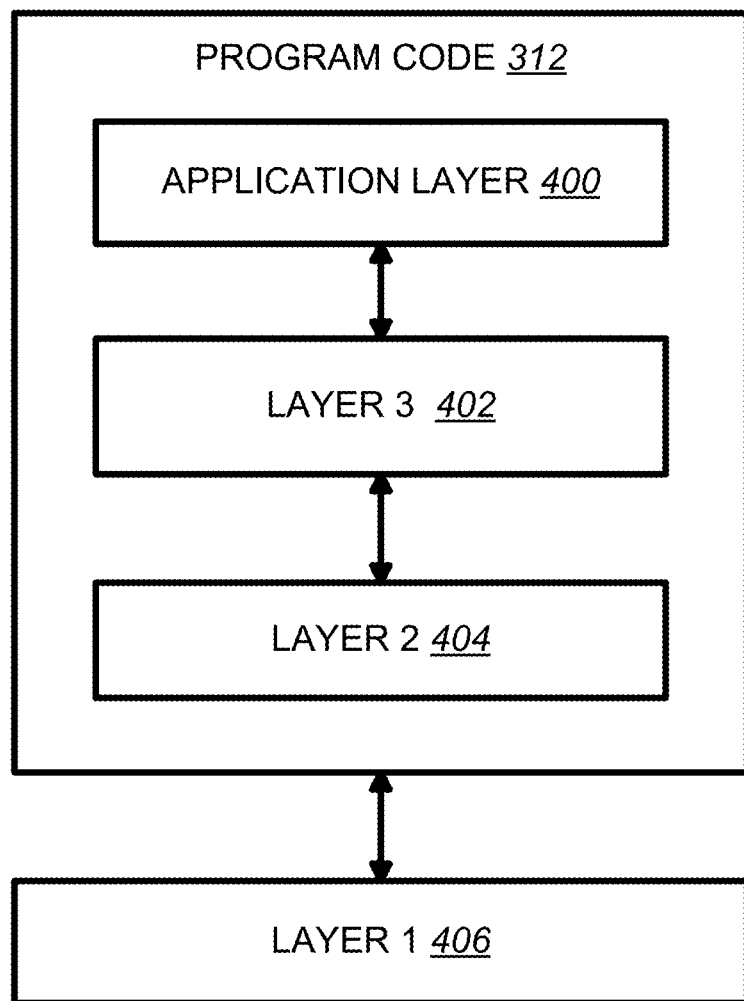
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.213 specifies the UE procedure for V2X transmission in LTE/LTE-A. The V2X transmissions are performed as sidelink transmission mode 3 or sidelink transmission mode 4 as follows:

14 UE Procedures Related to Sidelink

[ . . . ]

14.1.1 UE Procedure for Transmitting the PSSCH

[ . . . ]

If the UE transmits SCI format 1 on PSCCH according to a PSCCH resource configuration in subframe n, then for the corresponding PSSCH transmissions of one TB for sidelink transmission mode 3, the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.

for sidelink transmission mode 4, the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.

[ . . . ]

14.2 Physical Sidelink Control Channel Related Procedures

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

Table 14.2-2 of 3GPP TS 36.213 V15.3.0, Entitled "PDCCH/EPDCCH Configured by SL-V-RNTI or SL-SPS-V-RNTI", is Reproduced as FIG. 5

3GPP TS 36.214 specifies some measurements for sidelink transmission in LTE/LTE-A as follows:

| PSSCH Reference Signal Received Power (PSSCH-RSRP) |
| --- |
| Definition PSSCH Reference Signal Received Power (PSSCH-RSRP) is defined as the linear average over the power contributions (in [W]) of the resource elements that carry demodulation reference signals associated with PSSCH, within the PRBs indicated by the associated PSSCH. The reference point for the PSSCH-RSRP shall be the antenna connector of the UE. |

3GPP TS 36.212 specifies downlink control information from network node to UE, i.e. Uu link, utilized for scheduling sidelink resources as follows:

5.3.3.1.9A Format 5A

DCI format 5A is used for the scheduling of PSCCH, and also contains several SCI format 1 fields used for the scheduling of PSSCH.

The following information is transmitted by means of the DCI format 5A:

Carrier indicator—3 bits. This field is present according to the definitions in [3].

Lowest index of the subchannel allocation to the initial transmission—$\lceil \log_2(N_{subchannel}^{SL}) \rceil$ bits as defined in subclause 14.1.1.4C of [3].

SCI format 1 fields according to 5.4.3.1.2:
  Frequency resource location of initial transmission and retransmission.
  Time gap between initial transmission and retransmission.
  SL index—2 bits as defined in subclause 14.2.1 of [3] (this field is present only for cases with TDD operation with uplink-downlink configuration 0-6).

When the format 5A CRC is scrambled with SL-SPS-V-RNTI, the following fields are present:
  SL SPS configuration index—3 bits as defined in subclause 14.2.1 of [3].
  Activation/release indication—1 bit as defined in subclause 14.2.1 of [3].

3GPP TS 36.211 also specifies generation for physical sidelink shared channel and physical sidelink control channel in LTE/LTE-A. The physical sidelink shared channel and physical sidelink control channel are for communication between devices, i.e. PC5 link or device-to-device link. The physical sidelink shared channel (PSSCH) delivers data/transport block for sidelink shared channel (SL-SCH). The physical sidelink control channel (PSCCH) delivers sidelink control information (SCI).

9 Sidelink 9.1 Overview

A sidelink is used for ProSe direct communication and ProSe direct discovery between UEs.

9.1.1 Physical Channels

A sidelink physical channel corresponds to a set of resource elements carrying information originating from higher layers and is the interface defined between 3GPP TS 36.212 [3] and the present document 3GPP TS 36.211. The following sidelink physical channels are defined:
  Physical Sidelink Shared Channel, PSSCH
  Physical Sidelink Control Channel, PSCCH
  Physical Sidelink Discovery Channel, PSDCH
  Physical Sidelink Broadcast Channel, PSBCH Generation of the baseband signal representing the different physical sidelink channels is illustrated in FIG. 5.3-1.

3GPP TS 38.211 specifies generation for physical uplink control channel in NR. The UE delivers uplink control information via the PUCCH to network, i.e. from UE to gNB.

6.3.2 Physical Uplink Control Channel 6.3.2.1 General

The physical uplink control channel supports multiple formats as shown in Table 6.3.2.1-1. In case intra-slot frequency hopping is configured for PUCCH formats 1, 3, or 4 according to clause 9.2.1 of [5, T538.213], the number of symbols in the first hop is given by $\lfloor N_{symb}^{PUCCH}/2 \rfloor$ where $N_{symb}^{PUCCH}$ is the length of the PUCCH transmission in OFDM symbols.

Table 6.3.2.1-1 of 3GPP TS 38.211 V15.1.0, Entitled "PUCCH Formats", is Reproduced as FIG. 5

6.3.2.3 PUCCH Format 0

6.3.2.3.1 Sequence Generation

The sequence x(n) shall be generated according to $$x(l \cdot N_{sc}^{RB}+n)=r_{u,v}^{(\alpha,\delta)}(n)$$

$n=0,1,\ldots,N_{sc}^{RB}-1$ $l=\begin{cases}0,1 & \text{for double-symbol PUCCH transmission}\\ 0 & \text{for single-symbol PUCCH transmission}\end{cases}$ where $r_{u,v}^{(\alpha,\delta)}(n)$ is given by clause 6.3.2.2 with $m_{cs}$ depending on the information to be transmitted according to subclause 9.2 of [5, TS 38.213].

6.3.2.3.2 Mapping to Physical Resources

The sequence x(n) shall be multiplied with the amplitude scaling factor $\beta_{PUCCH,0}$ in order to conform to the transmit power specified in [5, TS 38.213] and mapped in sequence starting with x(0) to resource elements $(k,l)_{p,\mu}$ assigned for transmission according to subclause 9.2.1 of [5, TS 38.213] in increasing order of first the index k over the assigned physical resources, and then the index l on antenna port p=2000.

6.3.2.4 PUCCH Format 1

6.3.2.4.1 Sequence Modulation

The block of bits $b(0),\ldots,b(M_{bit}-1)$ shall be modulated as described in clause 5.1 using BPSK if $M_{bit}=1$ and QPSK if $M_{bit}=2$, resulting in a complex-valued symbol d(0).

The complex-valued symbol d(0) shall be multiplied with a sequence $r_{u,v}^{(\alpha,\delta)}(n)$ according to $$y(n)=d(0) \cdot r_{u,v}^{(\alpha,\delta)}(n)$$

$n=0,1,\ldots,N_{sc}^{RB}-1$ where $r_{u,v}^{(\alpha,\delta)}(n)$ is given by clause 6.3.2.2. The block of complex-valued symbols $y(0),\ldots,y(N_{sc}^{RB}-1)$ shall be block-wise spread with the orthogonal sequence $w_i(m)$ according to $$z(m'N_{sc}^{RB}N_{SF,0}^{PUCCH,1}+mN_{sc}^{RB}+n)=w_i(m) \cdot y(n)$$

$n=0,1,\ldots,N_{sc}^{RB}-1$
$m=0,1,\ldots,N_{SF,m'}^{PUCCH,1}-1$
$m'=\begin{cases}0,1 & \text{intra-slot frequency hopping enabled}\\ 0 & \text{no intra-slot frequency hopping}\end{cases}$ where $N_{SF,m'}^{PUCCH,1}$ is given by Table 6.3.2.4.1-1. Intra-slot frequency hopping shall be assumed when the higher-layer parameter intraSlotFrequencyHopping is provided, regardless of whether the frequency-hop distance is zero or not, otherwise no intra-slot frequency hopping shall be assumed.

The orthogonal sequence $w_i(m)$ is given by Table 6.3.2.4.1-2 where i is the index of the orthogonal sequence to use according to subclause 9.2.1 of [5, TS 38.213]. In case of a PUCCH transmission spanning multiple slots according to subclause 9.2.6 of [5, TS38.213], the complex-valued symbol d(0) is repeated for the subsequent slots.

[ . . . ]

6.3.2.4.2 Mapping to Physical Resources

The sequence z(n) shall be multiplied with the amplitude scaling factor $\beta_{PUCCH,1}$ in order to conform to the transmit power specified in [5, TS 38.213] and mapped in sequence starting with z(n) to resource elements $(k,l)_{p,\mu}$ which meet all of the following criteria:

they are in the resource blocks assigned for transmission according to subclause 9.2.1 of [5, TS 38.213], they are not used by the associated DM-RS The mapping to resource elements $(k,l)_{p,\mu}$ not reserved for other purposes shall be in increasing order of first the index k over the assigned physical resource block, and then the index l on antenna port p=2000.

6.3.2.5 PUCCH Format 2
6.3.2.5.1 Scrambling

The block of bits b(0), . . . , b($M_{bit}$−1), where $M_{bit}$ is the number of bits transmitted on the physical channel, shall be scrambled prior to modulation, resulting in a block of scrambled bits $\tilde{b}(0)$, . . . , $\tilde{b}(M_{bit}-1)$ according to $$\tilde{b}(i)=(b(i)+c(i)) \bmod 2$$

where the scrambling sequence $c^{(q)}(i)$ is given by clause 5.2.1. The scrambling sequence generator shall be initialized with $$c_{init}=n_{RNTI} \cdot 2^{15}+n_{ID}$$

where $n_{ID} \in \{0,1,\ldots,1023\}$ equals the higher-layer parameter dataScramblingIdentityPUSCH if configured, $n_{ID}=N_{ID}^{cell}$ otherwise and $n_{RNTI}$ is given by the C-RNTI.

6.3.2.5.2 Modulation

The block of scrambled bits $\tilde{b}(0)$, . . . , $\tilde{b}(M_{bit}-1)$ shall be modulated as described in clause 5.1 using QPSK, resulting in a block of complex-valued modulation symbols d(0), . . . , d($M_{symb}$−1) where $M_{symb}=M_{bit}/2$.

6.3.2.5.3 Mapping to Physical Resources

The block of modulation symbols d(0), . . . , d($M_{symb}$−1) shall be multiplied with the amplitude scaling factor $\beta_{PUCCH,2}$ in order to conform to the transmit power specified in [5, TS 38.213] and mapped in sequence starting with d(0) to resource elements $(k,l)_{p,\mu}$ which meet all of the following criteria:

they are in the resource blocks assigned for transmission, they are not used by the associated DM-RS.

The mapping to resource elements $(k,l)_{p,\mu}$ not reserved for other purposes shall be in increasing order of first the index k over the assigned physical resource blocks according to subclause 9.2.1 of [5, TS 38.213], and then the index l on antenna port p=2000.

3GPP TS 38.213 specifies resources of PUCCH format.

9.2 UCI Reporting in Physical Uplink Control Channel

UCI types reported in a PUCCH include HARQ-ACK information, SR, and CSI. UCI bits include HARQ-ACK information bits, if any, SR information bits, if any, and CSI bits, if any. The HARQ-ACK information bits correspond to a HARQ-ACK codebook as described in Subclause 9.1. A UE may transmit one or two PUCCHs on a serving cell in different symbols within a slot of $N_{symb}^{slot}$ symbols as defined in [4, TS 38.211]. When the UE transmits two PUCCHs in a slot, at least one of the two PUCCHs uses PUCCH format 0 or PUCCH format 2.

For the determination of the number of PRBs in Subclauses 9.2.3, 9.2.5.1 and 9.2.5.2, a UE assumes 11 CRC bits if a number of respective UCI bits is larger than or equal to 360; otherwise, the UE determines a number of CRC bits based on the number of respective UCI bits as described in [5, TS 38.212].

3GPP RP-182111 specifies the Justification and objective of study item on NR V2X.

The detailed description of each use case group is provided as below.

Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

Advanced Driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

In the RAN1 #94 meeting, RAN1 has some agreements about NR V2X as described in 3GPP R1-1810051 as follows:

Agreements:

At least PSCCH and PSSCH are defined for NR V2X. PSCCH at least carries information necessary to decode PSSCH.

Note: PSBCH will be discussed in the synchronization agenda.

Agreements:

RAN1 to continue study on multiplexing physical channels considering at least the above aspects:

Multiplexing of PSCCH and the associated PSSCH (here, the "associated" means that the PSCCH at least carries information necessary to decode the PSSCH).

Study further the following options:

Option 3: A part of PSCCH and the associated PSSCH are transmitted using overlapping time resources in non-overlapping frequency resources, but another part of the associated PSSCH and/or another part of the PSCCH are transmitted using non-overlapping time resources.

Agreements:

At least two sidelink resource allocation modes are defined for NR-V2X sidelink communication Mode 1: Base station schedules sidelink resource(s) to be used by UE for sidelink transmission(s)

Mode 2: UE determines (i.e. base station does not schedule) sidelink transmission resource(s) within sidelink resources configured by base station/network or pre-configured sidelink resources In the RAN1 #94bis meeting, RAN1 has some agreements about NR V2X as described in 3GPP R1-1812101 as follows:

Agreements:
For unicast, sidelink HARQ feedback and HARQ combining in the physical layer are supported.
For groupcast, sidelink HARQ feedback and HARQ combining in the physical layer are supported.

Agreements:
In the context of sidelink CSI, RAN1 to study further which of the following information is useful in sidelink operation when it is available at the transmitter.
Information representing the channel between the transmitter and receiver
Information representing the interference at receiver
Examples for this information are
CQI, PMI, RI, RSRP, RSRQ, pathgain/pathloss, SRI, CRI, interference condition, vehicle motion Agreements:
Sidelink control information (SCI) is defined.
SCI is transmitted in PSCCH.
SCI includes at least one SCI format which includes the information necessary to decode the corresponding PSSCH.
NDI, if defined, is a part of SCI.
Sidelink feedback control information (SFCI) is defined.
SFCI includes at least one SFCI format which includes HARQ-ACK for the corresponding PSSCH.
FFS whether a solution will use only one of "ACK," "NACK," "DTX," or use a combination of them.

Agreements:
At least resource pool is supported for NR sidelink
Resource pool is a set of time and frequency resources that can be used for sidelink transmission and/or reception.
FFS whether a resource pool consists of contiguous resources in time and/or frequency.
A resource pool is inside the RF bandwidth of the UE.
FFS how gNB and other UEs know the RF bandwidth of the UE
UE assumes a single numerology in using a resource pool.
Multiple resource pools can be configured to a single UE in a given carrier.
FFS how to use multiple resource pools when (pre-) configured.

In the RAN1 #95 meeting, RAN1 has some agreements about NR V2X as described in 3GPP R1-1901482 as follows:

Agreements:
BWP is defined for NR sidelink.
In a licensed carrier, SL BWP is defined separately from BWP for Uu from the specification perspective.
FFS the relation with Uu BWP.
The same SL BWP is used for both Tx and Rx.
Each resource pool is (pre)configured within a SL BWP.
Only one SL BWP is (pre)configured for RRC idle or out of coverage NR V2X UEs in a carrier.
For RRC connected UEs, only one SL BWP is active in a carrier. No signalling is exchanged in sidelink for activation and deactivation of SL BWP.
Working assumption: only one SL BWP is configured in a carrier for a NR V2X UE
Revisit in the next meeting if significant issues are found
Numerology is a part of SL BWP configuration.
Note: This does not intend to make restriction in designing the sidelink aspects related to SL BWP.
Note: This does not preclude the possibility where a NR V2X UE uses a Tx RF bandwidth the same as or different than the SL BWP.
Working assumption:
Regarding PSCCH/PSCCH multiplexing, at least option 3 is supported for CP-OFDM.
RAN1 assumes that transient period is not needed between symbols containing PSCCH and symbols not containing PSCCH in the supported design of option 3.

Agreements:
Physical sidelink feedback channel (PSFCH) is defined and it is supported to convey SFCI for unicast and groupcast via PSFCH.

Agreements:
When SL HARQ feedback is enabled for unicast, the following operation is supported for the non-CBG case:
Receiver UE generates HARQ-ACK if it successfully decodes the corresponding TB. It generates HARQ-NACK if it does not successfully decode the corresponding TB after decoding the associated PSCCH which targets the receiver UE.
FFS whether to support SL HARQ feedback per CBG Agreements:
It is supported to enable and disable SL HARQ feedback in unicast and groupcast.

In the RAN1 # AH_1901 meeting, RAN1 has some agreements about NR V2X as described in 3GPP R1-1901483 as follows:

Agreements:
Confirm the working assumption
Working assumption: only one SL BWP is configured in a carrier for a NR V2X UE Agreements:
Configuration for SL BWP is separated from Uu BWP configuration signalling.
UE is not expected to use different numerology in the configured SL BWP and active UL BWP in the same carrier at a given time.

Agreements:
For time domain resources of a resource pool for PSSCH,
Support the case where the resource pool consists of non-contiguous time resources
FFS details including granularity
For frequency domain resources of a resource pool for PSSCH,
Down select following options:
Option 1: The resource pool always consists of contiguous PRBs
Option 2: The resource pool can consist of non-contiguous PRBs Agreements:
Layer-1 destination ID can be explicitly included in SCI
FFS how to determine Layer-1 destination ID
FFS size of Layer-1 destination ID
The following additional information can be included in SCI
Layer-1 source ID
FFS how to determine Layer-1 source ID
FFS size of Layer-1 source ID
HARQ process ID NDI
RV
Agreements:
For determining the resource of PSFCH containing HARQ feedback, support that the time gap between PSSCH and the associated PSFCH is not signaled via PSCCH at least for modes 2(a)(c)(d) (if respectively supported)
Agreements:
(Pre-)configuration indicates whether SL HARQ feedback is enabled or disabled in unicast and/or groupcast.
  When (pre-)configuration enables SL HARQ feedback, FFS whether SL HARQ feedback is always used or there is additional condition of actually using SL HARQ feedback
Agreements:
SL open-loop power control is supported.
  For unicast, groupcast, broadcast, it is supported that the open-loop power control is based on the pathloss between TX UE and gNB (if TX UE is in-coverage). This is at least to mitigate interference to UL reception at gNB.
    Rel-14 LTE sidelink open-loop power control is the baseline.
    gNB should be able to enable/disable this power control.
  At least for unicast, it is supported that the open-loop power control is also based on the pathloss between TX UE and RX UE.
    (Pre-)configuration should be able to enable/disable this power control.
Agreements:
Long-term measurement of sidelink signal is supported at least for unicast.
  Long-term measurement here means a measurement with L3 filtering.
  This measurement is used at least for the open-loop power control.
    FFS for other purpose
Agreements:
Sub-channel based resource allocation is supported for PSSCH
Agreements:
SCI decoding applied during sensing procedure provides at least information on sidelink resources indicated by the UE transmitting the SCI
In the RAN1 #96 meeting, RAN1 has some agreements about NR V2X as described in the Draft Report of 3GPP TSG RAN WG1 #96 V0.1.0 as follows:
Agreements:
For the operation regarding PSSCH, a UE performs either transmission or reception in a slot on a carrier.
NR sidelink supports for a UE:
  A case where all the symbols in a slot are available for sidelink.
  Another case where only a subset of consecutive symbols in a slot is available for sidelink
    Note: this case is not intended to be used for the ITS spectra, if there is no forward-compatibility issue. Finalize in the WI phase whether there is such an issue or not
  The subset is NOT dynamically indicated to the UE
Agreements:
At least for sidelink HARQ feedback, NR sidelink supports at least a PSFCH format which uses last symbol(s) available for sidelink in a slot.

Agreements:
(Pre-)configuration indicates the time gap between PSFCH and the associated PSSCH for Mode 1 and Mode 2.
Agreements:
For unicast RX UEs, SL-RSRP is reported to TX UE
For sidelink open loop power control for unicast for the TX UE, TX UE derives pathloss estimation
Working assumption:
For unicast, the following CSI reporting is supported based on non-subband-based aperiodic CSI reporting mechanism assuming no more than 4-port:
  CQI
  RI
  PMI
  CSI reporting can be enabled and disabled by configuration.
    It is supported to configure a subset of the above metric for CSI reporting.
  There is no standalone RS transmission dedicated to CSI reporting in Rel-16
  NR sidelink CSI strives to reuse the CSI framework for NR Uu.
  Discuss details during WI phase
In 3GPP R1-1901052, there are some discussion about CBG-based HARQ feedback as follows:
Proposal 3: CBG-Based HARQ Feedback and Transmission Shall be Supported for Sidelink Unicast.
  In unicast, the receiver UE can feedback multiple ACK/NACK bits in the corresponding PSFCH resource for one PSSCH transmission and each bit can indicate the ACK/NACK for each CBG, similarly to the CBG-based HARQ codebook design in NR.
Proposal 4: For Unicast, the Receiver UE Shall Report Per-CBG HARQ ACK/NACK to the Transmitter UE.
  In mode 1, the UE can report the information of CBG-based ACK/NACK to the serving BS so that the BS can allocate sidelink resource for re-transmission of those failed CBGs. Regarding feedback to the BS, there are various alternatives:
    Alt1: the UE can report one bit HARQ-ACK/NACK for the CBGs contained in one sidelink TB.
    Alt2: the UE only reports the number of failed CBGs. In one example of TB with 4 CBGs, the UE can report the number of CBGs that are not decoded correctly, which would be 0/1/2/3/4, instead of reporting the ACK/NACK of each CBG. The justification for this method is the BS does not need to know which CBGs need re-transmission but it only needs to know the size of sidelink resource for re-transmission. This alt can reduce the payload size of HARQ-ACK/NACK feedback.
In 3GPP R1-1901683, there are some discussion about sidelink HARQ (Hybrid Automatic Repeat Request) procedure as follows:
3. HARQ Procedure
  Some remaining aspects for HARQ procedure are discussed in this section.
3.1 HARQ Feedback Operation
  It has been agreed that to determine the resource of PSFCH containing HARQ feedback, at least synchronous timing is supported for mode 2-a/c/d where the time gap between PSSCH and the associated PSFCH is not signaled via PSCCH, and FFS whether additional mechanism is supported. In our view, asynchronous HARQ timing, i.e.

flexible time relationship between PSSCH and the associated PSFCH, should also be supported because of the following reasons:

Firstly, it is important for NR V2X to support different types of services and different categories of UEs, including vehicle UE and pedestrian UE, according to the requirements in [2]. The processing capabilities are significantly different between vehicle and pedestrian UEs due to different architectures and power supplies. Moreover, the use cases of pedestrian UE do not require extremely low latency, which is typically important for vehicle UE considering the higher speed. For example, HARQ feedback for fully automated driving may require an extreme low latency, while feedback timing for pedestrian UE should be relaxed compared with that for vehicle UE. Consequently, the processing delay of pedestrian UE is inevitably longer than that of vehicle UE. If only a fix time gap is defined in NR, a stringent HARQ timing cannot be supported by pedestrian UE, while a relaxed HARQ timing may not meet the timing requirement for vehicle UE. Therefore, asynchronous HARQ timing is inevitably needed in NR V2X.

Figure 6:
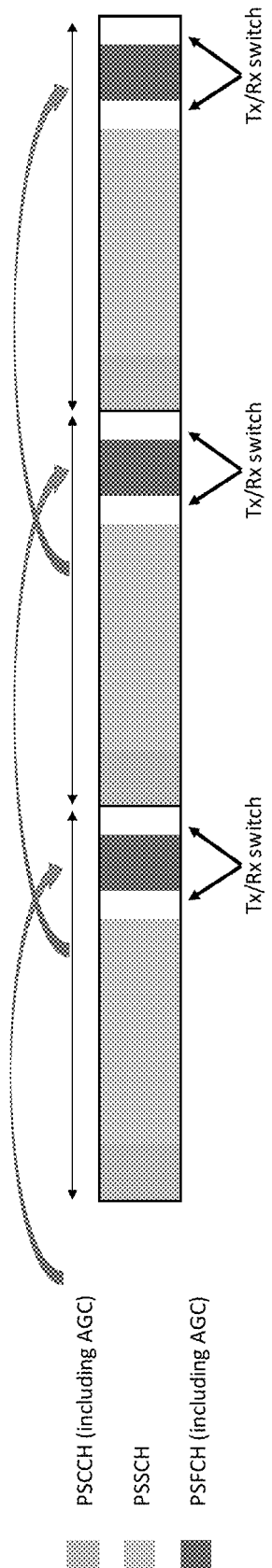
FIG. 6 is a reproduction of FIG. 1 of 3GPP R1-1901683.

FIG. 1 of 3GPP R1-1901683, Entitled
"Synchronous HARQ Timing", is Reproduced as
FIG. 6

Figure 7:
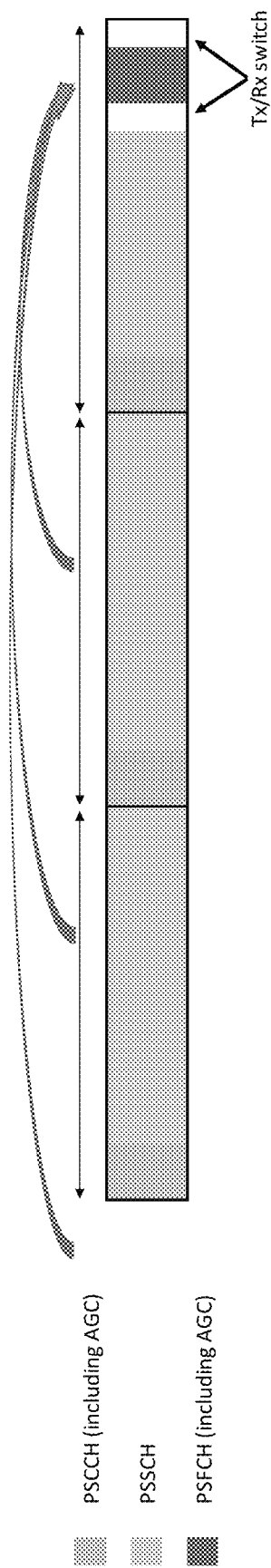
FIG. 7 is a reproduction of FIG. 2 of 3GPP R1-1901683.

FIG. 2 of 3GPP R1-1901683, Entitled
"Asynchronous HARQ Timing Supporting a Single
HARQ Feedback for Multiple PSSCHs", is
Reproduced as FIG. 7

Secondly, asynchronous HARQ timing can support multiplexing the HARQ-ACKs of multiple HARQ processes to a single PSFCH. This is beneficial to reduce the number and frequency of Rx-Tx switching of the UE, which is important to mitigate the half-duplex issue as well as to reduce the system overhead of AGC/GP symbols and the PSFCH. As the example illustrated in [FIG. 6 of the present application] and [FIG. 2 7 of the present application], by multiplexing the HARQ-ACK into a single PSFCH, the number of Tx-Rx turnaround is reduced from three to one, and the overhead due to the GP and PSFCH symbols are significantly reduced.

Finally, asynchronous HARQ timing enables better coexistence between sidelink and downlink/uplink operations, e.g. employing TDM for mitigating collision between sidelink and downlink/uplink transmissions. A fix HARQ timing in sidelink may significantly restrict the deployment flexibility in the licensed spectrum. Furthermore, asynchronous HARQ timing allows the UE to select best resource independently for PSSCH and PSFCH.

Similar to the timing, the frequency resource can be indicated by SCI in order to select a suitable resource. Noted that if HARQ-ACK multiplexing of multiple HARQ processes is supported, a fixed frequency resource for PSFCH may be problematic given that the SFCI payload size is variable.

As a result, asynchronous HARQ operation with flexible time/frequency resource is favorable.
Proposal 1: Asynchronous HARQ Feedback Operation is Supported for NR Sidelink. The Scheduling SCI Indicates the Timing and Frequency Resource for HARQ Feedback.

In 3GPP R1-1901931, there are some discussion about concept of PSFCH resource as follows:
If Mode 1 operation and Mode 2 operation shares the same resource pool, considering sensing operation of Mode 2 UE, it would be beneficial to fix the time gap between PSSCH and the associated PSFCH even for the Mode 1 UE. Furthermore, since dynamic adaptation of HARQ feedback timing will require additional SCI field, it can cause different SCI format size and increase the number of BD attempt at UE side. In those points of views, support that the time gap between PSSCH and the associated PSFCH is not signaled via PSCCH for Mode 1 as well. Meanwhile, the gap between PSSCH and PSFCH needs to consider UE's decoding capability and the latency requirement. For simplicity, it can be considered that the time gap between PSSCH and the associated PSFCH is (pre)configured per resource pool.

In a similar manner, frequency resource for PSFCH needs to be associated with the corresponding PSSCH. A simple way to implement this principle is that PSFCH uses a subset of the frequency resources associated with the corresponding PSSCH. Assuming that some sensing operation is conducted to select the PSSCH resource, this can automatically avoid resource collision for SL HARQ feedback resource. [FIG. 6 of the present application] depicts general concept that fixed slot gap between PSSCH and PSFCH TX slot is (pre)configured, and by performing sensing operation, the PSSCH resource and the associated PSFCH resource are excluded together, if it is assumed PSSCH resource is occupied by other UE. By this way, a resource collision of PSFCH can be handled by not performing independent resource allocation mechanism for PSFCH. For more specific implicit mechanism for determining the frequency resource of PSFCH in PSFCH TX slot, some parameters related to associating PSSCH can be used. For example of simple way, certain starting and/or ending frequency resource location of PSSCH is linked to a PSFCH frequency location. Regarding on the other parameters, further study is necessary.

Figure 8:
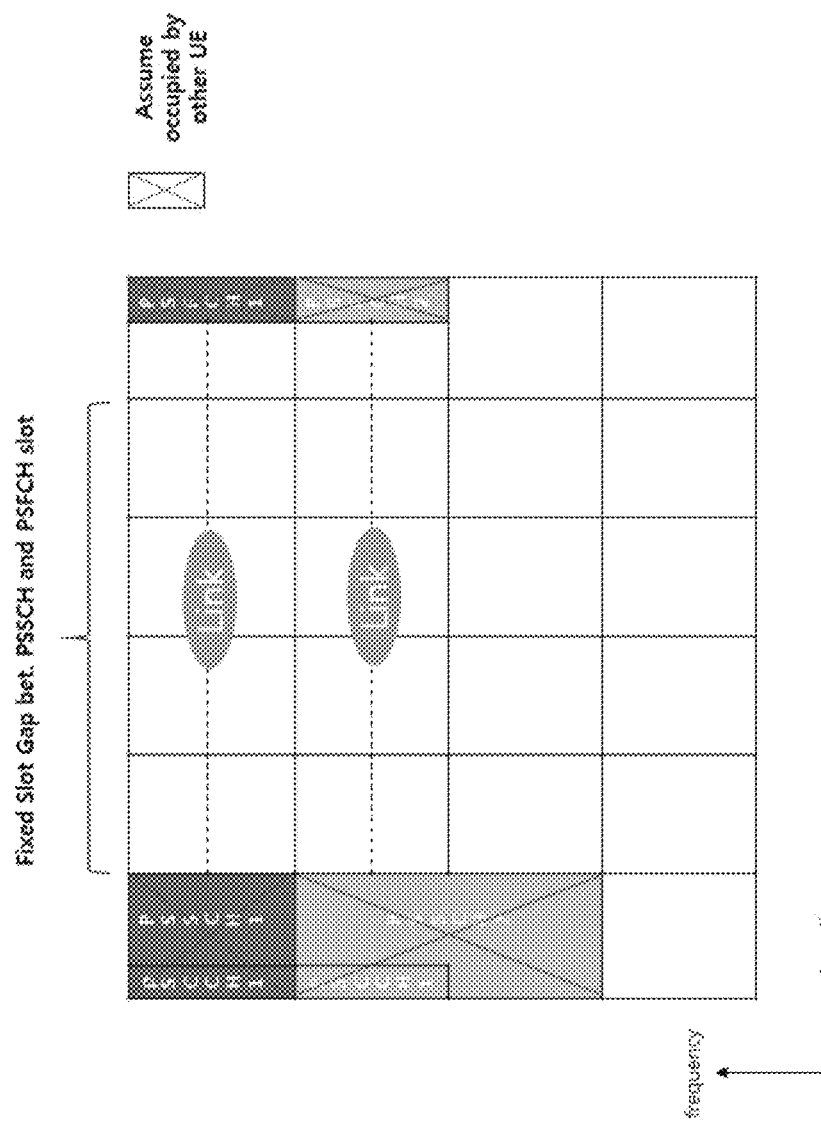
FIG. 8 is a reproduction of FIG. 3 of 3GPP R1-1901931.

FIG. 3 of 3GPP R1-1901931, Entitled "General
Concept of PSFCH Resource Excluding Process",
is Reproduced as FIG. 8

Observation 2: To Avoid the Resource Collision in SL HARQ Feedback Transmission, it could be Beneficial if the Time/Frequency Location of PSFCH is Correlated with the Corresponding PSSCH Transmission.
Proposal 2: Pool specific fixed slot gap between PSSCH TX slot and PSFCH TX slot is (pre) configured.
Proposal 3: In PSFCH TX slot, at least implicit mechanism for determining the frequency resource of PSFCH is supported by using the parameters (e.g., frequency resource location) related to the associated PSSCH.

In 3GPP R1-1901993, there are some discussion about PSFCH resource determination as follows:
For unicast, ACK/NACK based HARQ feedback is supported, and NR PUCCH Format 0 should be considered as the starting point for the design of PSFCH. ACK/NACK feedbacks use same time-frequent resource but different cyclic shifts. For groupcast, the PSFCH resource allocation has relative with the feedback type. It is suggested that common resource shall be used for group members in case of NACK-based feedback.
It was agreed that that the time gap between PSSCH and the associated PSFCH is not signaled via PSCCH at least for modes 2(a)(c)(d) (if respectively supported). How to determine the associated PSFCH resource index should be further studied. In general, there are two options for the PSFCH resource index determination.
    Option 1: Implicit indication, the PSFCH resource index is derived from the PSCCH/PSSCH resource implicitly.
    Option 2: Explicit indication, the associated PSFCH index resource is indicated by SCI explicitly.

For option 1, there is a one-to-one mapping between the PSCCH/PSSCH resource and the associated PSFCH resource index. Option 2 can provide flexible PSFCH resource selection, e.g. flexible frequency and/or codebook resource. Option 2 can also provide higher resource efficiency for PSFCH resource. However, option 2 needs additional signaling in indication of the resource sensing/selection mechanism to avoid PSFCH resource collision, which will increase the resource selection complexity.

In 3GPP R1-1903769, there are a summary of companies' views about PSCCH and feedback channel design as follows:

Proposals:
   RAN1 has studied the following proposal, and has concluded that it may be beneficial if the size of control information for groupcast and/or unicast
      can vary substantially, or
      is sufficiently larger than the size of control information for broadcast:
   For decoding a PSSCH,
   A UE receives an SCI decoded/detected by all the UEs:
      This SCI includes at least the following:
         Information necessary to receive the other SCI described below (if/when needed).
         All the information necessary to receive broadcast transmissions.
         Information used for sensing
         FFS other information
      This SCI is received based on blind detection/decoding.
      FFS if this SCI is sent in PSCCH or an RS
   The UE may receive another SCI carries the remaining information to be decoded only the target UEs.
      Receiving this SCI does not require blind detection/decoding.
      FFS if this SCI is sent in PSCCH or PSSCH
Proposed 2-stage SCI description:
   1st-stage SCI carries the information at least for sensing and broadcast communication to be decoded by any UE.
      1st-stage SCI is carried in PSCCH with the single payload size for unicast/groupcast/broadcast and the fixed resource size.
      FFS: the information to be carried.
   2nd-stage SCI carries the remaining information to be decoded only the target UEs.
      Information to decode 2nd-stage SCI is derived based on information carried in 1st-stage SCI.
      FFS: How to carry 2nd-stage SCI in physical channel, e.g., Polar coding based 2nd-stage SCI using the time/frequency resources for PSSCH.
      FFS: whether 2nd-stage SCI is present for broadcast communication
Issue 7: Feedback channel
   Issue 7-1: PSFCH format structure for HARQ feedback
Observation
   Most companies seem to support reusing sequence-based HARQ feedback as in NR PUCCH format 0/1.
   NR sidelink supports sequence-based HARQ feedback similar to NR PUCCH format 0/1 for PSFCH format structure.
   Issue 7-2: Time resource for PSFCH for HARQ feedback
Observation
   Most companies seem to support PSFCH format using the last symbol(s) in a slot for HARQ feedback. There are companies also supporting a format using all the symbols of a slot but several companies questioned its necessity.

Proposal for agreement (discussed but no consensus was reached):
   For sidelink HARQ feedback, NR sidelink supports at least a PSFCH format which uses last symbol(s) available for sidelink in a slot.

In 3GPP R1-1903597, there is a summary of companies' views about feedback channel design as follows:

Agreements:
   (Pre-)configuration indicates the time gap between PSFCH and the associated PSSCH for Mode 1 and Mode 2.
   Issue 3-2: How to determine the frequency/code resource of PSFCH? In detail, company's view and its rationale are as follows:
      The resource is indicated by SCI
         Rationale:
            Different types of services and different categories of UEs
            Consider PUCCH resource determination in NR Uu link as a baseline
            Consider multiple PSSCHs are associated with the same PSFCH slot
            Efficient resource utilization
      The resource is implicitly given by the associated PSSCH resource
         Rationale:
            Efficient collision handling
            Simple PSFCH resource allocation without sensing operation
            Save SCI overhead
   Issue 3-8: How to handle PSFCH resource in resource pool? In detail, company's view and its rationale are as follows:
      Summary of company's view/preference as follows:
         Further study is necessary on the following cases in terms of managing resource pool for PSFCH
            Option 1: Pool separation between PSFCH-enabled and -disabled pool
            Option 2: SL transmission with PSFCH and SL transmission without PSFCH are multiplexed in the same pool
         System-wise PSFCH resource management
            Rationale:
               To save resource reserved for PSFCH transmission and to mitigate half-duplex constraint
            Presence of PSFCH in a slot is signalled in the SCI associated with the corresponding data transmission
            Rationale:
               Resources reserved for PSFCH can be used for PSSCH transmission to increase resource efficiency.

One or multiple of following terminologies may be used hereafter:
   BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
   TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

NR-PDCCH: A channel could carry downlink control signal which is used to control communication between a UE and a network side. A network could transmit NR-PDCCH on configured control resource set (CORESET) to the UE.

UL-control signal: An UL-control signal may be a scheduling request(SR), a channel state information(CSI), or a HARQ-ACK/NACK for downlink transmission Slot: A slot could be a scheduling unit in NR. A slot duration has 14 OFDM symbols.

Mini-slot: A mini-slot is a scheduling unit with duration less than 14 OFDM symbols.

Slot format information (SFI): A SFI is generally information of slot format of symbols in a slot. A symbol in a slot may belong to following type: downlink, uplink, unknown or other. The slot format of a slot could at least convey transmission direction of symbols in the slot.

DL common signal: A DL common signal is a data channel carrying common information that targets for multiple UEs in a cell or all UEs in a cell. An example of DL common signal could be system information, paging, or RAR.

One or multiple of following assumptions for network side may be used hereafter:
  Downlink timing of TRPs in the same cell are synchronized.
  RRC layer of network side is in BS.

One or multiple of following assumptions for UE side may be used hereafter:
  There are at least two UE (RRC) states: connected state (or called active state) and non-connected state (or called inactive state or idle state). Inactive state may be an additional state or belong to connected state or non-connected state.

In general, for LTE/LTE-A V2X and/or P2X transmission, there are two transmission modes: one is scheduled via network, such as sidelink transmission mode 3, and the other one is sensing-based transmission, such as sidelink transmission mode 4. Since the sensing-based transmission is not scheduled via network, the UE requires performing sensing before selecting a resource for transmission, in order to avoid resource collision and interference from or in other UEs. In LTE/LTE-A Release 14, a V2X resource pool is configured with one of transmission modes. Thus, the two transmission modes are not mixed utilized in a V2X resource pool. In LTE/LTE-A Release 15, the two transmission modes can be mixed utilized in a V2X resource pool. Since LTE/LTE-A V2X and/or P2X transmission mainly support broadcast transmission, HARQ feedback for sidelink transmission is not supported. It generally means that receiver device does not report HARQ feedback associated with reception of sidelink transmission to the transmitter device.

For sidelink transmission mode 3, the network node may transmit a sidelink (SL) grant, e.g. DCI format 5A in LTE/LTE-A, on Uu interface for scheduling PSCCH (Physical Sidelink Control Channel) and/or PSSCH (Physical Sidelink Shared Channel). The V2X UE may perform PSCCH and PSSCH on PC5 interface, in response to reception of the DCI format 5A. Note that the V2X UE does not feedback HARQ-ACK associated with reception the DCI format 5A to network node. The Uu interface means the wireless interface for communication between network and UE. The PC5 interface means the wireless interface for communication between UEs.

A DCI (Downlink Control Information) format 5A may schedule one transmission occasion of PSCCH and/or PSSCH, wherein the DCI format 5A is with CRC scrambled via SL-V-RNTI. Alternatively, DCI format 5A may schedule semi-persistent periodic transmission occasions of PSCCH and/or PSSCH, wherein the DCI format 5A is with CRC scrambled via SL-SPS-V-RNTI. More specifically, the DCI format 5A with CRC scrambled via SL-SPS-V-RNTI may activate or release semi-persistent periodic transmission occasions of PSCCH and/or PSSCH. The periodicity may be configured in RRC with one of 20, 50, 100, 200, . . . , 1000 ms.

For one transmission occasion, the UE performs a PSSCH (new) transmission and/or a PSSCH (blind) retransmission for a transport block. For n transmission occasions, the UE performs n PSSCH (new) transmissions and/or n PSSCH (blind) retransmissions for n transport blocks.

In NR V2X, unicast, groupcast, and broadcast transmission are supported. At least two sidelink resource allocation modes are defined for NR-V2X sidelink communication. In Mode 1, base station or network node can schedule sidelink resource(s) to be used by UE for sidelink transmission(s). In Mode 2, UE determines (i.e. base station or network node does not schedule) sidelink transmission resource(s) within sidelink resources configured by base station/network node or pre-configured sidelink resources. Mode 3 in LTE V2X may be a start point or basis for study mode 1 in NR V2X. Mode 4 in LTE V2X may be a start point or basis for study mode 2 in NR V2X.

Since NR V2X has generally high reliability and high throughput requirement, HARQ feedback for unicast and/or groupcast are considered to be supported. It generally means that a transmitter device transmits a sidelink data transmission to a receiver device, and then the receiver device may transmit HARQ feedback to the transmitter device. If the HARQ feedback is ACK, it may mean the receiver device receives and decodes the sidelink data transmission successfully. When the transmitter device receives the HARQ feedback as ACK, the transmitter device may transmit another new sidelink data transmission to the receiver device. If the HARQ feedback is NACK, it may mean the receiver device does not receive and decode the sidelink data transmission successfully. When the transmitter device receives the HARQ feedback as NACK, the transmitter device may retransmit the sidelink data transmission to the receiver device. Since the sidelink data retransmission carries the same data packet as the sidelink data transmission, the receiver device may combine the sidelink data transmission and sidelink data retransmission and then perform decoding for the data packet. The combining can increase possibility of decoding successfully.

Currently, it is agreed to define Physical sidelink feedback channel (PSFCH) for delivering (sidelink) HARQ feedback between device and device. (Sidelink) HARQ feedback is one type of sidelink feedback control information (SFCI). When a receiver device receives a PSSCH, the receiver device may report corresponding sidelink HARQ feedback via an associated PSFCH. There will be resource association between the PSSCH and the PSFCH containing (sidelink) HARQ feedback for the PSSCH.

In time domain, the resource of PSFCH containing (sidelink) HARQ feedback and the resource of associated PSSCH are within a time gap. For Mode 1 and/or Mode 2, the time gap may be (pre-)configured (as discussed in 3GPP R1-1903597). In one embodiment, the time gap between PSFCH and the associated PSSCH may be (pre-)configured per pool or per cell.

In frequency domain, the resource association of PSFCH containing (sidelink) HARQ feedback and associated PSSCH may be fixed/configured or flexible. Fixed/configured resource association in frequency domain may mean that the PSFCH resource is determined implicitly given by the associated PSSCH resource. Flexible resource association in frequency domain may mean that the PSFCH resource is indicated explicitly by a sidelink control information scheduling the associated PSSCH resource (as discussed in 3GPP R1-1903597).

Moreover, it is also agreed that for (sidelink) HARQ feedback, NR sidelink supports at least a PSFCH format which uses last symbol(s) available for sidelink in a slot. To reduce specification effort and complexity, sequence-based HARQ feedback, such as NR PUCCH format 0/1, may be reused as PSFCH format structure for HARQ feedback (as discussed in 3GPP R1-1903769).

Note that in NR Uu interface, there are five PUCCH formats 0/1/2/3/4 for delivering uplink control information from UE to network. As shown in FIG. 5, both the PUCCH format 0 and format 1 are sequence-based structure, and both PUCCH format 0 and 1 can carry at most 2 bits and both PUCCH format 0 and 1 occupy one PRB in frequency domain (i.e. 12 subcarriers). The difference is that PUCCH format 0 occupies 1~2 OFDM symbols in time domain, and the PUCCH format 1 occupies 4~14 OFDM symbols in time domain. PUCCH format 1 supports OCC to multiplex multiple PUCCH format 1 in the same 4~14 OFDM symbols. PUCCH format 2~4 are channel-based structure. PUCCH format 2~4 can carry more than 2 bits. In frequency domain, PUCCH format 2 and 3 occupy multiple PRBs, and PUCCH format 4 occupies one PRB. In time domain, PUCCH format 2 occupies 1~2 OFDM symbols in time domain, and the PUCCH format 3 and 4 occupy 4~14 OFDM symbols in time domain.

Moreover, it is agreed that sub-channel based resource allocation is supported for PSSCH. In LTE/LTE-A, a sub-channel may comprise multiple contiguous PRBs in frequency domain. Higher layer configuration specified in 3GPP TS 36.331 can indicate the number of PRBs of each sub-channel in the corresponding resource pool, with possible number 4, 5, 6, 8, 9, 10, 12, 15, 16, 18, 20, 25, 30, 48, 50, 72, 75, 96, 100.

Figure 9:
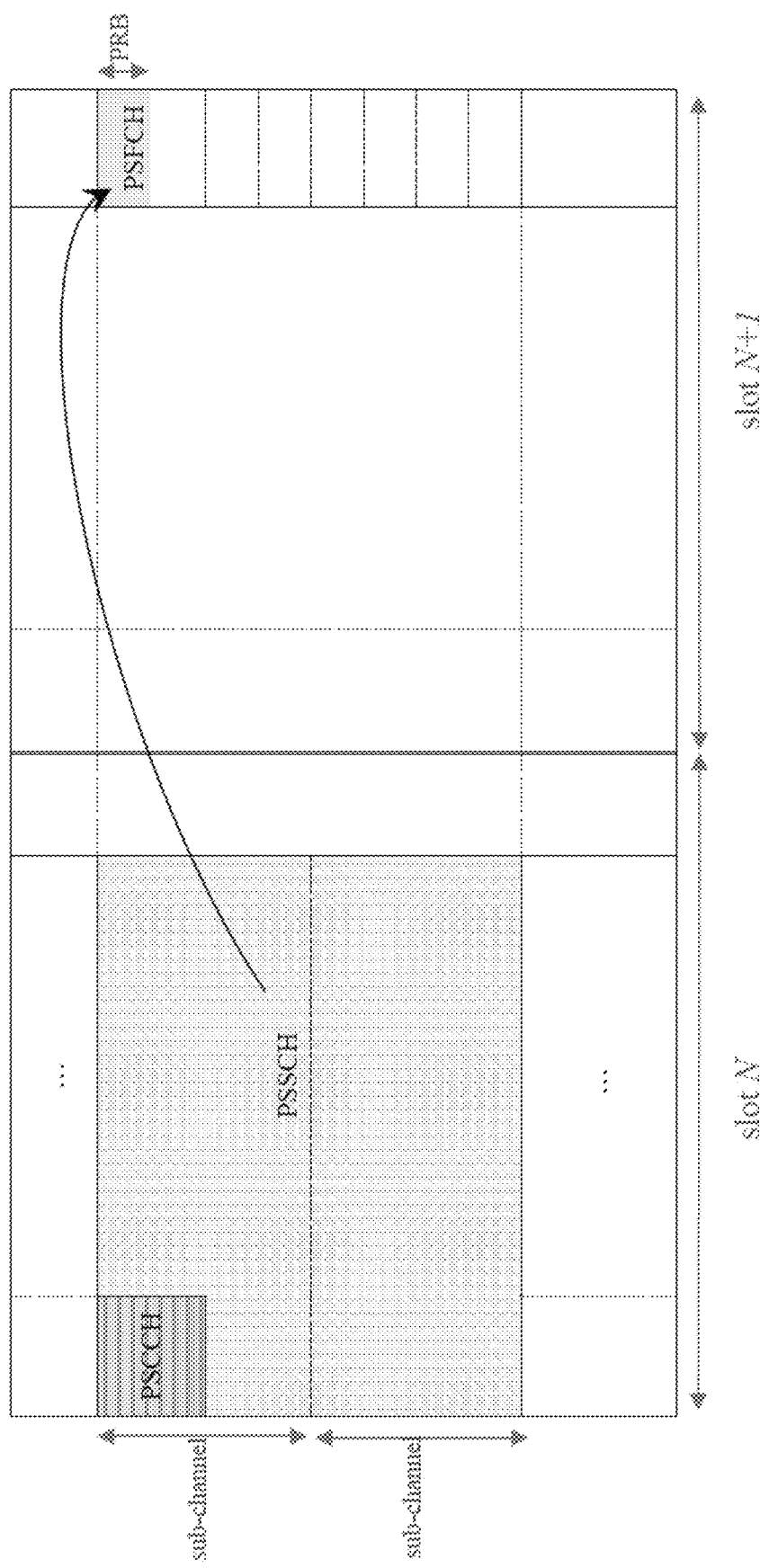
FIG. 9 illustrates an exemplary sidelink resource pool with sub-channel comprising 4 Physical Resource Blocks (PRBs) according to one exemplary embodiment.

As shown in an example illustrated in FIG. 9, a sub-channel in the sidelink resource pool comprises 4 contiguous PRBs. A transmitter device may perform PSCCH and PSSCH in two sub-channels in slot N. Assume time gap between PSSCH and associated PSFCH is 1 slot for the sidelink resource pool. The transmitter device may monitor or detect associated PSFCH in slot N+1 for receiving HARQ feedback. Note that the PSFCH resource in frequency domain is assumed to be performed within the sub-channels of associated PSSCH. Given the assumption, the PSFCH resource in frequency domain can be reserved when PSSCH resource is reserved, occupied, or scheduled by transmitter device (NR mode 2) or network (NR mode 1). Since sequence-based HARQ feedback, such as NR PUCCH format 0/1, may occupy one PRB for PSFCH transmission, there are 7 unused PRBs in the last 1~2 symbols. More specifically, there may be 7×12×1 or 7×12×2 unused resource elements in the last 1~2 symbols for PSFCH transmission. If the PSSCH comprises more sub-channels, there are more unused resource elements. Thus, resource waste is induced.

Moreover, current RAN1 sidelink discussion mainly focuses on one~two TB(s) in a PSSCH, there are 1~2 associated (sidelink) HARQ bits. Thus, PUCCH format 0/1 is quite suitable as PSFCH format structure for HARQ feedback. However, if one PSFCH is associated with multiple PSSCHs [22] or if CBG-based HARQ feedback is supported (as discussed in 3GPP R1-1901993), the receiver device may require to report more than 1~2 bits via PSFCH. One way is to design a PSFCH format for carrying more than 2 bits, for instance reusing PUCCH format 2~4. However, there may be some drawbacks: multiple PSFCH format structure design, a wrong or missed PSFCH detection leads all reception failure of HARQ feedback, no interleaving gain due to contiguous PRBs of PUCCH format 2~4, longer process time, etc.

There are methods to solve such drawbacks and resource waste to improve resource utilization efficiency.

I. Method A

The general concept of method A is that when a receiver device receives or detects a sidelink data transmission and/or sidelink control transmission, the receiver device may perform multiple sidelink feedback transmissions. The multiple sidelink feedback transmissions mean at least more than one sidelink feedback transmission. When a transmitter device performs a sidelink data transmission and/or sidelink control transmission, the transmitter device may monitor, detect, or receive multiple sidelink feedback transmissions. In other words, the multiple sidelink feedback channels can be associated with one sidelink data channel and/or sidelink control channel.

In one embodiment, the sidelink control transmission may comprise or may deliver scheduling information for the sidelink data transmission. For instance, the scheduling information may indicate which sub-channels are comprised in the sidelink data transmission.

In one embodiment, the same time gap (e.g. in units of TTI) is applied for the multiple sidelink feedback transmissions and the one sidelink data transmission. The multiple sidelink feedback transmissions may be timely in the same symbol(s) of one same TTI, e.g. last one symbol and/or second last symbol. The multiple sidelink feedback transmissions may be timely in different symbols of one same TTI, e.g. last one symbol or second last symbol.

The multiple sidelink feedback transmissions may be in separate frequency resources. In one embodiment, the multiple sidelink feedback transmissions may be in separate PRBs. The multiple sidelink feedback transmissions may be in separate resource elements. In one embodiment, the scheduling information may indicate the frequency resources for the multiple sidelink feedback transmissions. The frequency resource association between the multiple sidelink feedback transmissions and the sidelink data transmission may be fixed or (pre-) configured or specified.

In one embodiment, the multiple sidelink feedback transmissions may be interleaved or distributed in the separate frequency resources. As illustrated in the example shown in FIG. 10, there are 4 PSFCHs associated with the PSSCH, wherein the 4 PSFCHs are interleaved or distributed in the separate PRBs within (available feedback resources associated with) the sub-channels associated with the PSSCH.

In one embodiment, the interleaved or distributed pattern for the multiple sidelink feedback transmissions may be indicated via the scheduling information or may be (pre-) configured or may be specified. The starting frequency resource for the multiple sidelink feedback transmissions may be indicated via the scheduling information or may be (pre-) configured or may be specified. The frequency resource difference between two adjacent sidelink feedback transmissions may be indicated via the scheduling information or may be (pre-) configured or may be specified. The frequency resource difference between two adjacent sidelink feedback transmissions may be determined based on the number of sub-channels or PRBs comprised in the sidelink data transmission and/or indication in scheduling information. In one embodiment, the frequency resource difference between two adjacent sidelink feedback transmissions may be determined based on the number of sub-channels or PRBs comprised in the sidelink data transmission and (pre-)configuration. In one embodiment, the frequency resource difference between two adjacent sidelink feedback transmissions may be determined based on the number of sub-channels or PRBs comprised in the sidelink data transmission and specified rules.

Figure 11:
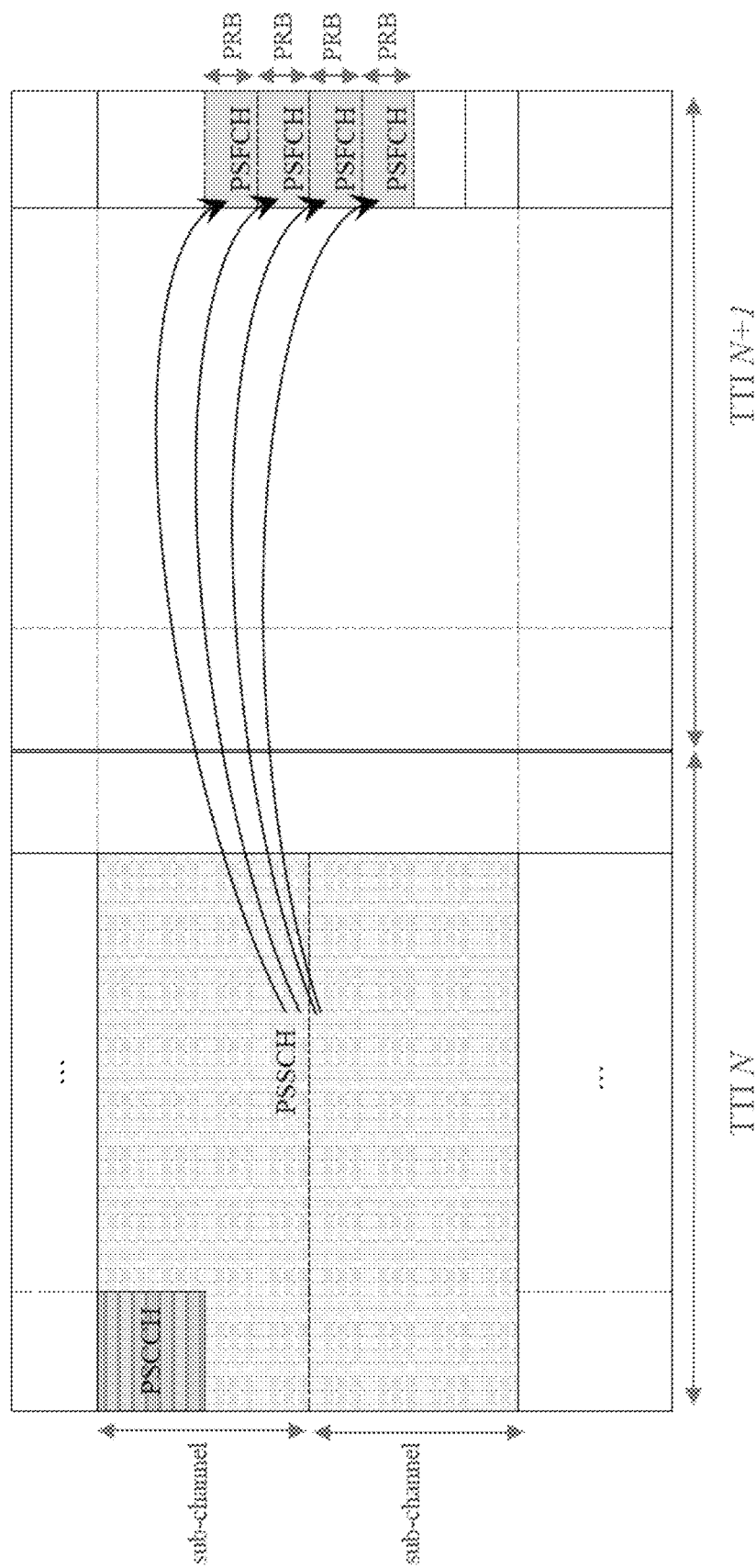
FIG. 11 illustrates an exemplary sidelink resource pool with sub-channel comprising 4 PRBs according to one exemplary embodiment.

In one embodiment, the multiple sidelink feedback transmissions may be contiguous in the separate frequency resources. As illustrated in the example shown in FIG. 11, there are 4 PSFCHs associated with the PSSCH, wherein the 4 PSFCHs are contiguous in the separate PRBs within (available feedback resources associated with) the sub-channels associated with the PSSCH. In one embodiment, the contiguous frequency resources of the multiple sidelink feedback transmissions may start from lowest index PRB within (available feedback resources associated with) the sub-channels or PRBs comprised in the sidelink data transmission. The contiguous frequency resources of the multiple sidelink feedback transmissions may start from highest index PRB within (available feedback resources associated with) the sub-channels or PRBs comprised in the sidelink data transmission.

In one embodiment, the contiguous frequency resources of the multiple sidelink feedback transmissions may be located in the center PRBs of (available feedback resources associated with) the sub-channels or PRBs comprised in the sidelink data transmission. The contiguous frequency resources of the multiple sidelink feedback transmissions may be located starting from an indicated PRB within (available feedback resources associated with) the sub-channels or PRBs comprised in the sidelink data transmission.

In one embodiment, the location of contiguous frequency resources may be indicated via the scheduling information or may be (pre-)configured or may be specified. The starting frequency resource of the contiguous frequency resources may be indicated via the scheduling information or may be (pre-)configured or may be specified.

For Method A, there are some alternatives for utilization of the multiple sidelink feedback channels or transmissions:

Alternative 1

In Alternative 1, each of the multiple sidelink feedback transmissions may comprise/deliver the same content of feedback information. In other words, the multiple sidelink feedback transmissions are transmission repetition for one sidelink feedback transmission. The transmission repetition is performed in frequency domain. In one embodiment, the transmission repetition is performed in frequency domain in the same symbol(s). Since the transmitter device may combine the multiple sidelink feedback transmissions to decode the feedback information, the first alternative can improve reliability of the sidelink feedback transmission given repetition gain and/or frequency diversity gain.

In one embodiment, the feedback information may comprise any of HARQ feedback (associated with the sidelink data and/or control transmission), channel state information and/or RSRP (Reference Signal Received Power) measurement result. The multiple sidelink feedback transmissions may comprise or may deliver the same HARQ feedback for the associated sidelink data transmission and/or sidelink control transmission. The multiple sidelink feedback transmissions may comprise or may deliver the same HARQ feedback and/or channel state information. The multiple sidelink feedback transmissions may comprise or may deliver the same HARQ feedback and/or channel state information and/or RSRP measurement result. In one embodiment, the feedback information may comprise any of assistance information, e.g. for assistance resource sensing or selection.

In one embodiment, each sidelink feedback transmission of the multiple sidelink feedback transmissions may be performed with the same channel format. Each of the multiple sidelink feedback transmissions may be performed with the same sequence-based structure. In one embodiment, the sequence-based structure may be NR PUCCH format 0 or NR PUCCH format 1. In one embodiment, each of the multiple sidelink feedback transmissions may be performed with the same channel-based structure. The channel-based structure may be NR PUCCH format 2, NR PUCCH format 3, or NR PUCCH format 4.

Each sidelink feedback transmission of the multiple sidelink feedback transmissions may be with the same frequency resource size. In one embodiment, each of the multiple sidelink feedback transmissions may be with the same PRB or Resource Element (RE) size.

Figure 10:
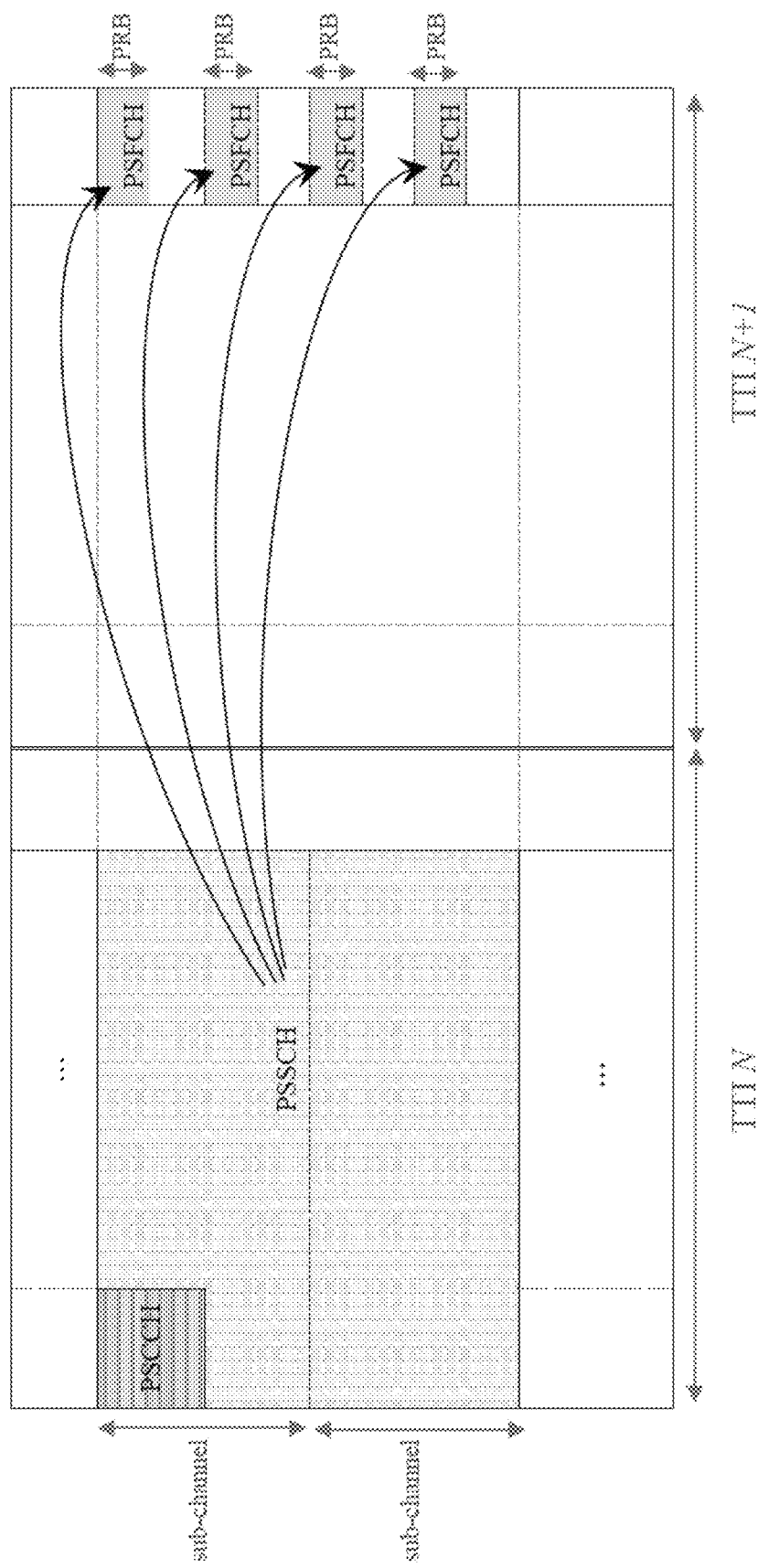
FIG. 10 illustrates an exemplary sidelink resource pool with sub-channel comprising 4 PRBs according to one exemplary embodiment.

In one example, the receiver device may receive the sidelink data transmission comprising or delivering one transport block (TB). The receiver device may generate one associated HARQ bit. If the receiver device receives the sidelink data transmission and decodes the TB successfully, the associated HARQ bit may indicate ACK. If the receiver device (receives the sidelink control transmission and) does not decode the TB successfully, the associated HARQ bit may indicate NACK. In one embodiment, the multiple sidelink feedback transmissions may comprise or may deliver the same associated HARQ bit. As shown in FIGS. 10 and/or 11, each PSFCH may comprise or may deliver the same associated HARQ bit.

In another example, the receiver device may receive the sidelink data transmission comprising/delivering two transport blocks. The receiver device may generate two associated HARQ bits, wherein one HARQ bit is associated to one TB, and the other HARQ bit is associated to the other TB. The multiple sidelink feedback transmissions may comprise or may deliver the same two associated HARQ bits. As shown in FIGS. 10 and/or 11, each PSFCH may comprise or may deliver the same two associated HARQ bits.

Alternative 2

In Alternative 2, the multiple sidelink feedback transmissions may comprise or may deliver different type of feedback information. In one embodiment, a first set of the multiple sidelink feedback transmissions may comprise or may deliver a first type of feedback information, and a second set of the multiple sidelink feedback transmissions may comprise or may deliver a second type of feedback information. In other words, the receiver device could deliver different types of feedback information via separate sidelink feedback transmissions. The receiver device may not multiplex the different types of feedback information in one sidelink feedback transmission. The second alternative can improve resource utilization efficiency to deliver more than one type of feedback information.

In one embodiment, there may be one sidelink feedback transmission in the first set. There may be more than one sidelink feedback transmission in the first set. Having more than one sidelink feedback transmission in the first set can improve reception reliability of the first type of feedback information given repetition gain and/or frequency diversity gain.

In one embodiment, there may be one sidelink feedback transmission in the second set. There may be more than one sidelink feedback transmission in the second set. Having more than one sidelink feedback transmission in the second set can improve reception reliability of the second type of feedback information given repetition gain and/or frequency diversity gain.

The number of sidelink feedback transmission(s) in the first set may be the same as the number of sidelink feedback transmission(s) in the second set. The number of sidelink feedback transmission(s) in the first set may be different from the number of sidelink feedback transmission(s) in the second set.

In one embodiment, the first type of feedback information is different from the second type of feedback information. The first type of feedback information may comprise any of HARQ feedback (associated with sidelink data and/or control transmission), channel state information, and/or RSRP measurement report. The second type of feedback information may comprise any of HARQ feedback (associated with sidelink data and/or control transmission), channel state information, and/or RSRP measurement report. The first type of feedback information may comprise any of assistance information, e.g. for assistance resource sensing or selection. The second type of feedback information may comprise any of assistance information, e.g. for assistance resource sensing or selection.

In one embodiment, the second set of the multiple sidelink feedback transmission may mean a reference signal. The reference signal may comprise the identification (such as Layer-1 ID) of the receiver device and/or the transmitter device. The second type of feedback information may mean the identification (such as Layer-1 ID) of the receiver device and/or the transmitter device. In one embodiment, there may be no the second type of feedback information comprised or delivered in the reference signal.

In one embodiment, the reference signal transmitted from the receiver device could be for the transmitter device to perform channel quality measurement and/or RSRP or PathLoss (PL) derivation. The reference signal may be transmitted in part of subcarriers/REs within the occupied PRBs. Preferably, the reference signal may be any of DMRS (Demodulation Reference Signal), CSI-RS (Channel State Information-Reference Signal), or PL RS (PathLoss Reference Signal).

In one embodiment, each sidelink feedback transmission of the first set may be performed with the same channel format. Each sidelink feedback transmission of the first set may be performed with the same sequence-based structure. In one embodiment, the sequence-based structure may be NR PUCCH format 0 or NR PUCCH format 1. Each sidelink feedback transmission of the first set may be performed with the same channel-based structure. In one embodiment, the channel-based structure may be NR PUCCH format 2, NR PUCCH format 3, or NR PUCCH format 4.

In one embodiment, each sidelink feedback transmission of the second set may be performed with the same channel format. Each sidelink feedback transmission of the second set may be performed with the same sequence-based structure. In one embodiment, the sequence-based structure may be NR PUCCH format 0 or NR PUCCH format 1. Each sidelink feedback transmission of the second set may be performed with the same channel-based structure. In one embodiment, the channel-based structure may be NR PUCCH format 2, NR PUCCH format 3, or NR PUCCH format 4.

The channel format of sidelink feedback transmission(s) in the first set may be the same as the channel format of sidelink feedback transmission(s) in the second set. The channel format of sidelink feedback transmission(s) in the first set may be different from the channel format of sidelink feedback transmission(s) in the second set.

In one embodiment, each sidelink feedback transmission of the first set may be with the same frequency resource size. Each sidelink feedback transmission of the first set may be with the same PRB or RE size. Each sidelink feedback transmission of the second set may be with the same frequency resource size. In one embodiment, each sidelink feedback transmission of the second set may be with the same PRB or RE size.

The frequency resource size of each sidelink feedback transmission(s) in the first set may be the same as the frequency resource size of each sidelink feedback transmission(s) in the second set. The frequency resource size of each sidelink feedback transmission(s) in the first set may be different from the frequency resource size of each sidelink feedback transmission(s) in the second set.

In one embodiment, if the sub-channels, PRBs, or REs comprised in the sidelink data transmission cannot accommodate (at least one) the sidelink feedback transmission of the first set and (at least one) the sidelink feedback transmission of the second set simultaneously, the receiver device may perform the sidelink feedback transmission of the first set. If the occupied, reserved, derived, or associated frequency resources for sidelink feedback transmission cannot accommodate (at least one) the sidelink feedback transmission of the first set and (at least one) the sidelink feedback transmission of the second set simultaneously, the receiver device may perform the sidelink feedback transmission of the first set. In one embodiment, the receiver device may not perform the sidelink feedback transmission of the second set. The receiver device may drop or ignore the sidelink feedback transmission of the second set. The first type of feedback information may be with higher priority than the second type of feedback information.

In one embodiment, the receiver device may not generate the second type of feedback information. The prioritization may be determined or derived based on the type of feedback information. HARQ feedback may have higher priority than channel state information report. HARQ feedback may have higher priority than RSRP measurement report.

In one embodiment, channel state information report may have higher priority than RSRP measurement report. Alternatively, the channel state information report may have lower priority than RSRP measurement report.

In one embodiment, HARQ feedback may have higher priority than assistance information. Alternatively, HARQ feedback may have lower priority than assistance information. In one embodiment, channel state information report may have higher priority than assistance information. Alternatively, channel state information report may have lower priority than assistance information.

In one embodiment, RSRP measurement report may have higher priority than assistance information. Alternatively, RSRP measurement report may have lower priority than assistance information.

Figure 12:
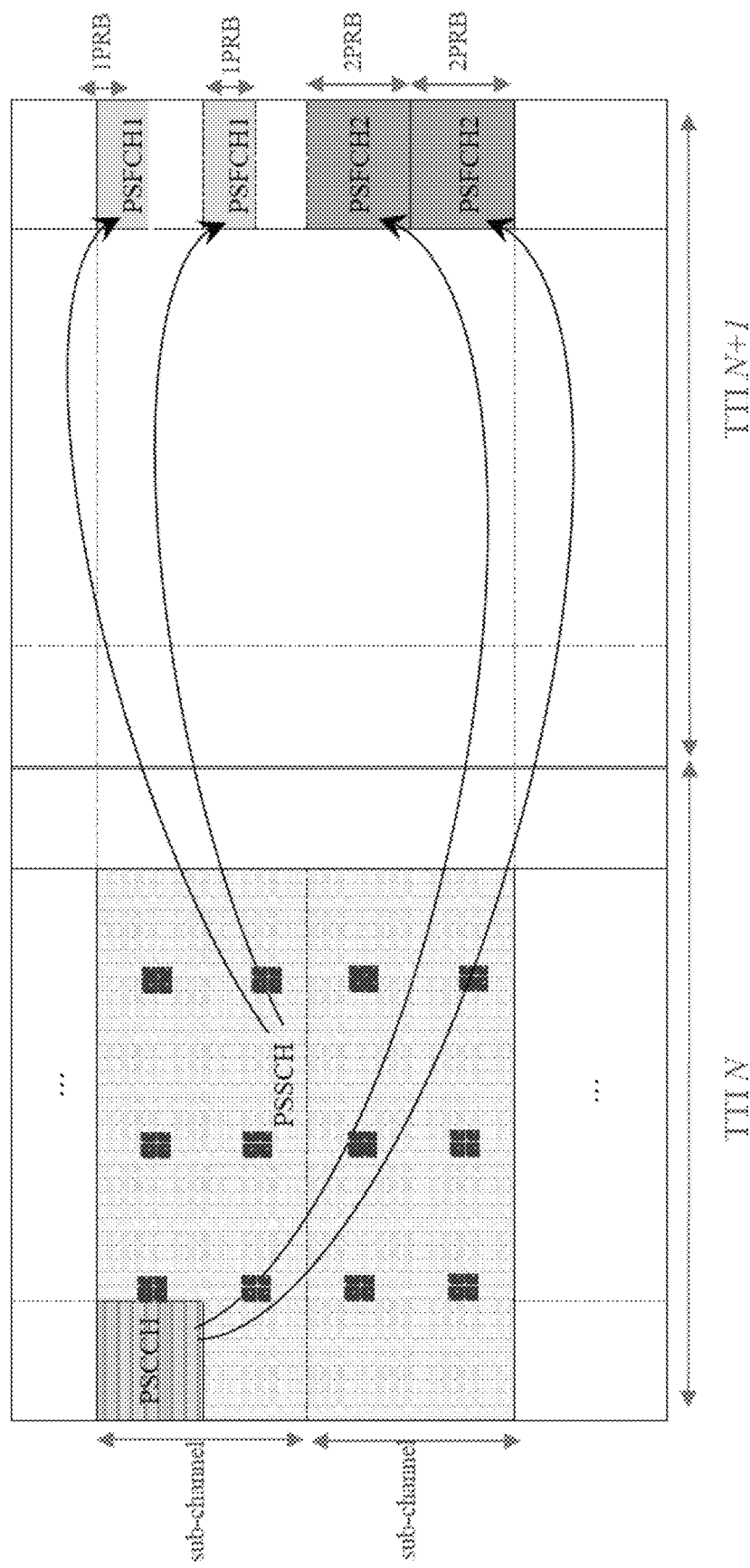
FIG. 12 illustrates an exemplary sidelink resource pool with sub-channel comprising 4 PRBs according to one exemplary embodiment.

As illustrated in an example shown in FIG. 12, the receiver device may receive the PSSCH comprising or delivering one or two transport block (TB). The receiver device may receive the PSCCH with triggering channel state information report. In one embodiment, the PSCCH may comprise the scheduling information of the PSSCH and/or an indication for the channel state information report trigger.

In one embodiment, the receiver device may generate associated HARQ bit(s) for the PSSCH. The receiver device may perform a first sidelink feedback transmission comprising or delivering the associated HARQ bit(s), i.e. PSFCH1. The receiver device may generate a channel state information report via measurement on reference signal (such as the twelve small black blocks shown in FIG. 12). The receiver device may perform a second sidelink feedback transmission comprising or delivering the channel state information report, i.e. PSFCH2. In one embodiment, PSFCH1 and PSFCH2 may be performed in the same TTI or in the same OFDM symbol. The PRB number occupied by each PSFCH1 may be different from PRB number occupied by each PSFCH2. The channel format or structure of PSFCH1 may be different from channel format or structure of PSFCH2.

Figure 13:
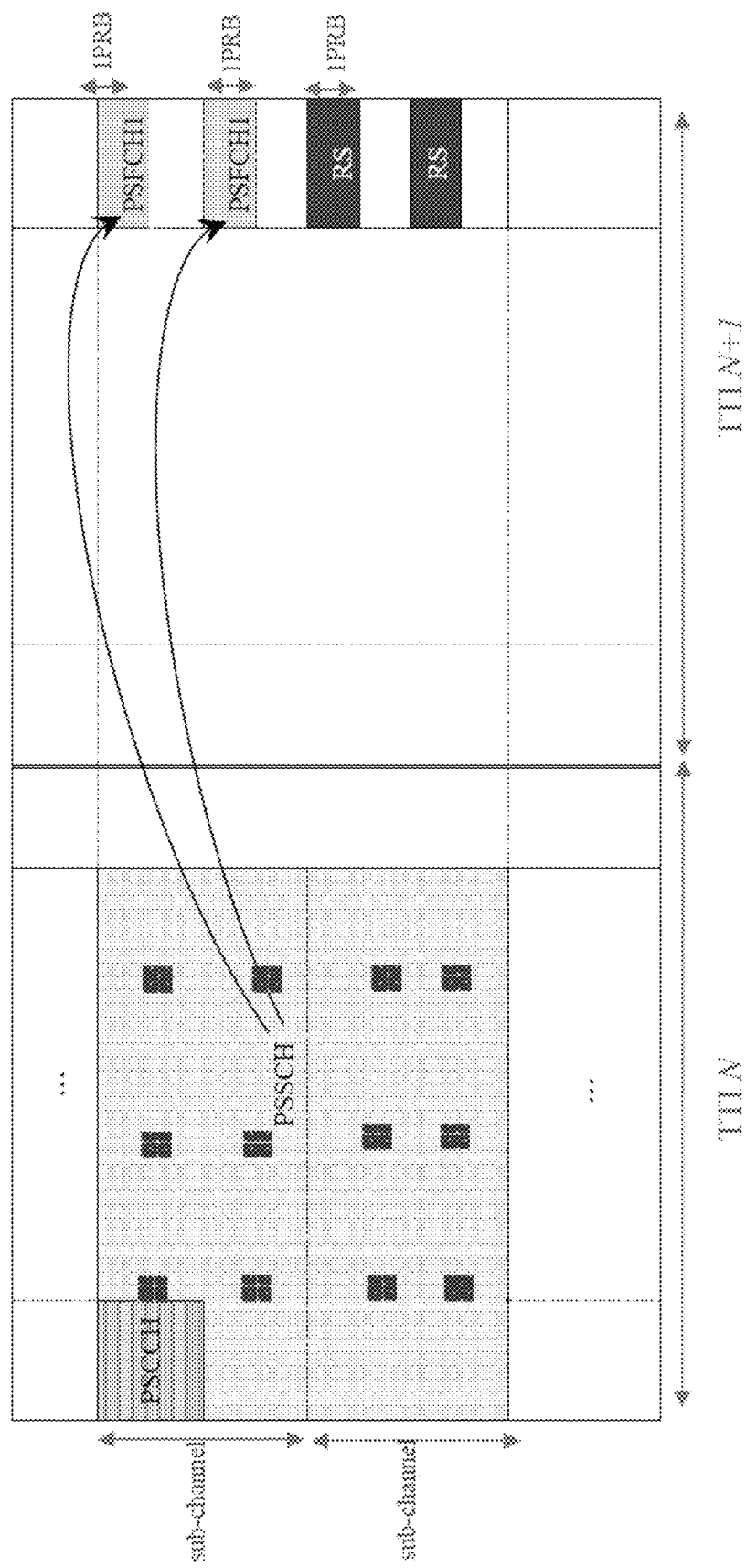
FIG. 13 illustrates an exemplary sidelink resource pool with sub-channel comprising 4 PRBs according to one exemplary embodiment.
Figure 14:
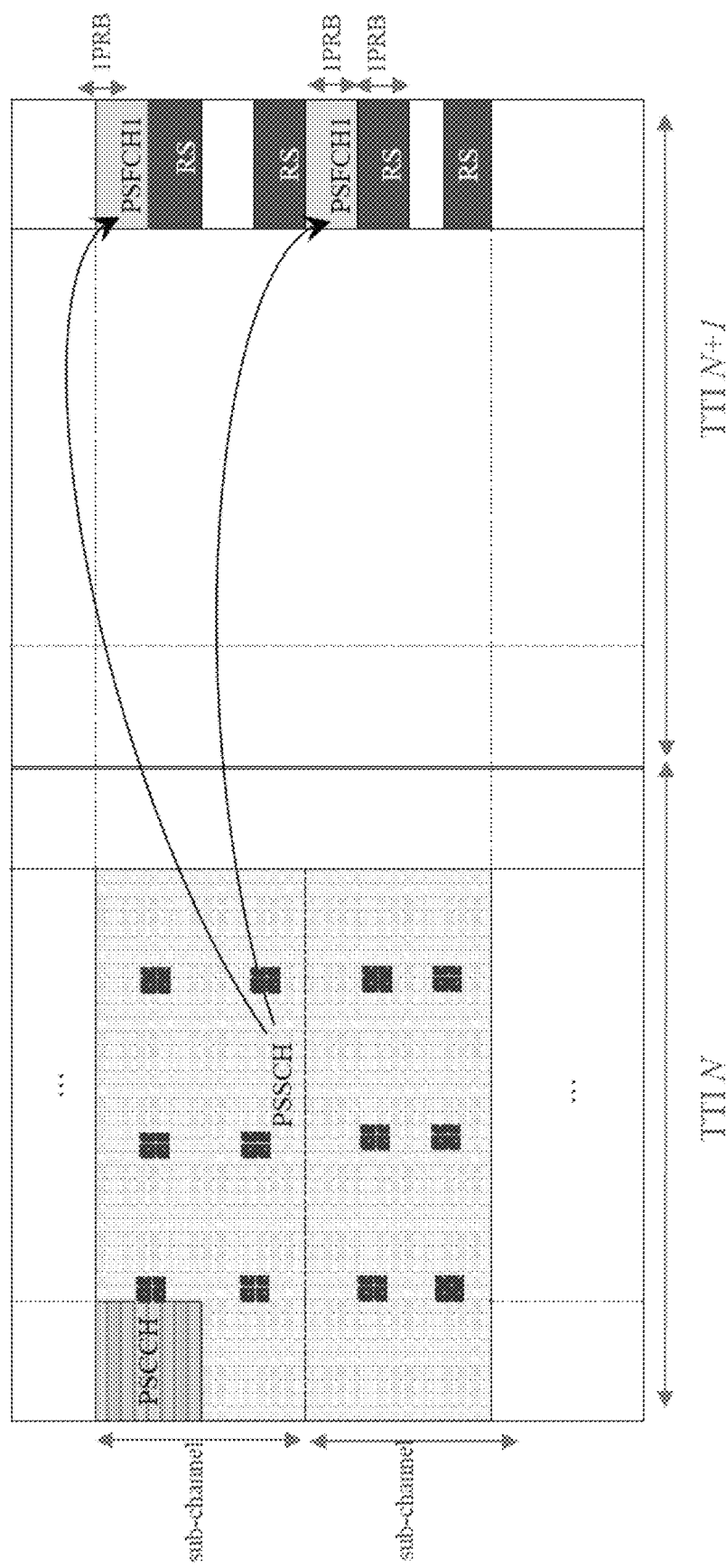
FIG. 14 illustrates an exemplary sidelink resource pool with sub-channel comprising 4 PRBs according to one exemplary embodiment.

As illustrated in examples shown in FIGS. 13 and/or 14, the receiver device may receive the PSSCH comprising or delivering one or two transport block (TB). The receiver device may generate associated HARQ bit(s) for the PSSCH. The receiver device may perform a first sidelink feedback transmission comprising or delivering the associated HARQ bit(s), i.e. PSFCH1. The receiver device may transmit reference signal, i.e. RS in FIGS. 13 and/or 14, in the same symbol(s) of the PSFCH1.

In one embodiment, the receiver device may receive the PSCCH for triggering the RS transmission. The PSCCH may comprise the scheduling information of the PSSCH and/or an indication for triggering the RS transmission. The RS may not comprise or deliver feedback information. The RS may comprise or deliver identification (such as Layer-1 ID) of the receiver device and/or the transmitter device.

In one embodiment, PSFCH1 and RS are performed by the receiver device in the same TTI. PSFCH1 and RS may be performed in the same OFDM symbol. The PRB number occupied by PSFCH1 may be different from PRB number occupied by RS. RS may be transmitted in part of subcarriers or REs within the occupied PRBs.

Alternative 3

In Alternative 3, the multiple sidelink feedback transmissions may comprise or may deliver the same type of feedback information. In one embodiment, each of the multiple sidelink feedback transmissions may comprise or deliver different parts of the same type of feedback information respectively. In other words, the receiver device can utilize one or multiple sidelink feedback transmission in response to the bit size of the type of feedback information. The larger the bit size of the type of feedback information is, the more the sidelink feedback transmissions are. The third alternative can reduce specification and design complexity for the sidelink feedback channel.

In one embodiment, the type of feedback information may be any of HARQ feedback (associated with the sidelink data and/or control transmission), channel state information, RSRP measurement result, and/or assistance information (e.g. for assistance resource sensing or selection).

In one embodiment, each sidelink feedback transmission of the multiple sidelink feedback transmissions may be performed with the same channel format. Each of the multiple sidelink feedback transmissions may be performed with the same sequence-based structure. In one embodiment, the sequence-based structure may be NR PUCCH format 0 or NR PUCCH format 1. Each of the multiple sidelink feedback transmissions may be performed with the same channel-based structure. In one embodiment, the channel-based structure may be NR PUCCH format 2, NR PUCCH format 3, or NR PUCCH format 4.

Each sidelink feedback transmission of the multiple sidelink feedback transmissions may be with the same frequency resource size. Each of the multiple sidelink feedback transmissions may be with the same PRB or RE size.

As an example, the receiver device may receive the sidelink data transmission comprising or delivering at least one transport block (TB). The receiver device may receive the sidelink control transmission with scheduling information for the sidelink data transmission. If CBG-based HARQ feedback is not configured, supported, or enabled, the receiver device may generate one associated HARQ bit and deliver the one associated HARQ bit via one PSFCH transmission. The one PSFCH transmission may be performed with sequence-based structure. If CBG-based HARQ feedback is configured, supported, or enabled, the receiver device may generate one number of associated HARQ bits for the transport block. Each bit of the number of associated HARQ bits may be associated with one CBG group of the transport block, wherein the transport block comprises multiple CBs. The number may be configured or indicated via the scheduling information. The receiver device may deliver the number of associated HARQ bits via multiple PSFCH transmissions.

In one embodiment, there may be a mapping between each of the multiple PSFCH transmissions and each bit of the number of associated HARQ bits. There may be a mapping between each of the multiple PSFCH transmissions and each CBG group of the transport block. As illustrated in the examples shown in FIGS. 10 and/or 11, when the number of associated HARQ bits may be 4, each PSFCH may comprise or deliver (respectively) 1 HARQ bit of the number of associated HARQ bits. The first HARQ bit may be comprised or delivered via the first one PSFCH, the second HARQ bit may be comprised or delivered via the second one PSFCH, the third HARQ bit may be comprised or delivered via the third one PSFCH, and the last HARQ bit may be comprised or delivered via the last one PSFCH. When the number of associated HARQ bits may be 8, each PSFCH may comprise or may deliver (respectively) 2 HARQ bits the number of associated HARQ bits. The $1^{st}$ and $2^{nd}$ HARQ bits may be comprised or delivered via the first one PSFCH, the $3^{rd}$ and $4^{th}$ HARQ bit may be comprised or delivered via the second one PSFCH, the $5^{rd}$ and $6^{th}$ HARQ bit may be comprised or delivered via the third one PSFCH, and the $7^{rd}$ and last HARQ bit may be comprised or delivered via the last one PSFCH.

As an example, the receiver device may receive a number of the sidelink data transmissions, wherein each sidelink data transmission may comprise or deliver at least one transport block (TB). In one embodiment, the number of the sidelink data transmissions may be received in different TTIs. The number of the sidelink data transmissions may be received within the same sidelink resource pool (in one cell). The number of the sidelink data transmissions may be transmitted from the same transmitter device. Alternatively, the number of the sidelink data transmissions may be transmitted from different transmitter devices.

Figure 15:
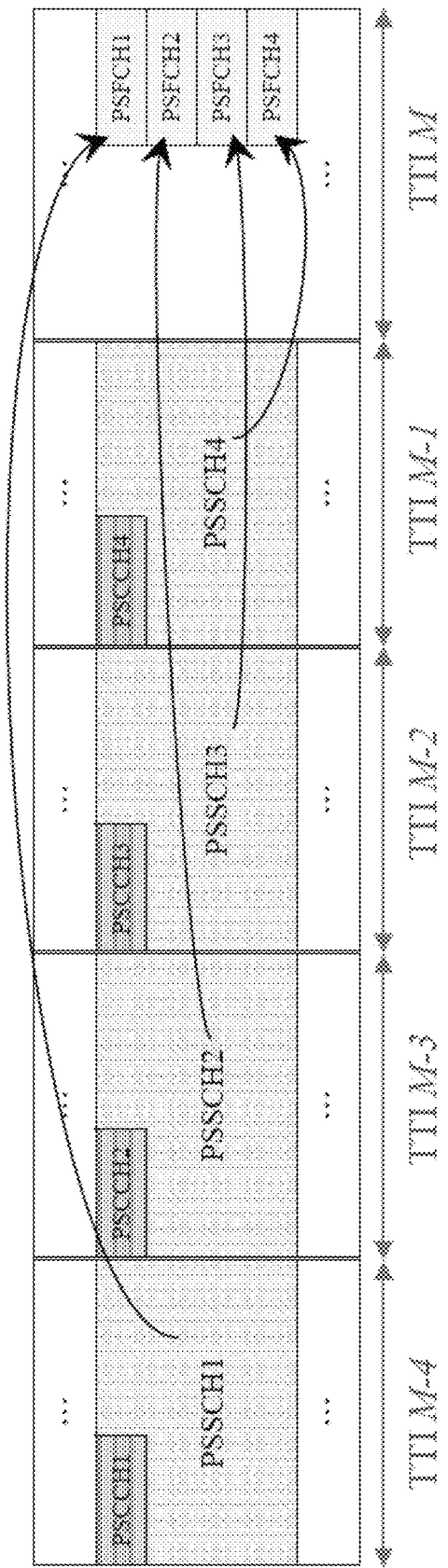
FIG. 15 illustrates an exemplary sidelink resource pool with sub-channel comprising 4 PRBs according to one exemplary embodiment.
Figure 16:
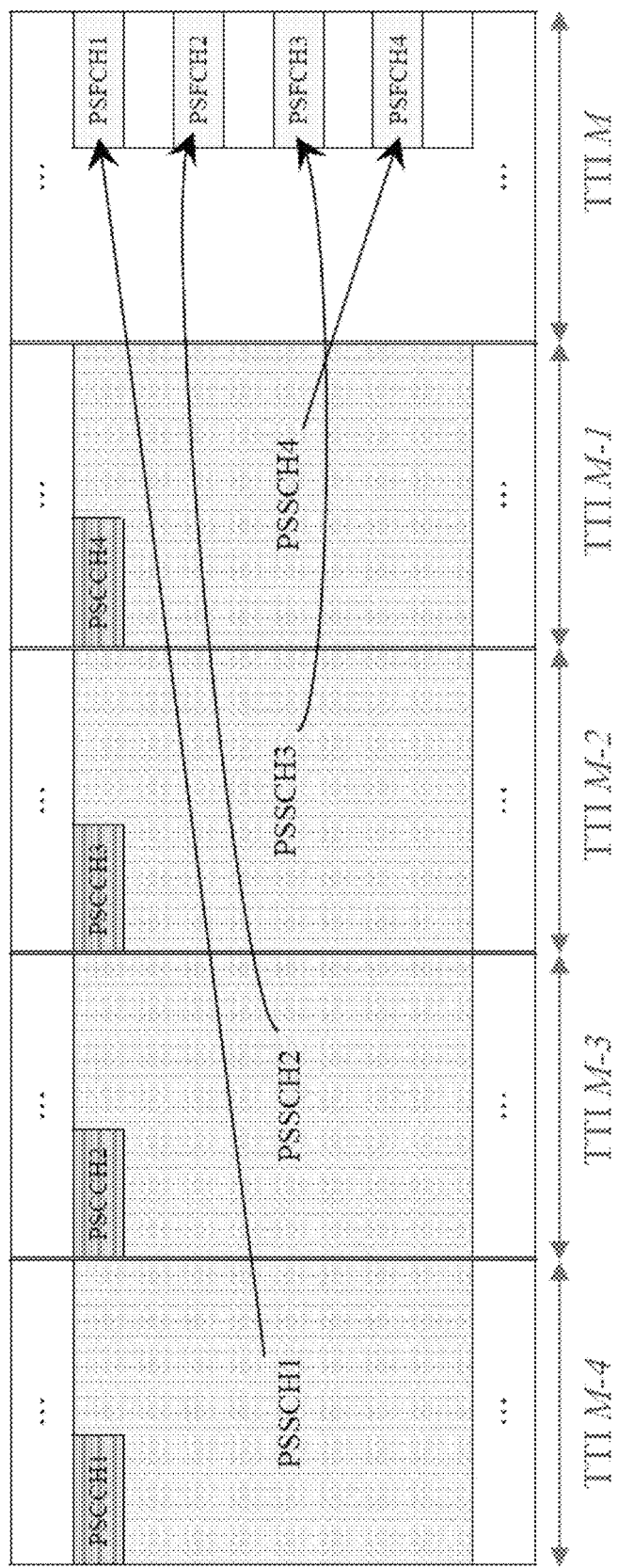
FIG. 16 illustrates an exemplary sidelink resource pool with sub-channel comprising 4 PRBs according to one exemplary embodiment.

The receiver device may generate a number of associated HARQ bits, wherein each associated HARQ bit may be associated with one of the number of the sidelink data transmissions. In one embodiment, the receiver device may deliver the number of associated HARQ bits via multiple PSFCH transmissions. The receiver device may not multiplex the number of associated HARQ bits in one PSFCH transmission. Each of the multiple PSFCH transmissions may comprise one of the number of associated HARQ bits. In other words, each of the multiple PSFCH transmissions may comprise HARQ bit(s) associated with one of the number of the sidelink data transmissions. As illustrated in examples shown in FIG. 15 and/or 16, when the receiver device receives PSSCH1~PSSCH4, the receiver device may perform PSFCH1~PSFCH4. Each PSFCH may comprise or deliver respective 1~2 HARQ bits associated with a PSSCH. PSSCH1~PSSCH4 may be transmitted from the same or different transmitter device.

II. Method B

The general concept of method B is that when a receiver device receives/detects a sidelink data transmission and/or sidelink control transmission, the receiver device may perform a sidelink feedback transmission. The resource size, position, or pattern of the sidelink feedback transmission in frequency domain may be derived or determined based on the resource size of the sidelink data transmission in frequency domain. When a transmitter device performs a sidelink data transmission and/or sidelink control transmission, the transmitter device may monitor, detect, or receive the sidelink feedback transmission given the same derivation or determination. In other words, when the sidelink data transmission comprises more frequency resources, the receiver device can utilize more (or wider) frequency resources for the sidelink feedback transmission.

In one embodiment, the sidelink feedback information may comprise any of HARQ feedback (associated with the sidelink data and/or control transmission), channel state information, RSRP measurement report, and/or assistance information (e.g. for assistance resource sensing or selection). The sidelink feedback transmission may be performed with sequence-based structure. In one embodiment, the sequence-based structure may be NR PUCCH format 0 or NR PUCCH format 1. The sidelink feedback transmission may be performed with channel-based structure. In one embodiment, the channel-based structure may be NR PUCCH format 2, NR PUCCH format 3, or NR PUCCH format 4.

In one embodiment, the sidelink control transmission may comprise or may deliver scheduling information for the sidelink data transmission. For instance, the scheduling information may indicate the frequency resources comprised in the sidelink data transmission. In one embodiment, the scheduling information may indicate number, position, and/or pattern (e.g. in unit of sub-channel) of frequency resources are comprised in the sidelink data transmission.

In one embodiment, a time gap (e.g. in units of TTI) may be applied for the sidelink feedback transmission and the sidelink data transmission. The sidelink feedback transmission may comprise multiple PRBs. The sidelink feedback transmission may comprise multiple resource elements. The scheduling information may indicate the frequency resources for the sidelink feedback transmission. The frequency resource association between the sidelink feedback transmission and the sidelink data transmission may be fixed or (pre-)configured or specified.

As for deriving or determining the resource size, position, or pattern of the sidelink feedback transmission in frequency domain, there are some alternatives:

Alternative 1

The frequency resource size of the sidelink feedback transmission may be derived or determined based on the frequency resource size of the sidelink data transmission. In one embodiment, the frequency resource size of the sidelink feedback transmission may be in units of PRBs or in units of REs (resource elements). The frequency resource size of the sidelink data transmission may be in units of PRB or in units of sub-channels. When the sidelink data transmission comprises more frequency resources, the receiver device can utilize more frequency resources for the associated sidelink feedback transmission. The reception reliability of the sidelink feedback transmission could be improved if more frequency resources are available.

In one embodiment, the frequency resource size of the sidelink feedback transmission may depend on the bit size of feedback information delivered in the sidelink feedback transmission as well. There may be an upper bound for the frequency resource size of the sidelink feedback transmission. The upper bound may be fixed, (pre-)configured, or specified. The upper bound may depend on channel format or structure of the sidelink feedback transmission. The upper bound may depend on bit size of feedback information delivered in the sidelink feedback transmission.

In one embodiment, the frequency resources of the sidelink feedback transmission may be within (available feedback resources associated with) the frequency resources of the associated sidelink data transmission. The frequency resources of the sidelink feedback transmission may be contiguous. In one embodiment, the frequency resources of the sidelink feedback transmission may start from the lowest index PRB within (available feedback resources associated with) the sub-channels or PRBs comprised in the sidelink data transmission. Alternatively, the frequency resources of the sidelink feedback transmission may start from the highest index PRB within (available feedback resources associated with) the sub-channels or PRBs comprised in the sidelink data transmission.

In one embodiment, the frequency resources of the sidelink feedback transmission may be located in the center PRBs within (available feedback resources associated with) the sub-channels or PRBs comprised in the sidelink data transmission. The frequency resources of the sidelink feedback transmission may start from an indicated PRB within (available feedback resources associated with) the sub-channels or PRBs comprised in the sidelink data transmission. The location of the sidelink feedback transmission may be indicated via the scheduling information. In one embodiment, the location of the sidelink feedback transmission may be fixed, (pre-)configured or specified. The starting frequency resource of the sidelink feedback transmission may be fixed, (pre-)configured or specified.

Figure 17:
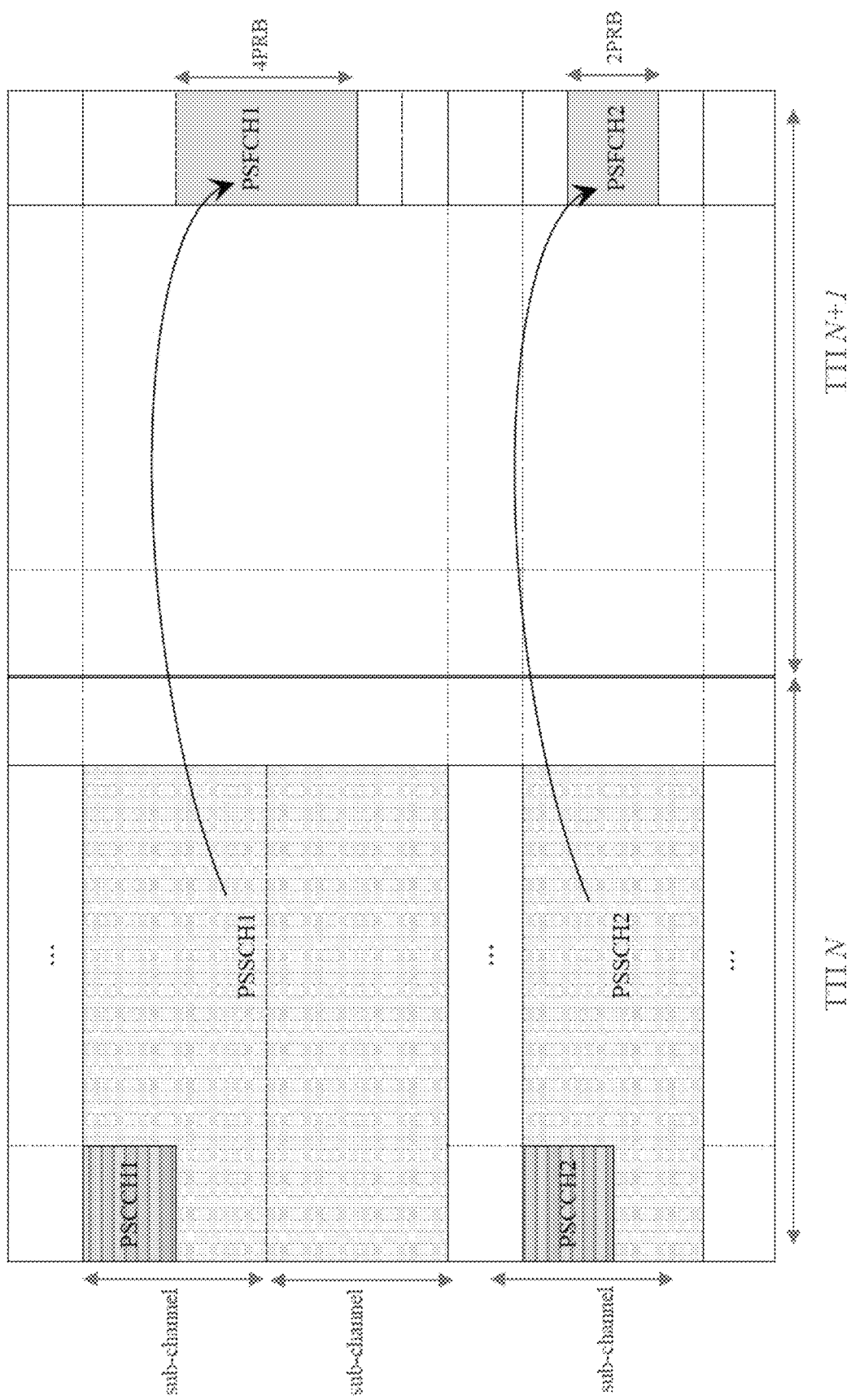
FIG. 17 illustrates an exemplary sidelink resource pool with sub-channel comprising 4 PRBs according to one exemplary embodiment.

As illustrated in the example shown in FIG. 17, one sub-channel comprises 4 PRBs. PSSCH1 comprises two sub-channels, and the associated PSFCH1 comprises 4 PRBs. PSSCH2 comprises one sub-channel, and the associated PSFCH2 comprises 2 PRBs. The PSFCH1 may comprise centre frequency resources within the frequency resources of the associated PSSCH1.

Alternative 2

The frequency resources of the sidelink feedback transmission may be within (available feedback resources associated with) the frequency resources of the associated sidelink data transmission. The frequency resources of the sidelink feedback transmission may be interleaved or distributed within (available feedback resources associated with) the frequency resources of the associated sidelink data transmission. The interleaved or distributed pattern and/or location may be derived or determined based on the frequency resource size of the sidelink data transmission.

In one embodiment, the frequency resource size of the sidelink feedback transmission may be independent from the frequency resource size of the associated sidelink data transmission. The frequency resource size of the sidelink feedback transmission may depend on bit size of feedback information delivered in the sidelink feedback transmission. In other words, the receiver device can utilize the same frequency resource size for the associated sidelink feedback transmission; and when the sidelink data transmission comprises more frequency resources, the frequency resources of the sidelink feedback transmission may be spreaded, interleaved, or distributed in a wide frequency region. It could improve the reception reliability of the sidelink feedback transmission because of frequency diversity gain. Thus, the pattern and/or location of the frequency resources of the sidelink feedback transmission may be different in response to the frequency resource size of the associated sidelink data transmission.

In one embodiment, the frequency resource size of the sidelink feedback transmission may be in units of PRBs or in units of REs (resource elements). The interleaved or distributed frequency resource units of the sidelink feedback transmission may be in units of PRBs or in unit of REs (resource elements). The frequency resource size of the sidelink data transmission may be in units of PRBs or in units of sub-channels.

In one embodiment, the sidelink feedback transmission may be interleaved or distributed in separate frequency resources. The sidelink feedback transmission may be interleaved or distributed in the separate PRBs within (available feedback resources associated with) the sub-channels associated with the sidelink data transmission. The interleaved or distributed pattern for the sidelink feedback transmission may be indicated via the scheduling information or may be (pre-)configured or may be specified.

In one embodiment, the starting frequency resource for the sidelink feedback transmission may be indicated via the scheduling information or may be (pre-)configured or may be specified. The frequency resource difference between two adjacent frequency resources of the sidelink feedback transmission may be indicated via the scheduling information or may be (pre-)configured or may be specified. The frequency resource difference between two adjacent frequency resources of the sidelink feedback transmission may be determined based on the number of sub-channels or PRBs comprised in the sidelink data transmission and/or indication in scheduling information. The frequency resource difference between two adjacent frequency resources of the sidelink feedback transmission may be determined based on the number of sub-channels or PRBs comprised in the sidelink data transmission and (pre-)configuration. The frequency resource difference between two adjacent frequency resources of the sidelink feedback transmission may be determined based on the number of sub-channels or PRBs comprised in the sidelink data transmission and specified rules.

Figure 18:
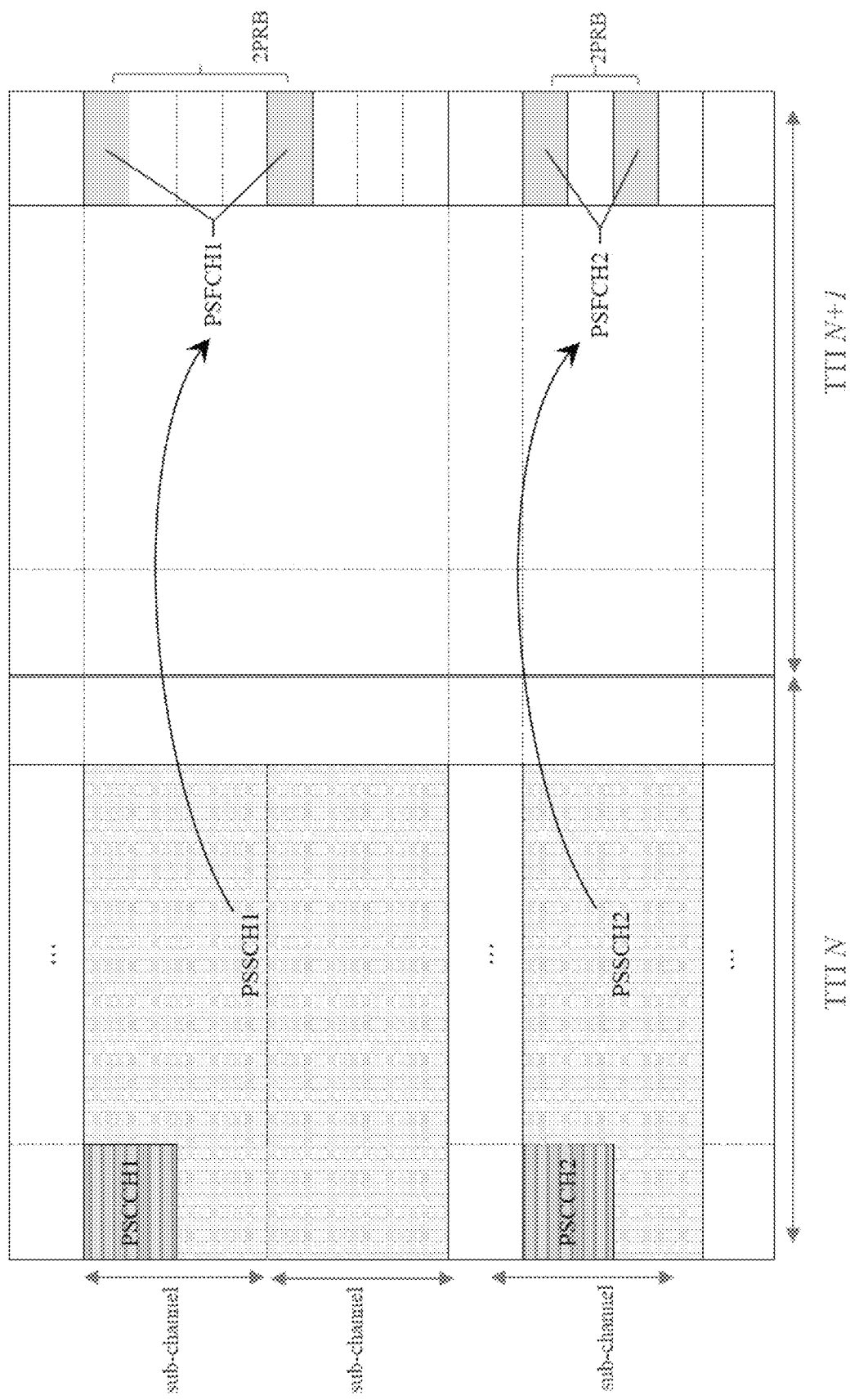
FIG. 18 illustrates an exemplary sidelink resource pool with sub-channel comprising 4 PRBs according to one exemplary embodiment.

As illustrated in the example shown in FIG. 18, one sub-channel comprises 4 PRBs. PSSCH1 comprises two sub-channels, and the associated PSFCH1 comprises 2 PRBs. PSSCH2 comprises one sub-channel, and the associated PSFCH2 comprises 2 PRBs. The frequency resource difference between two adjacent frequency resources of PSFCH1 is 4 PRB and the frequency resource difference between two adjacent frequency resources of PSFCH2 is 2 PRB. Thus, there are three unused PRBs between two adjacent frequency resources of PSFCH1, and there are one unused PRB between two adjacent frequency resources of PSFCH2.

Alternative 3

The frequency resource size of the sidelink feedback transmission may be derived or determined based on the frequency resource size of the sidelink data transmission. Moreover, the frequency resources of the sidelink feedback transmission may be interleaved or distributed within (available feedback resources associated with) the frequency resources of the associated sidelink data transmission. The interleaved or distributed pattern and/or location may be derived or determined based on the frequency resource size of the sidelink data transmission. In other words, when the sidelink data transmission comprises more frequency resources, the receiver device can utilize more frequency resources for the associated sidelink feedback transmission, wherein the frequency resources of the sidelink feedback transmission may be spreaded interleaved, or distributed in a wide frequency region. It could improve the reception reliability of the sidelink feedback transmission because of more frequency resources and frequency diversity gain. Thus, the size, pattern, and/or location of the frequency resources of the sidelink feedback transmission may be different in response to the frequency resource size of the associated sidelink data transmission.

In one embodiment, the frequency resource size of the sidelink feedback transmission may depend on bit size of feedback information delivered in the sidelink feedback transmission as well. There may be an upper bound for the frequency resource size of the sidelink feedback transmission. The upper bound may be fixed, (pre-)configured, or specified. The upper bound may depend on channel format or structure of the sidelink feedback transmission. The upper bound may depend on bit size of feedback information delivered in the sidelink feedback transmission.

In one embodiment, the frequency resource size of the sidelink feedback transmission may be in units of PRBs or in units of REs (resource elements). The interleaved or distributed frequency resource units of the sidelink feedback transmission may be in units of PRBs or in units of REs (resource elements). The frequency resource size of the sidelink data transmission may be in units of PRBs or in units of sub-channels.

In one embodiment, the frequency resources of the sidelink feedback transmission may be within (available feedback resources associated with) the frequency resources of the associated sidelink data transmission. The frequency resources of the sidelink feedback transmission may start from the lowest index PRB within (available feedback resources associated with) the sub-channels/PRBs comprised in the sidelink data transmission. The frequency resources of the sidelink feedback transmission may start from the highest index PRB within (available feedback resources associated with) the sub-channels or PRBs comprised in the sidelink data transmission. The frequency resources of the sidelink feedback transmission may start from an indicated PRB within (available feedback resources associated with) the sub-channels or PRBs comprised in the sidelink data transmission.

In one embodiment, the location of the sidelink feedback transmission may be indicated via the scheduling information. The location of the sidelink feedback transmission may be fixed, (pre-)configured or specified. The starting frequency resource of the sidelink feedback transmission may be fixed, (pre-)configured or specified.

In one embodiment, the sidelink feedback transmission may be interleaved or distributed in the separate frequency resources. The sidelink feedback transmission may be interleaved or distributed in the separate PRBs within (available feedback resources associated with) the sub-channels associated with the sidelink data transmission. The interleaved or distributed pattern for the sidelink feedback transmission may be indicated via the scheduling information or may be (pre-)configured or may be specified. The starting frequency resource for the sidelink feedback transmission may be indicated via the scheduling information or may be (pre-)configured or may be specified.

In one embodiment, the frequency resource difference between two adjacent frequency resources of the sidelink feedback transmission may be indicated via the scheduling information or may be (pre-)configured or may be specified. The frequency resource difference between two adjacent frequency resources of the sidelink feedback transmission may depend on the frequency resource size of the sidelink data transmission. The frequency resource difference between two adjacent frequency resources of the sidelink feedback transmission may be determined based on the number of sub-channels or PRBs comprised in the sidelink data transmission and/or indication in scheduling information. The frequency resource difference between two adjacent frequency resources of the sidelink feedback transmission may be determined based on the number of sub-channels or PRBs comprised in the sidelink data transmission and (pre-)configuration. The frequency resource difference between two adjacent frequency resources of the sidelink feedback transmission may be determined based on the number of sub-channels or PRBs comprised in the sidelink data transmission and specified rules. The frequency resource difference between two adjacent frequency resources of the sidelink feedback transmission may be independent from the frequency resource size of the sidelink data transmission.

Figure 19:
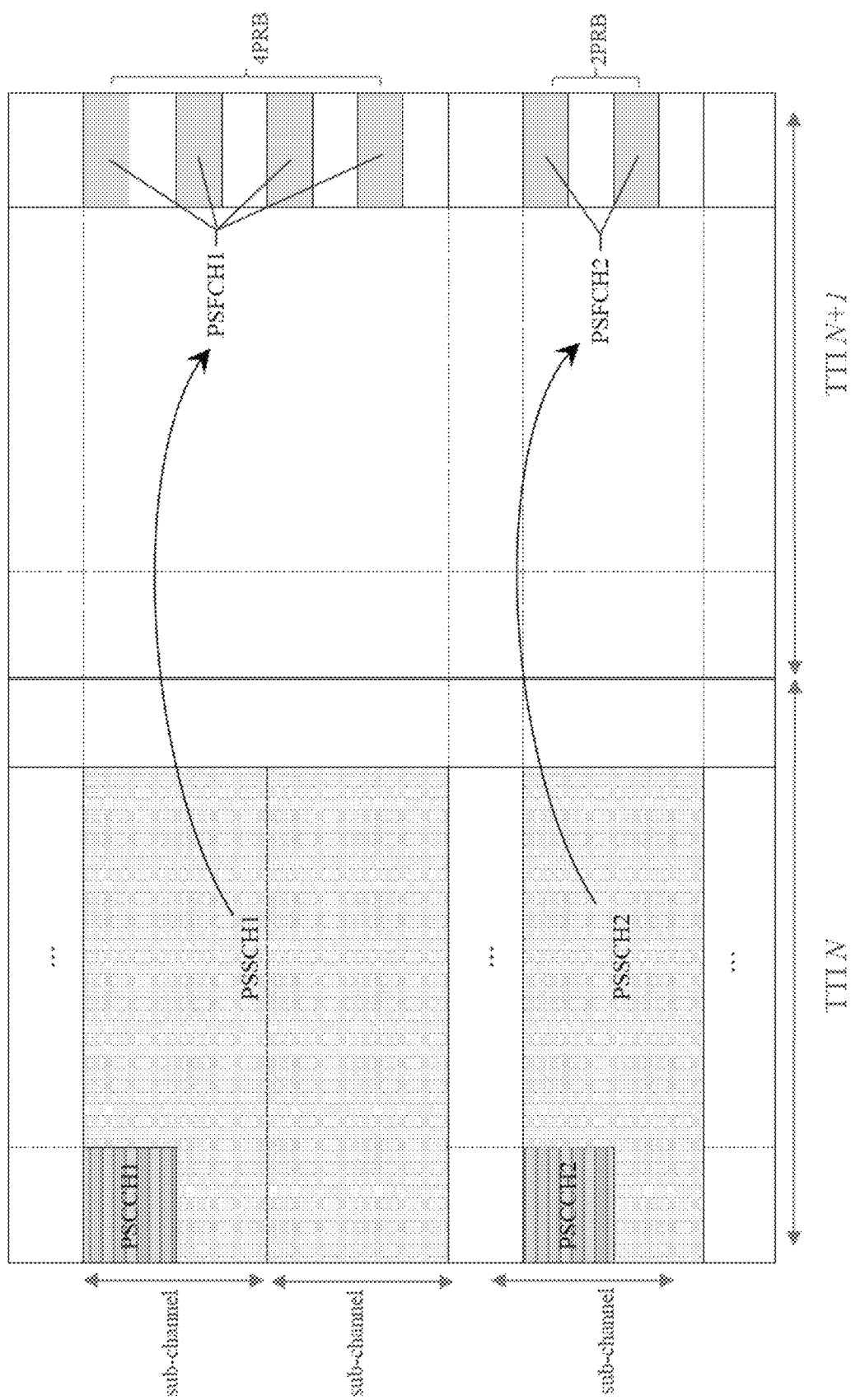
FIG. 19 illustrates an exemplary sidelink resource pool with sub-channel comprising 4 PRBs according to one exemplary embodiment.

As illustrated in the example shown in FIG. 19, one sub-channel comprises 4 PRBs. PSSCH1 comprises two sub-channels, and the associated PSFCH1 comprises 4 PRBs. PSSCH2 comprises one sub-channel, and the associated PSFCH2 comprises 2 PRBs. The frequency resource difference between the two adjacent frequency resources of PSFCH1 is 2 PRBs; and the frequency resource difference between the two adjacent frequency resources of PSFCH2 is 2 PRBs. Thus, there is one unused PRBs between the two adjacent frequency resources of PSFCH1, and one unused PRB between the two adjacent frequency resources of PSFCH2.

III. Method C

The general concept of Method C is that the frequency region of sidelink feedback transmission is different from the frequency region of associated sidelink data transmission.

In one embodiment, the frequency region of sidelink feedback transmission and the frequency region of associated sidelink data transmission may be within the same sidelink resource pool. The frequency region of sidelink data transmission may comprise full sub-channels or PRBs of the sidelink resource pool. In one embodiment, (within the symbol(s) of the sidelink feedback transmission,) the frequency region of sidelink feedback transmission comprises a part of sub-channels or PRBs of the sidelink resource pool. Within the symbol(s) of the sidelink feedback transmission, the other part, not comprised by the frequency region of sidelink feedback transmission, of sub-channels or PRBs of the sidelink resource pool may be utilized for sidelink data transmission.

In one embodiment, the frequency region of the sidelink feedback transmission may be in units of PRBs or in units of REs (resource elements). The frequency region of the sidelink data transmission may be in units of PRBs or in units of sub-channels.

In one embodiment, there may be a time gap between the frequency region of sidelink feedback transmission and the frequency region of associated sidelink data transmission. The time gap may be in units of TTIs. The time gap may be fixed, (pre-)configured, or specified. The time gap may be fixed or pre-)configured per sidelink resource pool.

In one embodiment, a sidelink control transmission may comprise or deliver scheduling information for the sidelink data transmission. For instance, the scheduling information may indicate which sub-channels are comprised in the sidelink data transmission.

In one embodiment, a sub-channel size for sidelink data transmission may be different from a sub-channel size for sidelink feedback transmission. Each sub-channel of the frequency region of the sidelink data transmission, noted as data sub-channel, may comprise a first number of PRBs. Each sub-channel of the frequency region of the sidelink feedback transmission, noted as feedback sub-channel, may comprise a second number of PRBs. In one embodiment, the second number is smaller than the first number.

In one embodiment, each data sub-channel may be associated with a feedback sub-channel. A data sub-channel and an associated feedback sub-channel may be within the same sub-channel index. For instance, a data sub-channel with index 3 is associated with a feedback sub-channel with index 3.

In one embodiment, when a receiver device receives a sidelink data transmission comprising a set of data sub-channels, the receiver device may report feedback information (e.g. HARQ feedback) via a sidelink feedback transmission within a set of associated feedback sub-channels. The receiver device may transmit the sidelink feedback transmission on all or part of feedback sub-channels of the set of associated feedback sub-channels. When a transmitter device transmits a sidelink data transmission comprising a set of data sub-channels, the transmitter device may receive associated sidelink feedback transmission within a set of associated feedback sub-channels for acquiring feedback information, e.g. HARQ feedback.

Figure 20:
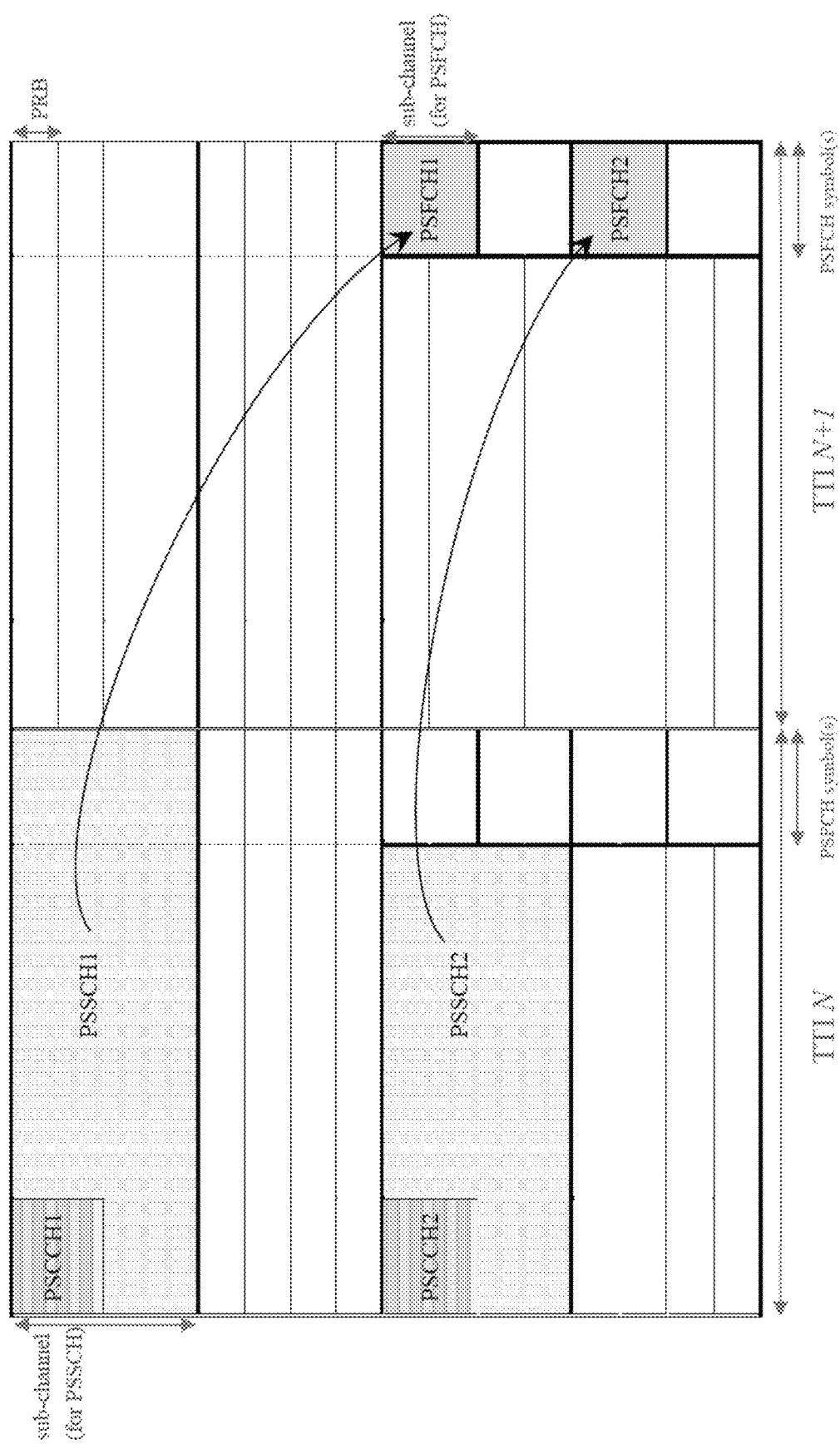
FIG. 20 illustrates an exemplary sidelink resource pool with sub-channel comprising 4 PRBs according to one exemplary embodiment.

As illustrated in the example shown in FIG. 20, within the sidelink resource pool, one sub-channel for PSSCH comprises 4 PRBs and one sub-channel for PSFCH comprises 2PRBs. There are four sub-channels for PSSCH and four associated sub-channels for PSFCH. Since the comprised PRBs of one sub-channel are different, the full PSFCH region comprises 8 PRBs, while full PSSCH region comprises 16 PRBs. When a receiver device receives PSSCH1, the receiver device may report feedback information via associated PSFCH1. When a receiver device receives PSSCH2, the receiver device may report feedback information via associated PSFCH2. PSSCH1 may comprise the frequency resources, e.g. resource elements, in the PSFCH symbol(s), since the sub-channels or PRBs comprised by PSSCH1 are not within or overlapped with the frequency region of PSFCH region. PSSCH2 cannot comprise the frequency resources, e.g. resource elements, in the PSFCH symbol(s), since the sub-channels or PRBs comprised by PSSCH2 are within or overlapped with the frequency region of PSFCH region.

In another embodiment, resource units for sidelink data transmission (such as sub-channel) may be different from resource units for sidelink feedback transmission (such as PRB). Each sub-channel of the frequency region of the sidelink data transmission may be associated with a specific number of PRB for sidelink feedback transmission. In one embodiment, one sub-channel of the sidelink data transmission is associated with one PRB for sidelink feedback transmission.

In one embodiment, when a receiver device receives a sidelink data transmission comprising a set of sub-channels, the receiver device may report feedback information (e.g. HARQ feedback) via a sidelink feedback transmission within a set of associated PRBs. The receiver device may transmit the sidelink feedback transmission on all or part of PRBs of the set of associated PRBs. When a transmitter device transmits a sidelink data transmission comprising a set of sub-channels, the transmitter device may receive associated sidelink feedback transmission within a set of associated PRBs for acquiring feedback information, e.g. HARQ feedback.

Moreover, the frequency region of sidelink feedback transmission may be hopped in different TTIs. In one embodiment, the frequency region size of sidelink feedback transmission in one TTI may be the same as the frequency region size of sidelink feedback transmission in another TTI. Alternatively, the frequency region location of sidelink feedback transmission in one TTI may be different from the frequency region location of sidelink feedback transmission in another TTI. In one embodiment, the hopping pattern for the frequency region of sidelink feedback transmission may be fixed, (pre-)configured, or specified.

Figure 21:
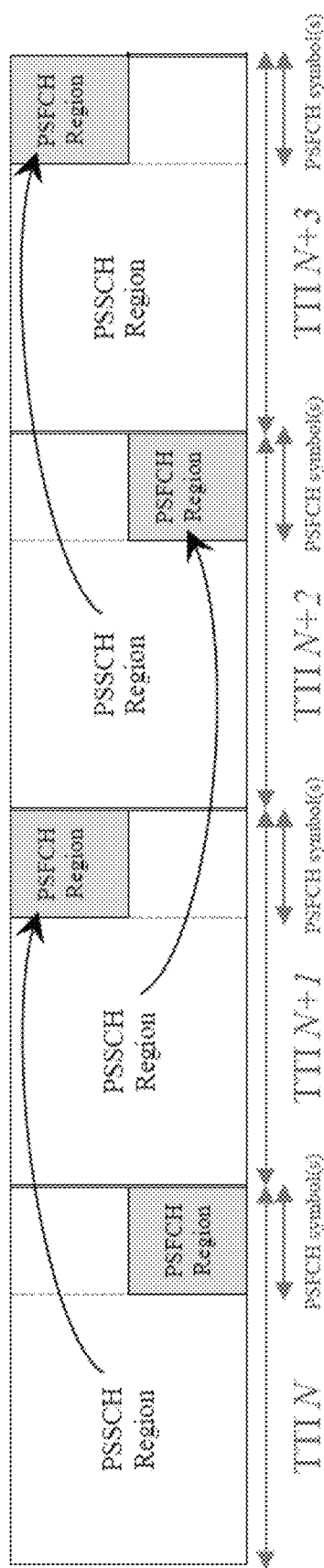
FIG. 21 is a diagram according to one exemplary embodiment.

In one embodiment, the frequency region location of sidelink feedback transmission may depend on TTI index. As illustrated in the example shown in FIG. 21, the PSFCH regions in TTI N and TTI N+2 are located in the bottom half of the sidelink resource pool, and the PSFCH region in TTI N+1 and TTI N+3 are located in top half of the sidelink resource pool.

Moreover, within a TTI, there may be multiple frequency regions of sidelink feedback transmission. The multiple frequency regions of sidelink feedback transmission may be non-overlapped with each other in frequency domain. The multiple frequency regions of sidelink feedback transmission may be with the same frequency region size in frequency domain. The multiple frequency regions of sidelink feedback transmission may be associated with frequency region of associated sidelink data transmission in multiple TTIs.

Figure 22:
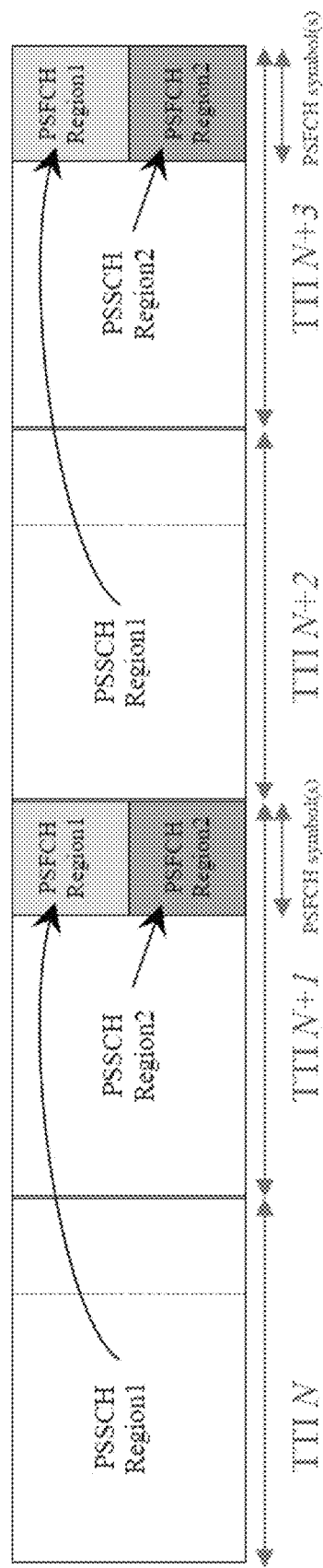
FIG. 22 is a diagram according to one exemplary embodiment.

In one embodiment, one frequency region of associated sidelink feedback transmission may be associated with frequency region of associated sidelink feedback transmission in one TTI. There may be (only) one frequency region of sidelink data transmission in one TTI within one sidelink resource pool. Within another TTI, there may be no frequency region of sidelink feedback transmission. As illustrated in the example shown in FIG. 22, PSFCH region 1 in TTI N+1 is associated with PSSCH region 1 in TTI N, and PSFCH region 2 in TTI N+1 is associated with PSSCH region 2 in TTI N+1. PSFCH region 1 in TTI N+3 is associated with PSSCH region 1 in TTI N+2, and PSFCH region 2 in TTI N+3 is associated with PSSCH region 2 in TTI N+3.

IV. For all Above Concepts, Methods, Alternatives and Embodiments

In general, any of above methods, alternatives and embodiments may be combined or applied simultaneously.

A general concept about two-stage SCI (Sidelink Control Information) is also introduced as follows:

In general, when two-stage SCI are configured supported or enabled, the scheduling information for a sidelink data transmission may be comprised or delivered in two sidelink control transmissions, wherein the first sidelink control transmission comprises or delivers the first stage SCI and the second sidelink control transmission comprises or delivers the second stage SCI. In one embodiment, the content of the first stage SCI may be different from the content of the second stage SCI. Two-stage SCI may mean that the full scheduling information for the sidelink data transmission comprises at least the first stage SCI and the second stage SCI. The receiver device can acquire the full scheduling information, for receiving or decoding the sidelink data transmission, via receiving the first sidelink control transmission and the second sidelink control transmission.

If the receiver device just receives or decodes successfully either the first sidelink control transmission or the second sidelink control transmission (e.g. receives or decodes the first sidelink control transmission successfully and not receive or decode the second control transmission successfully, or receives or decodes the second sidelink control transmission successfully and not receive or decode the first control transmission successfully), the receiver device may not acquire the full scheduling information. If the receiver device just receives either of the first stage SCI and the second stage SCI (e.g. receives the first stage SCI and not receive the second stage SCI, or receives the second stage SCI and not receive the first stage SCI), the receiver device may not acquire the full scheduling information.

In one embodiment, the receiver device may not report HARQ feedback associated with the sidelink data transmission (e.g. DTX). The receiver device may not report HARQ feedback associated with the received either one of sidelink control transmission or SCI. The receiver device may not perform sidelink feedback transmission associated with the sidelink data transmission. The receiver device may not perform sidelink feedback transmission associated with the received either one of sidelink control transmission or SCI. The receiver device may report HARQ feedback associated with the sidelink data transmission (e.g. NACK). The receiver device may perform sidelink feedback transmission(s) associated with the sidelink data transmission. The receiver device may perform sidelink feedback transmission(s) on sidelink feedback resource(s) associated with the received either one of sidelink control transmission/ SCI and/or the sidelink data transmission.

The general concept about two-stage SCI can be combined with any above methods, alternatives and embodiments. Alternatively, the general concept about two-stage SCI can be applied without combination with any above methods, alternatives, and embodiments.

In one embodiment, the HARQ feedback may be associated with the sidelink data transmission and/or the sidelink control transmission. The HARQ feedback may be derived based on whether the receiver device successfully receives or decodes the transport block(s) delivered in the sidelink data transmission. The HARQ feedback may be derived based on whether the receiver device successfully receives or decodes the sidelink control transmission.

In one embodiment, the channel state information may present sidelink channel quality at least between the transmitter device and the receiver device. The channel state information may be derived, by the receiver device, based on measuring reference signal transmitted from the transmitter device.

In one embodiment, the RSRP measurement result may present propagation loss from the transmitter device to the receiver device. The RSRP measurement result may be derived, by the receiver device, based on measuring reference signal transmitted from the transmitter device.

In one embodiment, the assistance information may be provided from the receiver device to the transmitter device, to assist the transmitter device to perform resource sensing and/or selection. The assistance information may mean the sensing result or resource occupancy or reservation situation of the receiver device.

In one embodiment, the sidelink feedback transmission and the associated sidelink data transmission may be in the same TTI. The time gap between the sidelink feedback transmission and the associated sidelink data transmission may be zero. The sidelink feedback transmission and the associated sidelink data transmission may be in different TTIs. The time gap between the sidelink feedback transmission and the associated sidelink data transmission may be in units of TTIs. The time gap may be fixed, (pre-)configured, or specified. The time gap may be fixed or (pre-)configured per sidelink resource pool.

In one embodiment, the sidelink data transmission could be a PSSCH transmission. The sidelink data channel could be PSSCH.

In one embodiment, the sidelink control transmission could be a PSCCH transmission. The sidelink control channel could be PSCCH.

In one embodiment, the sidelink feedback transmission could be a PSFCH transmission. The sidelink feedback channel could be PSFCH.

In one embodiment, the sidelink transmission or reception may be device-to-device transmission or reception. The sidelink transmission or reception may be a V2X (Vehicle-to-Everything) transmission or reception. The sidelink transmission or reception may be a P2X (Pedestrian-to-Everything) transmission or reception. The sidelink transmission or reception may be on PC5 interface.

In one embodiment, the PC5 interface may be wireless interface for communication between device and device. The PC5 interface may be wireless interface for communication between devices. The PC5 interface may be wireless interface for communication between UEs. The PC5 interface may be wireless interface for V2X or P2X communication.

In one embodiment, the Uu interface may be wireless interface for communication between network node and device. The Uu interface may be wireless interface for communication between network node and UE.

In one embodiment, the TTI may mean a time interval for the sidelink resource pool. The TTI may mean a transmission time interval for a sidelink (data) transmission. A TTI may be a slot (for sidelink). A TTI may be a subframe (for sidelink). A TTI may comprise multiple symbols, e.g. 12 or 14 symbols.

In one embodiment, sub-channel may be the scheduling resource unit for sidelink data transmission in frequency domain. One sub-channel may comprise multiple contiguous PRBs in frequency domain. The number of PRBs of each sub-channel may be fixed, (pre-) configured, or specified. The number of PRBs of each sub-channel may be fixed or (pre-) configured per sidelink resource pool.

In one embodiment, the transmitter device may be a UE. The transmitter device may be a vehicle UE. The transmitter device may be a V2X UE.

In one embodiment, the receiver device may be a UE. The receiver device may be a vehicle UE. The receiver device may be a V2X UE.

Figure 23:
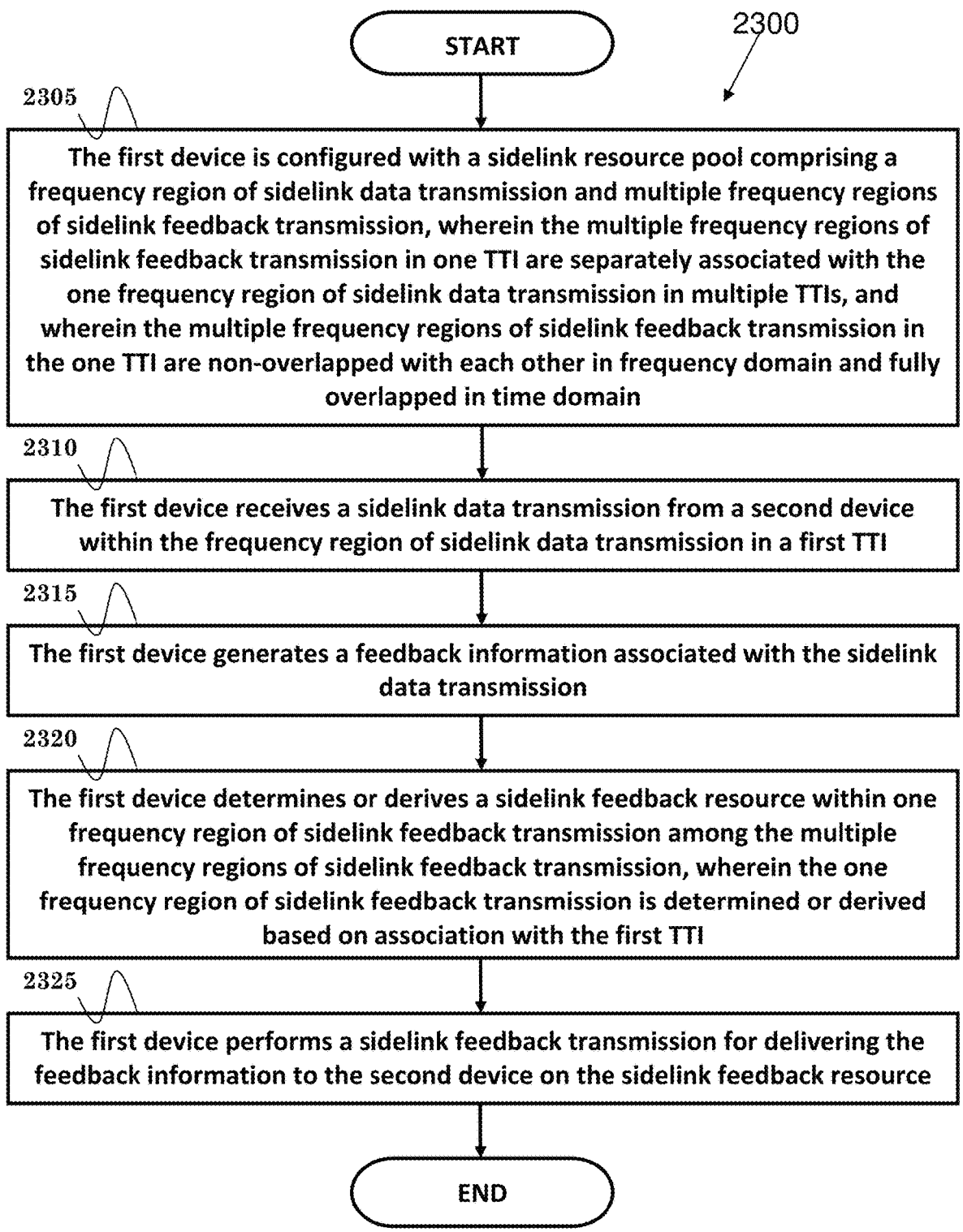
FIG. 23 is a flow chart according to one exemplary embodiment.

FIG. 23 is a flow chart 2300 according to one exemplary embodiment from the perspective of a first device. In the step 2305, the first device is configured with a sidelink resource pool comprising a frequency region of sidelink data transmission and multiple frequency regions of sidelink feedback transmission, wherein the multiple frequency regions of sidelink feedback transmission in one TTI (Transmission Time Interval) are separately associated with the one frequency region of sidelink data transmission in multiple TTIs, and wherein the multiple frequency regions of sidelink feedback transmission in the one TTI are non-overlapped with each other in frequency domain and fully overlapped in time domain. In step 2310, the first device receives a sidelink data transmission from a second device within the frequency region of sidelink data transmission in a first TTI. In step 2315, the first device generates a feedback information associated with the sidelink data transmission. In step 2320, the first device determines or derives a sidelink feedback resource within one frequency region of sidelink feedback transmission among the multiple frequency regions of sidelink feedback transmission, wherein the one frequency region of sidelink feedback transmission is determined or derived based on association with the first TTI. In step 2325, the first device performs a sidelink feedback transmission for delivering the feedback information to the second device on the sidelink feedback resource.

In one embodiment, any two of the multiple frequency regions of sidelink feedback transmission in the one TTI may be associated with sidelink data transmission in different TTIs. In one embodiment, the multiple frequency regions of sidelink feedback transmission may be (together) present in part of TTIs of the sidelink resource pool. The multiple frequency regions of sidelink feedback transmission may be (together) present in part of TTIs with a periodicity in unit of TTI in the sidelink resource pool. For each one of the multiple frequency regions of sidelink feedback transmission, frequency size and frequency location in each TTI among the part of TTIs of the sidelink resource pool may be the same.

In one embodiment, the frequency region of sidelink data transmission may comprise full PRBs (Physical Resource Blocks) of the sidelink resource pool. In one embodiment, the frequency region of sidelink data transmission may comprise full sub-channels of the sidelink resource pool. The frequency region of the sidelink data transmission is scheduled or arranged in unit of PRB or in units of sub-channels, wherein each sub-channel comprises multiple (contiguous) PRBs in a frequency domain. In one embodiment, each of the multiple frequency regions of sidelink feedback transmission may comprise a part of PRBs of the sidelink resource pool. Each of the frequency regions of the sidelink feedback transmission is scheduled or arranged in unit of PRB.

In one embodiment, a resource unit for the sidelink data transmission could be a sub-channel. A resource unit for the sidelink feedback transmission could be PRB. Each sub-channel of the frequency region of the sidelink data transmission in the first TTI is associated with a specific number of PRB(s) for candidate or available sidelink feedback transmission, wherein the specific number of PRB(s) are within the associated one frequency region among the multiple frequency regions of sidelink feedback transmission.

In one embodiment, the first device could receive the sidelink data transmission comprising a set of sub-channels, and the sidelink feedback resource is on one or part of PRB(s) within a set of associated PRBs. The set of associated PRBs comprises the specific number of PRB(s) associated to the set of sub-channels. The set of associated PRBs comprises each specific number of PRB(s) associated to each sub-channel of the set of sub-channels.

Referring back to FIGS. 3 and 4, in one exemplary embodiment of a first device, the first device 300 includes a program code 312 stored in the memory 310, and the first device is configured with a sidelink resource pool comprising a frequency region of sidelink data transmission and multiple frequency regions of sidelink feedback transmission, wherein the multiple frequency regions of sidelink feedback transmission in one TTI are separately associated with the one frequency region of sidelink data transmission in multiple TTIs, and wherein the multiple frequency regions of sidelink feedback transmission in the one TTI are non-overlapped with each other in frequency domain and fully overlapped in time domain. The CPU 308 could execute program code 312 to enable the first device (i) to receive a sidelink data transmission from a second device within the frequency region of sidelink data transmission in a first TTI, (ii) to generate a feedback information associated with the sidelink data transmission, (iii) to determine or derive a sidelink feedback resource within one frequency region of sidelink feedback transmission among the multiple frequency regions of sidelink feedback transmission, wherein the one frequency region of sidelink feedback transmission is determined or derived based on association with the first TTI, and (iv) to perform a sidelink feedback transmission for delivering the feedback information to the second device on the sidelink feedback resource. Furthermore, the CPU 308 can execute the program code 312 to perform all of the above-described actions and steps or others described herein.

Figure 24A:
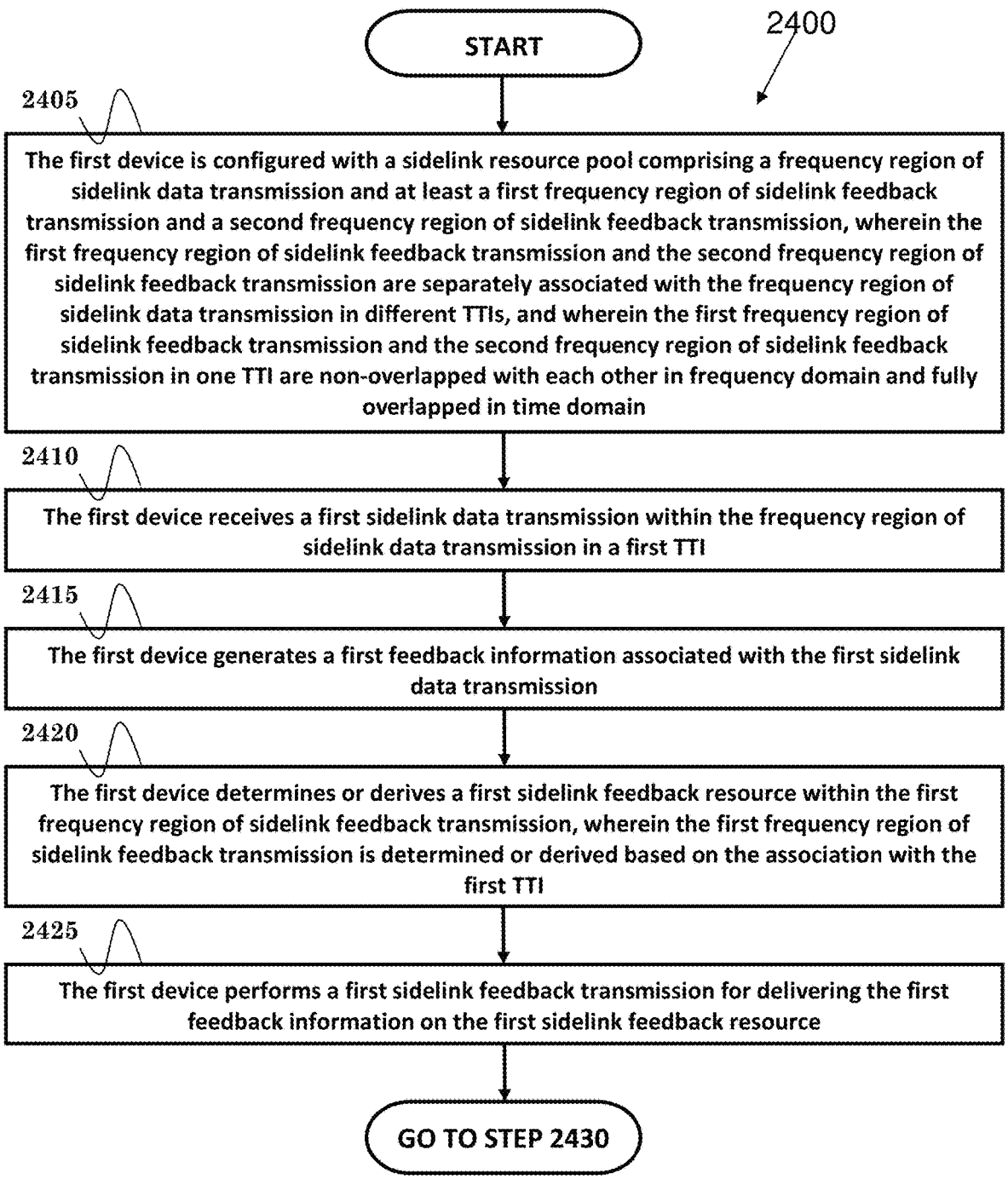
FIGS. 24A and 24B are a flow chart according to one exemplary embodiment.
Figure 24B:
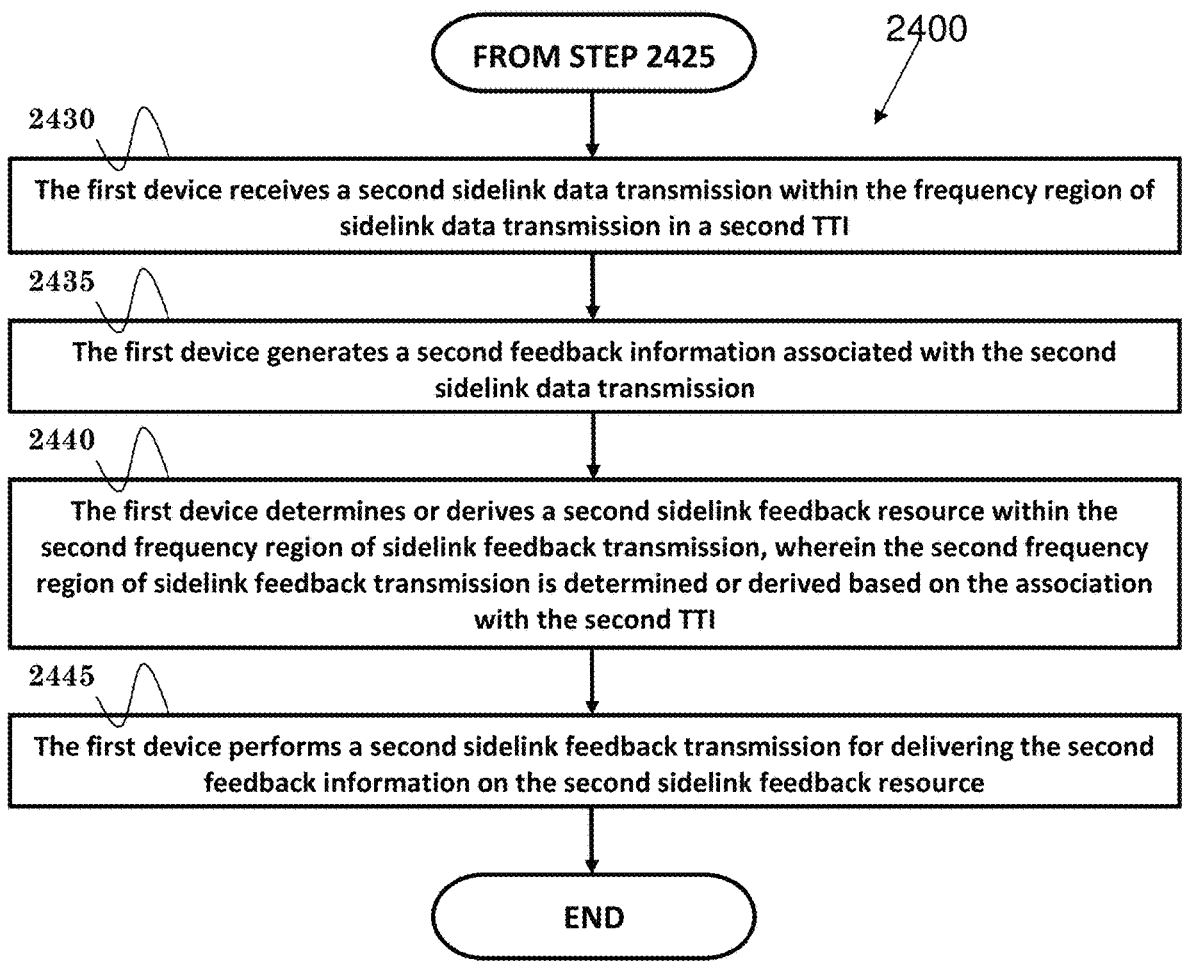

FIGS. 24A and 24B is a flow chart 2400 according to one exemplary embodiment from the perspective of a first device. In step 2405, the first device is configured with a sidelink resource pool comprising a frequency region of sidelink data transmission and at least a first frequency region of sidelink feedback transmission and a second frequency region of sidelink feedback transmission, wherein the first frequency region of sidelink feedback transmission and the second frequency region of sidelink feedback transmission are separately associated with the frequency region of sidelink data transmission in different TTIs, and wherein the first frequency region of sidelink feedback transmission and the second frequency region of sidelink feedback transmission in one TTI are non-overlapped with each other in frequency domain and fully overlapped in time domain. In step 2410, the first device receives a first sidelink data transmission within the frequency region of sidelink data transmission in a first TTI. In step 2415, the first device generates a first feedback information associated with the first sidelink data transmission. In step 2420, the first device determines or derives a first sidelink feedback resource within the first frequency region of sidelink feedback transmission, wherein the first frequency region of sidelink feedback transmission is determined or derived based on the association with the first TTI. In step 2425, the first device performs a first sidelink feedback transmission for delivering the first feedback information on the first sidelink feedback resource.

In step 2430, the first device receives a second sidelink data transmission within the frequency region of sidelink data transmission in a second TTI. In step 2735, the first device generates a second feedback information associated with the second sidelink data transmission. In step 2440, the first device determines or derives a second sidelink feedback resource within the second frequency region of sidelink feedback transmission, wherein the second frequency region of sidelink feedback transmission is determined or derived based on the association with the second TTI. In step 2445, the first device performs a second sidelink feedback transmission for delivering the second feedback information on the second sidelink feedback resource.

In one embodiment, the first frequency region of sidelink feedback transmission may be associated with the frequency region of sidelink data transmission in a first set of TTIs, and the first TTI is within the first set of TTIs. The second frequency region of sidelink feedback transmission may be associated with the frequency region of sidelink data transmission in a second set of TTIs, and the second TTI is within the second set of TTIs. The first set of TTIs and the second set of TTIs may be non-overlapped in time domain. The sidelink resource pool comprises at least the first set of TTIs and the second set of TTIs.

In one embodiment, the first frequency region of sidelink feedback transmission and the second frequency region of sidelink feedback transmission may be (together) present in part of TTIs of the sidelink resource pool. The first frequency region of sidelink feedback transmission and the second frequency region of sidelink feedback transmission may be (together) present in part of TTIs with a periodicity in unit of TTI in the sidelink resource pool. Frequency size and frequency location of the first frequency region of sidelink feedback transmission in each TTI among the part of TTIs of the sidelink resource pool is the same. Frequency size and frequency location of the second frequency region of sidelink feedback transmission in each TTI among the part of TTIs of the sidelink resource pool is the same.

In one embodiment, the frequency region of sidelink data transmission may comprise full PRBs of the sidelink resource pool. In one embodiment, the frequency region of sidelink data transmission may comprise full sub-channels of the sidelink resource pool. The frequency region of the sidelink data transmission is scheduled or arranged in unit of PRB or in unit of sub-channel, wherein each sub-channel comprises multiple (contiguous) PRBs in frequency domain. In one embodiment, the first frequency region of sidelink feedback transmission may comprise a first part of PRBs of the sidelink resource pool. The first frequency region of the sidelink feedback transmission may be scheduled or arranged in units of PRBs. The second frequency region of sidelink feedback transmission may comprise a second part of PRBs of the sidelink resource pool. The second frequency region of the sidelink feedback transmission may be scheduled or arranged in units of PRBs.

In one embodiment, a resource unit for the sidelink data transmission is a sub-channel. A resource unit for the first sidelink feedback transmission is PRB. Each sub-channel of the frequency region of the sidelink data transmission in the first TTI is associated with a specific number of PRB(s) for candidate or available sidelink feedback transmission, wherein the specific number of PRB(s) are within the first frequency region. A resource unit for the second sidelink feedback transmission is PRB. Each sub-channel of the frequency region of the sidelink data transmission in the second TTI is associated with a specific number of PRB(s) for candidate or available sidelink feedback transmission, wherein the specific number of PRB(s) are within the second frequency region.

In one embodiment, when the first device receives the first sidelink data transmission comprising a first set of sub-channels, the first sidelink feedback resource is on one or part of PRB(s) within a first set of associated PRBs. The first set of associated PRBs comprises the specific number of PRB(s) associated to the first set of sub-channels. The first set of associated PRBs comprises each specific number of PRB(s) associated to each sub-channel of the first set of sub-channels. When the first device receives the second sidelink data transmission comprising a second set of sub-channels, the second sidelink feedback resource is on one or part of PRB(s) within a second set of associated PRBs. The second set of associated PRBs comprises the specific number of PRB(s) associated to the second set of sub-channels. The second set of associated PRBs comprises each specific number of PRB(s) associated to each sub-channel of the second set of sub-channels.

In one embodiment, when the first sidelink feedback transmission and the second sidelink feedback transmission are transmitted to the same second device, and when the first sidelink feedback resource and the second sidelink feedback resource are in the same TTI, the first device performs the first sidelink feedback transmission for delivering the first feedback information on the first sidelink feedback resource and performs the second sidelink feedback transmission for delivering the second feedback on the second sidelink feedback resource. The first device does not multiplex the first feedback information and the second feedback information in one sidelink feedback transmission.

Referring back to FIGS. 3 and 4, in one exemplary embodiment of a first device, the first device 300 includes a program code 312 stored in the memory 310, and the first device is configured with a sidelink resource pool comprising a frequency region of sidelink data transmission and at least a first frequency region of sidelink feedback transmission and a second frequency region of sidelink feedback transmission, wherein the first frequency region of sidelink feedback transmission and the second frequency region of sidelink feedback transmission are separately associated with the frequency region of sidelink data transmission in different TTIs, and wherein the first frequency region of sidelink feedback transmission and the second frequency region of sidelink feedback transmission in one TTI are non-overlapped with each other in frequency domain and fully overlapped in time domain. The CPU 308 could execute program code 312 to enable the first device (i) to receive a first sidelink data transmission within the frequency region of sidelink data transmission in a first TTI, (ii) to generate a first feedback information associated with the first sidelink data transmission, (iii) to determine or derive a first sidelink feedback resource within the first frequency region of sidelink feedback transmission, wherein the first frequency region of sidelink feedback transmission is determined or derived based on the association with the first TTI, (iv) to perform a first sidelink feedback transmission for delivering the first feedback information on the first sidelink feedback resource, (v) to receive a second sidelink data transmission within the frequency region of sidelink data transmission in a second TTI, (vi) to generate a second feedback information associated with the second sidelink data transmission, (vii) to determine or derive a second sidelink feedback resource within the second frequency region of sidelink feedback transmission, wherein the second frequency region of sidelink feedback transmission is determined or derived based on the association with the second TTI, and (viii) to perform a second sidelink feedback transmission for delivering the second feedback information on the second sidelink feedback resource. Furthermore, the CPU 308 can execute the program code 312 to perform all of the above-described actions and steps or others described herein.

Figure 25:
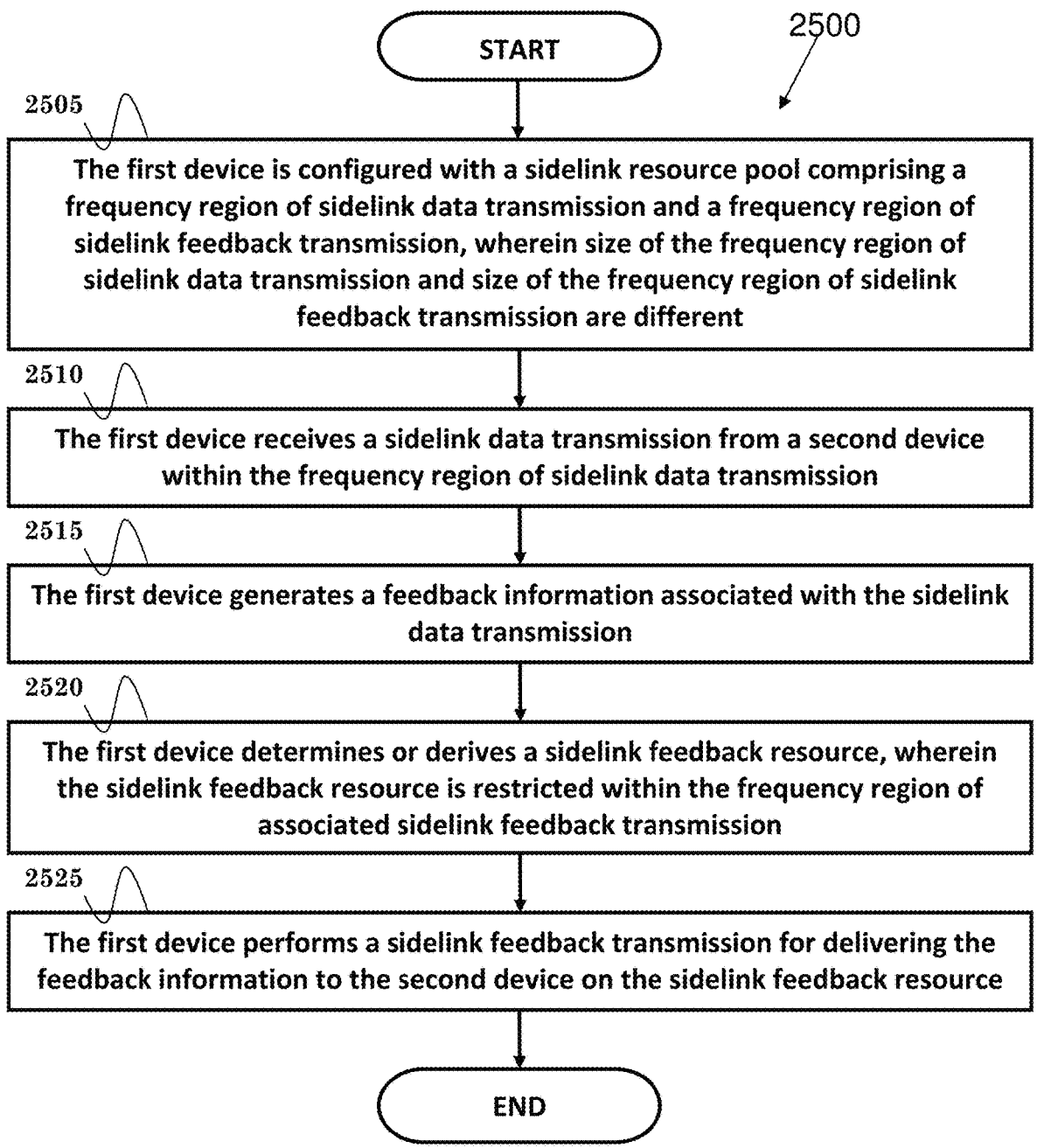
FIG. 25 is a flow chart according to one exemplary embodiment.

FIG. 25 is a flow chart 2500 according to one exemplary embodiment from the perspective of a first device. In step 2505, the first device is configured with a sidelink resource pool comprising a frequency region of sidelink data transmission and a frequency region of sidelink feedback transmission, wherein size of the frequency region of sidelink data transmission and size of the frequency region of sidelink feedback transmission are different. In step 2810, the first device receives a sidelink data transmission from a second device within the frequency region of sidelink data transmission. In step 2515, the first device generates a feedback information associated with the sidelink data transmission. In step 2520, the first device determines or derives a sidelink feedback resource, wherein the sidelink feedback resource is restricted within the frequency region of associated sidelink feedback transmission. In step 2525, the first device performs a sidelink feedback transmission for delivering the feedback information to the second device on the sidelink feedback resource.

In one embodiment, within the symbol(s) of the sidelink feedback transmission, the other frequency part, not comprised by the frequency region of sidelink feedback transmission, of the sidelink resource pool may be utilized for other sidelink transmission (e.g. sidelink data transmission), instead of the sidelink feedback transmission.

In one embodiment, the frequency region of sidelink data transmission may comprise full PRBs of the sidelink resource pool. In one embodiment, the frequency region of sidelink data transmission may comprise full sub-channels of the sidelink resource pool. The frequency region of the sidelink data transmission may be scheduled or arranged in units of PRBs or in units of sub-channels. Each sub-channel may comprise multiple (contiguous) PRBs in frequency domain. In one embodiment, the frequency region of sidelink feedback transmission may comprise a part of PRBs of the sidelink resource pool. The frequency region of the sidelink feedback transmission may be scheduled or arranged in units of PRBs.

In one embodiment, a resource unit for the sidelink data transmission may be a sub-channel. A resource unit for the sidelink feedback transmission may be a PRB. Each sub-channel of the frequency region of the sidelink data transmission may be associated with a specific number of PRB(s) for candidate or available sidelink feedback transmission, wherein the specific number of PRB(s) may be within the frequency region of sidelink feedback transmission.

In one embodiment, when the first device receives the sidelink data transmission comprising a set of sub-channels, the sidelink feedback resource may be on one or part of PRB(s) within a set of associated PRBs. The set of associated PRBs may comprise the specific number of PRB(s) associated to the set of sub-channels. The set of associated PRBs may comprise each specific number of PRB(s) associated to each sub-channel of the set of sub-channels. There may be one frequency region of sidelink feedback transmission within the sidelink resource pool. The frequency region of sidelink feedback transmission may be present in all TTIs (Transmission Time Intervals) of the sidelink resource pool. The frequency region of sidelink feedback transmission may be present in part of TTIs (Transmission Time Intervals) of the sidelink resource pool.

Referring back to FIGS. 3 and 4, in one exemplary embodiment of a first device, the first device 300 includes a program code 312 stored in the memory 310, and the first device is configured with a sidelink resource pool comprising a frequency region of sidelink data transmission and a frequency region of sidelink feedback transmission, wherein size of the frequency region of sidelink data transmission and size of the frequency region of sidelink feedback transmission are different. The CPU 308 could execute program code 312 to enable the first device (i) to receive a sidelink data transmission from a second device within the frequency region of sidelink data transmission, (ii) to generate a feedback information associated with the sidelink data transmission, (iii) to determine or derive a sidelink feedback resource, wherein the sidelink feedback resource is restricted within the frequency region of associated sidelink feedback transmission, and (iv) to perform a sidelink feedback transmission for delivering the feedback information to the second device on the sidelink feedback resource. Furthermore, the CPU 308 can execute the program code 312 to perform all of the above-described actions and steps or others described herein.

Figure 26:
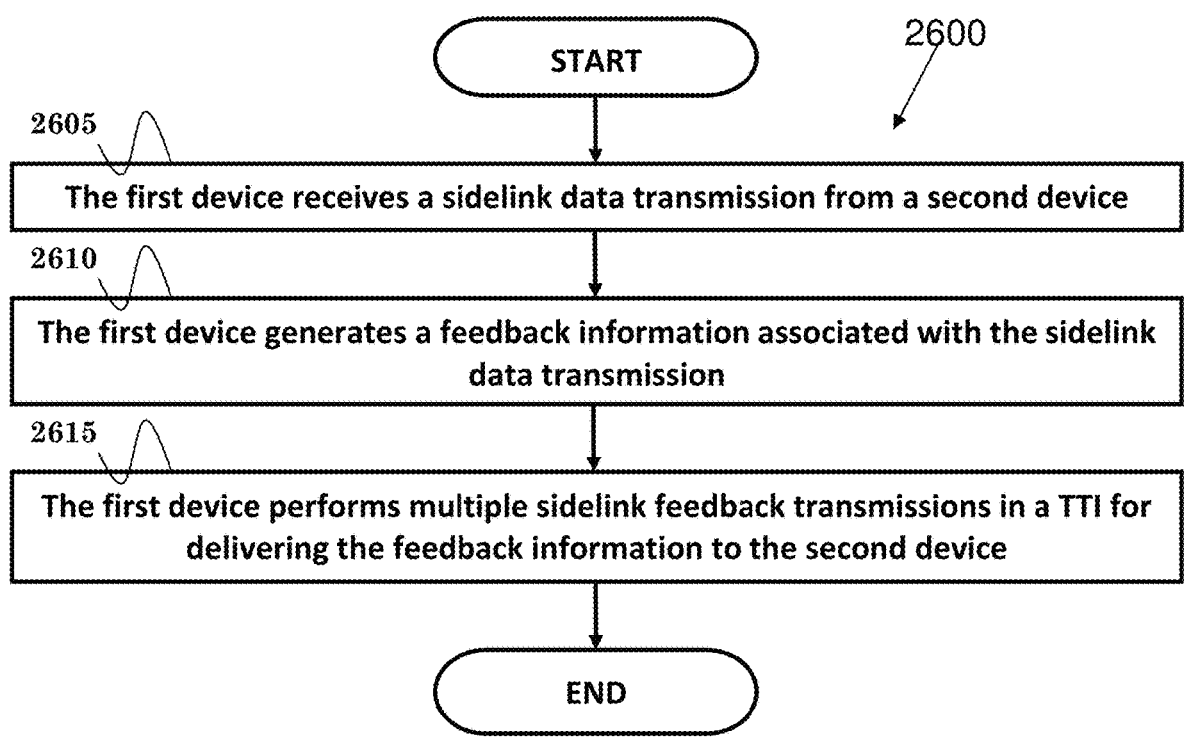
FIG. 26 is a flow chart according to one exemplary embodiment.

FIG. 26 is a flow chart 2600 according to one exemplary embodiment from the perspective of a first device. In step 2605, the first device receives a sidelink data transmission from a second device. In step 2610, the first device generates a feedback information associated with the sidelink data transmission. In step 2615, the first device performs multiple sidelink feedback transmissions in a TTI for delivering the feedback information to the second device.

In one embodiment, the first device may receive a sidelink control information, wherein the sidelink control information comprises scheduling information for the sidelink data transmission.

Referring back to FIGS. 3 and 4, in one exemplary embodiment of a first device, the device 300 includes a program code 312 stored in the memory 310. The CPU 308 could execute program code 312 to enable the first device (i) to receive a sidelink data transmission from a second device, (ii) to generate a feedback information associated with the sidelink data transmission, and (iii) to perform multiple sidelink feedback transmissions in a TTI for delivering the feedback information to the second device. Furthermore, the CPU 308 can execute the program code 312 to perform all of the above-described actions and steps or others described herein.

Figure 27:
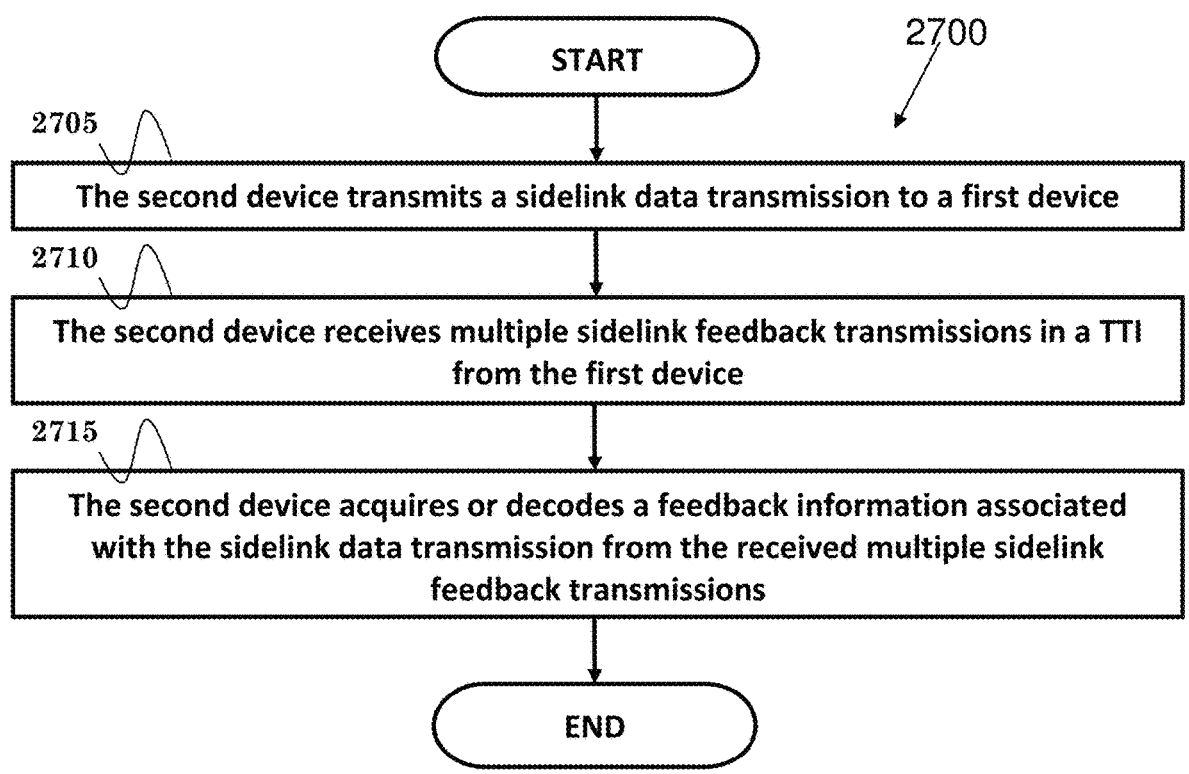
FIG. 27 is a flow chart according to one exemplary embodiment.

FIG. 27 is a flow chart 2700 according to one exemplary embodiment from the perspective of a second device. In step 2705, the second device transmits a sidelink data transmission to a first device. In step 2710, the second device receives multiple sidelink feedback transmissions in a TTI from the first device. In step 2715, the second device acquires or decodes a feedback information associated with the sidelink data transmission from the received multiple sidelink feedback transmissions.

In one embodiment, the second device could transmit a sidelink control information, wherein the sidelink control information comprises scheduling information for the sidelink data transmission.

Referring back to FIGS. 3 and 4, in one exemplary embodiment of a second device, the device 300 includes a program code 312 stored in the memory 310. The CPU 308 could execute program code 312 to enable the second device (i) to transmit a sidelink data transmission to a first device, (ii) to receive multiple sidelink feedback transmissions in a TTI from the first device, and (iii) to acquire or decode a feedback information associated with the sidelink data transmission from the received multiple sidelink feedback transmissions. Furthermore, the CPU 308 can execute the program code 312 to perform all of the above-described actions and steps or others described herein.

In the context of the embodiments illustrated in FIGS. 26 and 27 and described above, in one embodiment, the scheduling information could indicate which sub-channels are comprised in the sidelink data transmission. The time gap between each of the multiple sidelink feedback transmissions and the sidelink data transmission could be the same, and/or the time gap could be in units of TTIs.

In one embodiment, the multiple sidelink feedback transmissions could be timely in the same symbol(s) of the TTI, e.g. last one symbol or second last symbol. The multiple sidelink feedback transmissions could be timely in different symbols of the TTI, e.g. last one symbol or second last symbol. The multiple sidelink feedback transmissions could be in separate frequency resources, e.g. separate PRBs or separate resource elements.

In one embodiment, the frequency resource association between the multiple sidelink feedback transmissions and the sidelink data transmission may fixed, (pre-)configured, specified, or indicated by the scheduling information. The multiple sidelink feedback transmissions may be interleaved or distributed in the separate frequency resources. The interleaved or distributed pattern for the multiple sidelink feedback transmissions may be fixed, (pre-)configured, specified, or indicated by the scheduling information.

In one embodiment, the frequency resource difference between two adjacent sidelink feedback transmissions may be fixed, (pre-)configured, specified, or indicated via the scheduling information. The frequency resource difference between two adjacent sidelink feedback transmissions may be determined based on the number of sub-channels or PRBs comprised in the sidelink data transmission and/or indication in the scheduling information.

In one embodiment, the multiple sidelink feedback transmissions could be contiguous in the separate frequency resources. The contiguous frequency resources of the multiple sidelink feedback transmissions may start from lowest index PRB, highest index PRB, or an indicated PRB within (available feedback resources associated with) the sub-channels or PRBs comprised in the sidelink data transmission. The contiguous frequency resources of the multiple sidelink feedback transmissions are located in the center PRBs of available feedback resources associated with the sub-channels or PRBs comprised in the sidelink data transmission.

In one embodiment, each of the multiple sidelink feedback transmissions may comprise or may deliver the same content of the feedback information. Each of the multiple sidelink feedback transmissions may comprise or may deliver the full feedback information.

In one embodiment, the multiple sidelink feedback transmissions may be transmission repetition for one sidelink feedback transmission. The transmission repetition could be performed in frequency domain in the same symbol(s). The feedback information may comprise any of HARQ feedback (associated with the sidelink data and/or control transmission), channel state information, RSRP measurement result, and/or assistance information.

In one embodiment, each sidelink feedback transmission of the multiple sidelink feedback transmissions could be performed with the same channel format. Each sidelink feedback transmission of the multiple sidelink feedback transmissions could be with the frequency resource size.

In one embodiment, a first set of the multiple sidelink feedback transmissions may comprise or may deliver a first type of feedback information, and a second set of the multiple sidelink feedback transmissions may comprise or may deliver a second type of feedback information. Different types of feedback information may not be multiplexed in one sidelink feedback transmission.

In one embodiment, the first type of feedback information may be different from the second type of feedback information. The first type of feedback information may comprise any of HARQ feedback (associated with the sidelink data and/or control transmission), channel state information, RSRP measurement result, and/or assistance information.

In one embodiment, the second type of feedback information may comprise any of HARQ feedback (associated with the sidelink data and/or control transmission), channel state information, RSRP measurement result, and/or assistance information. Each sidelink feedback transmission of the first set may be performed with the same channel format. Each sidelink feedback transmission of the second set may be performed with the same channel format. The channel format of sidelink feedback transmission(s) in the first set may be different from the channel format of sidelink feedback transmission(s) in the second set. If the occupied, reserved, derived, or associated frequency resources for sidelink feedback transmission cannot accommodate (at least one) the sidelink feedback transmission of the first set and (at least one) the sidelink feedback transmission of the second set simultaneously, the receiver device may perform the sidelink feedback transmission of the first set and not perform the sidelink feedback transmission of the second set.

In one embodiment, the first type of feedback information may have higher priority than the second type of feedback information. The second set of the multiple sidelink feedback transmission could be a reference signal. The reference signal may comprise the identification (such as Layer-1 ID) of the second device and/or the first device.

In one embodiment, the second type of feedback information could mean the identification (such as Layer-1 ID) of the second device and/or the first device. There may be no second type of feedback information comprised or delivered in the reference signal. The reference signal may be transmitted from the first device is for the second device to perform channel quality measurement and/or RSRP/PL derivation. The reference signal may be transmitted in part of subcarriers/REs within the occupied PRBs. The reference signal may be any of DMRS, CSI-RS, or PL RS.

Figure 28:
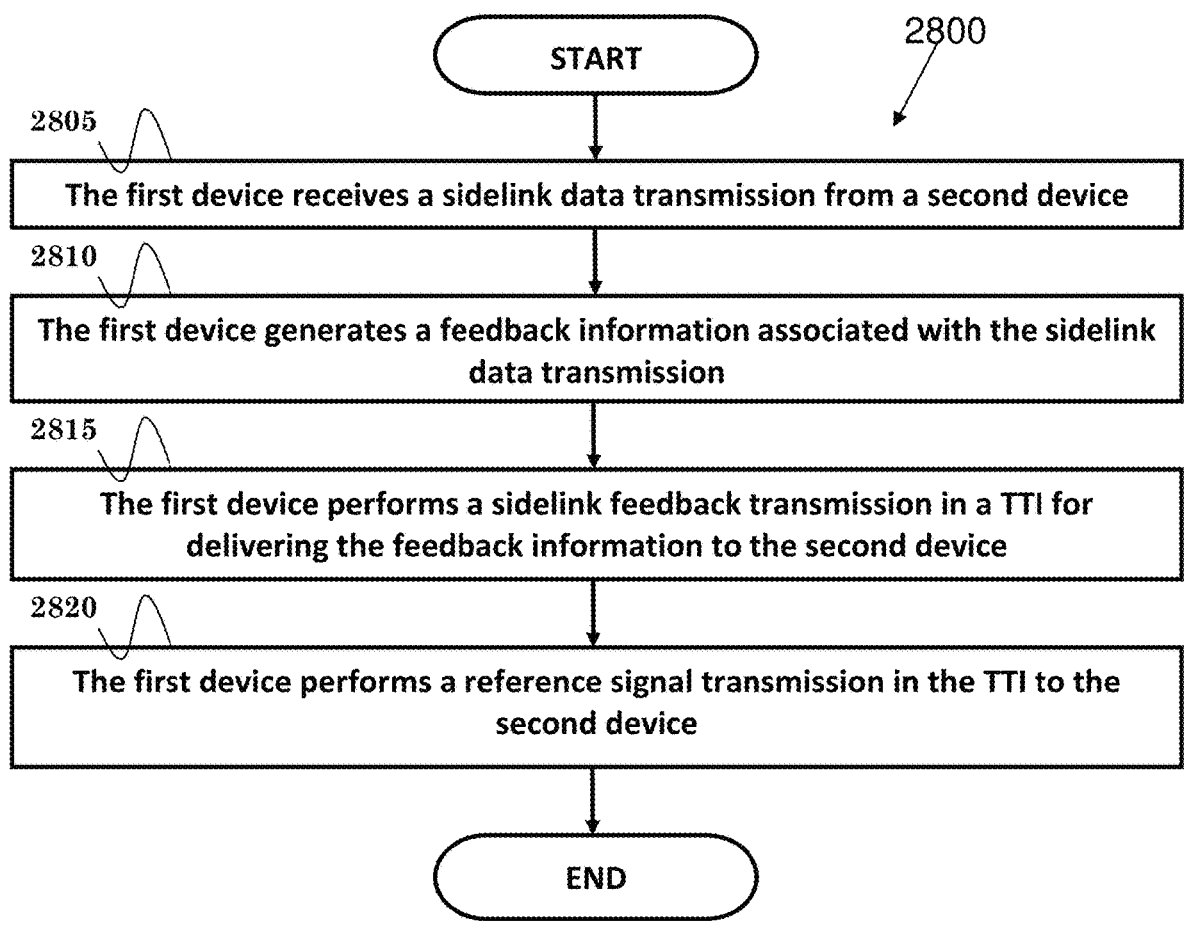
FIG. 28 is a flow chart according to one exemplary embodiment.

FIG. 28 is a flow chart 2800 according to one exemplary embodiment from the perspective of a first device to perform sidelink transmission. In step 2805, the first device receives a sidelink data transmission from a second device. In step 2810, the first device generates a feedback information associated with the sidelink data transmission. In step 2815, the first device performs a sidelink feedback transmission in a TTI for delivering the feedback information to the second device. In step 2820, the first device performs a reference signal transmission in the TTI to the second device.

In one embodiment, the first device could receive a sidelink control information, wherein the sidelink control information comprises scheduling information for the sidelink data transmission.

Referring back to FIGS. 3 and 4, in one exemplary embodiment of a first device to perform sidelink transmission, the device 300 includes a program code 312 stored in the memory 310. The CPU 308 could execute program code 312 to enable the first device (i) to receive a sidelink data transmission from a second device, (ii) to generate a feedback information associated with the sidelink data transmission, (iii) to perform a sidelink feedback transmission in a TTI for delivering the feedback information to the second device, and (iv) to perform a reference signal in the TTI to the second device. Furthermore, the CPU 308 can execute the program code 312 to perform all of the above-described actions and steps or others described herein.

Figure 29:
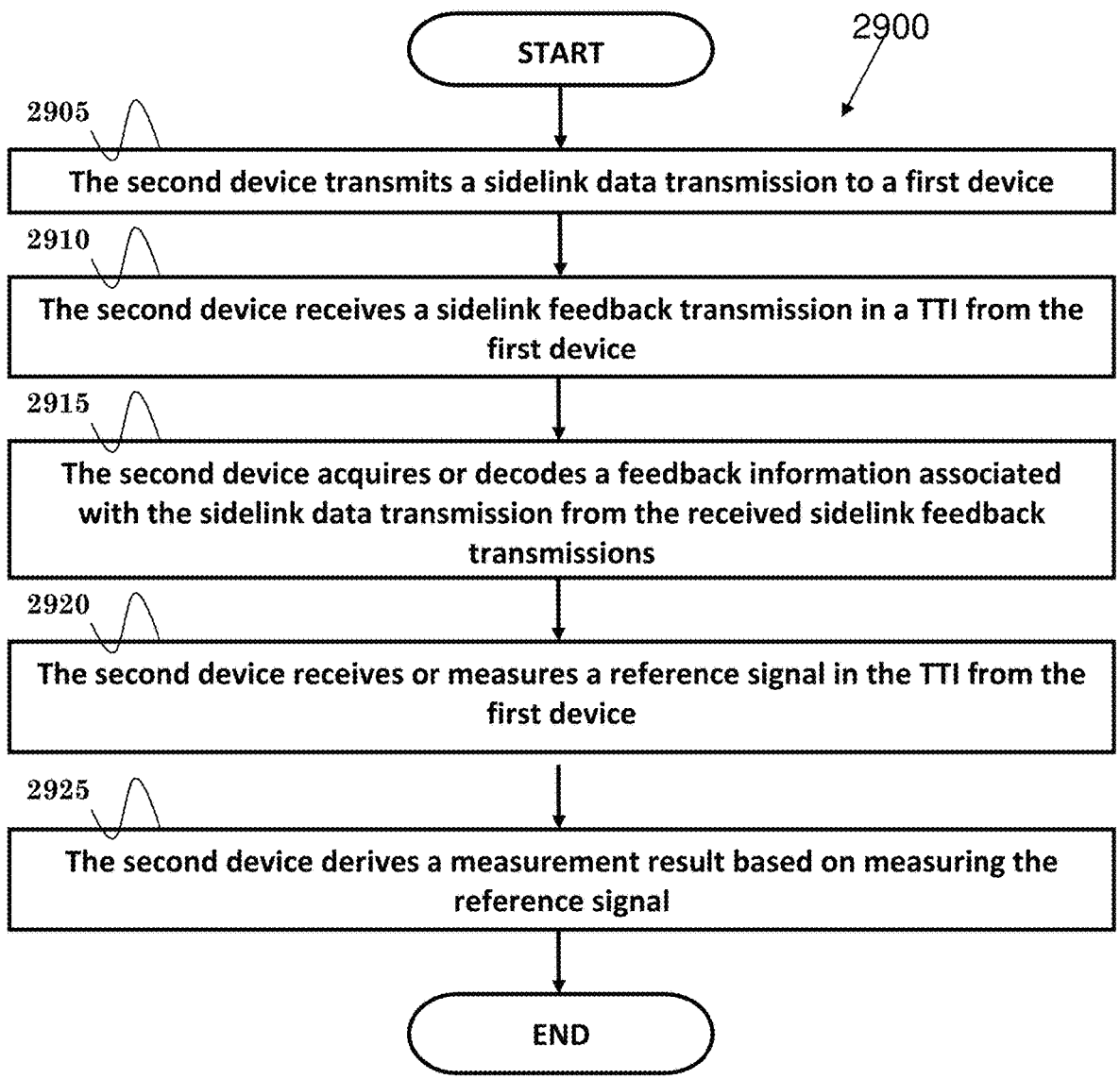
FIG. 29 is a flow chart according to one exemplary embodiment.

FIG. 29 is a flow chart 2900 according to one exemplary embodiment from the perspective of a second device to perform sidelink transmission. In step 2905, the second device transmits a sidelink data transmission to a first device. In step 2910, the second device receives a sidelink feedback transmission in a TTI from the first device. In step 2915, the second device acquires or decodes a feedback information associated with the sidelink data transmission from the received sidelink feedback transmissions. In step 2920, the second device receives or measures a reference signal in the TTI from the first device. In step 2925, the second device derives a measurement result based on measuring the reference signal.

In one embodiment, the second device could transmit a sidelink control information, wherein the sidelink control information comprises scheduling information for the sidelink data transmission.

Referring back to FIGS. 3 and 4, in one exemplary embodiment of a second device to perform sidelink transmission, the device 300 includes a program code 312 stored in the memory 310. The CPU 308 could execute program code 312 to enable the first device (i) to transmit a sidelink data transmission to a first device, (ii) to receive a sidelink feedback transmission in a TTI from the first device, (iii) to acquire or decode a feedback information associated with the sidelink data transmission from the received sidelink feedback transmissions, (iv) to receive or measure a reference signal in the TTI from the first device, and (v) to derive a measurement result based on measuring the reference signal. Furthermore, the CPU 308 can execute the program code 312 to perform all of the above-described actions and steps or others described herein.

In the context of the embodiments illustrated in FIGS. 26 through 29 and described above, in one embodiment, the sidelink control information could indicate the first device to transmit the reference signal to the second device. The reference signal may comprise the identification (such as Layer-1 ID) of the second device and/or the first device. The reference signal may be transmitted from the first device is for the second device to perform channel quality measurement and/or RSRP/PL derivation. The reference signal could be transmitted in part of subcarriers or REs within the occupied PRBs.

In one embodiment, the sidelink feedback transmission and the reference signal may occupy separate frequency resources, such as separate PRBs. The reference signal may be any of DMRS, CSI-RS, or PL RS.

In one embodiment, the multiple sidelink feedback transmissions may comprise or may deliver the same type of feedback information, wherein each of multiple sidelink feedback transmissions comprises/delivers different parts of the same type of feedback information. The receiver device could utilize one or multiple sidelink feedback transmissions in response to the bit size of the type of feedback information.

In one embodiment, the type of feedback information may comprise any of HARQ feedback (associated with the sidelink data and/or control transmission), channel state information, RSRP measurement result, and/or assistance information. Each of the multiple sidelink feedback transmissions could be performed with the same channel format.

Each of the multiple sidelink feedback transmissions could be with the same frequency resource size.

Figure 30:
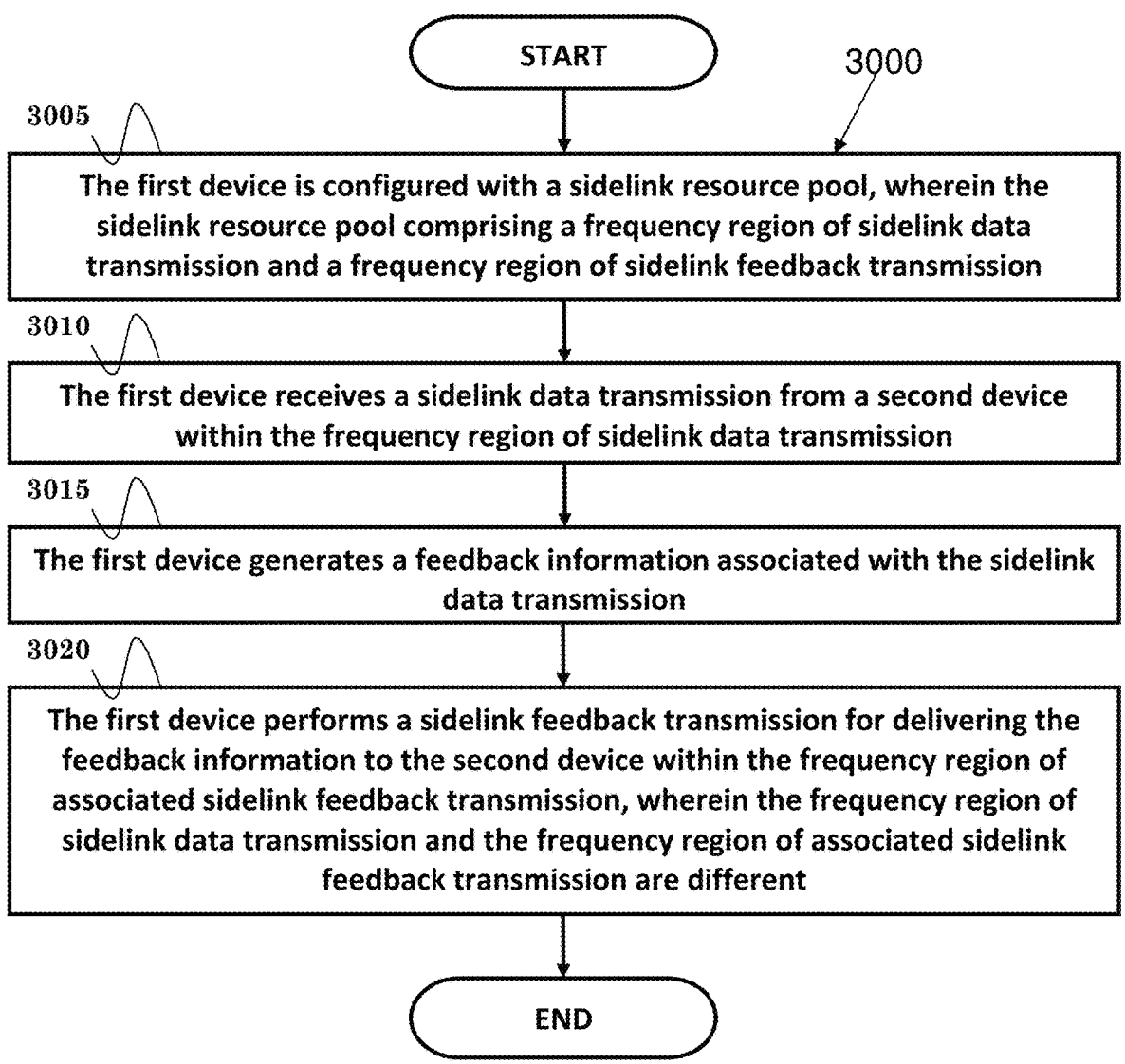
FIG. 30 is a flow chart according to one exemplary embodiment.

FIG. 30 is a flow chart 3000 according to one exemplary embodiment from the perspective of a first device to perform sidelink transmission. In step 3005, the first device is configured with a sidelink resource pool, wherein the sidelink resource pool comprising a frequency region of sidelink data transmission and a frequency region of sidelink feedback transmission. In step 3010, the first device receives a sidelink data transmission from a second device within the frequency region of sidelink data transmission. In step 3015, the first device generates a feedback information associated with the sidelink data transmission. In step 3020, the first device performs a sidelink feedback transmission for delivering the feedback information to the second device within the frequency region of associated sidelink feedback transmission, wherein the frequency region of sidelink data transmission and the frequency region of associated sidelink feedback transmission are different.

Referring back to FIGS. 3 and 4, in one exemplary embodiment of a first device, the first device 300 includes a program code 312 stored in the memory 310, and the first device is configured with a sidelink resource pool, wherein the sidelink resource pool comprising a frequency region of sidelink data transmission and a frequency region of sidelink feedback transmission. The CPU 308 could execute program code 312 to enable the first device (i) to receive a sidelink data transmission from a second device within the frequency region of sidelink data transmission, (ii) to receive a sidelink data transmission from a second device within the frequency region of sidelink data transmission, and (iii) to perform a sidelink feedback transmission for delivering the feedback information to the second device within the frequency region of associated sidelink feedback transmission, wherein the frequency region of sidelink data transmission and the frequency region of associated sidelink feedback transmission are different. Furthermore, the CPU 308 can execute the program code 312 to perform all of the above-described actions and steps or others described herein.

Figure 31:
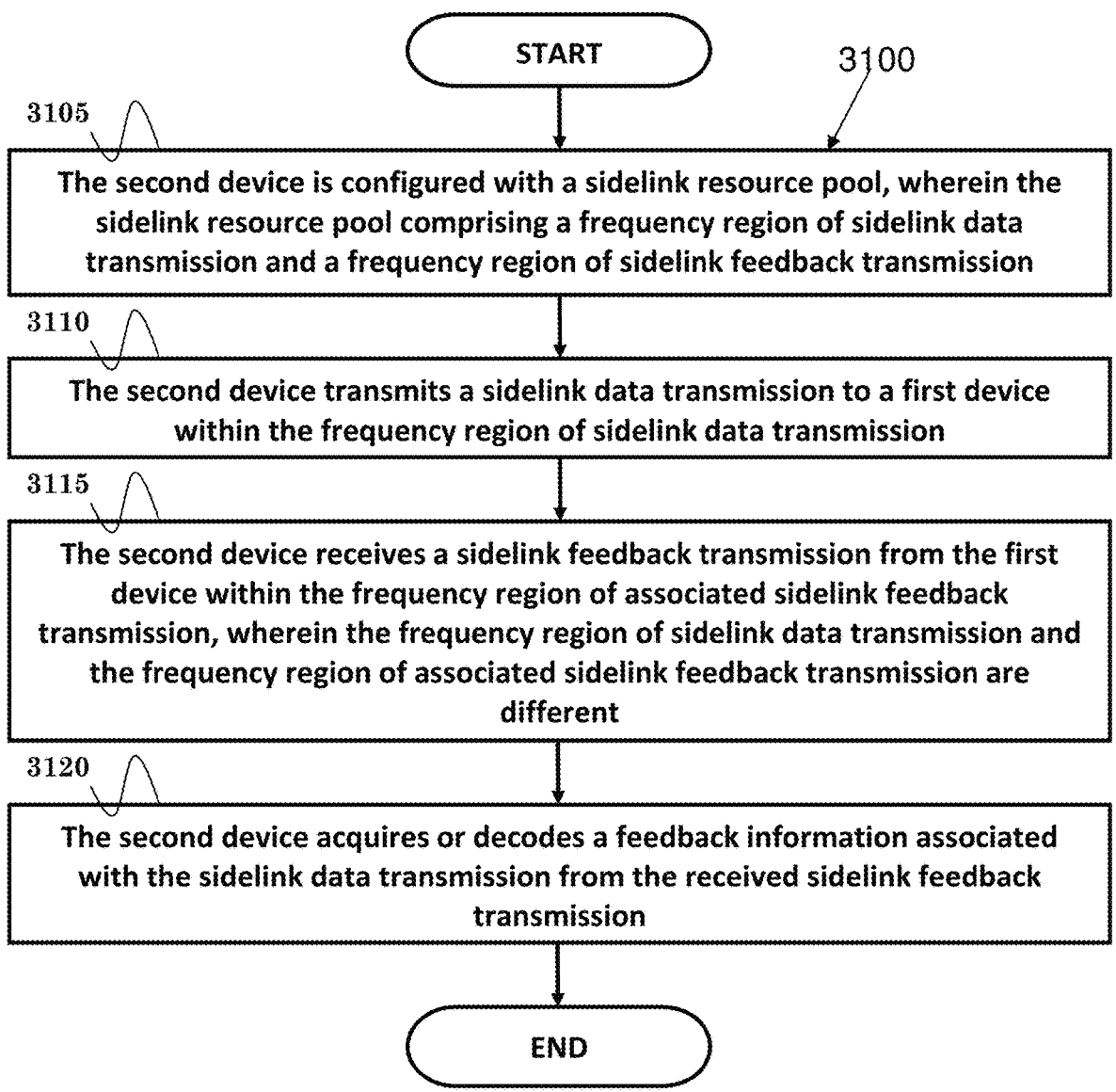
FIG. 31 is a flow chart according to one exemplary embodiment.

FIG. 31 is a flow chart 3100 according to one exemplary embodiment from the perspective of a second device to perform sidelink transmission. In step 3105, the second device is configured with a sidelink resource pool, wherein the sidelink resource pool comprising a frequency region of sidelink data transmission and a frequency region of sidelink feedback transmission. In step 3110, the second device transmits a sidelink data transmission to a first device within the frequency region of sidelink data transmission. In step 3115, the second device receives a sidelink feedback transmission from the first device within the frequency region of associated sidelink feedback transmission, wherein the frequency region of sidelink data transmission and the frequency region of associated sidelink feedback transmission are different. In step 3120, the second device acquires or decodes a feedback information associated with the sidelink data transmission from the received sidelink feedback transmission.

Referring back to FIGS. 3 and 4, in one exemplary embodiment of a second device, the second device 300 includes a program code 312 stored in the memory 310, and the second device is configured with a sidelink resource pool, wherein the sidelink resource pool comprising a frequency region of sidelink data transmission and a frequency region of sidelink feedback transmission. The CPU 308 could execute program code 312 to enable the base station (i) to transmit a sidelink data transmission to a first device within the frequency region of sidelink data transmission, (ii) to receive a sidelink feedback transmission from the first device within the frequency region of associated sidelink feedback transmission, wherein the frequency region of sidelink data transmission and the frequency region of associated sidelink feedback transmission are different, and (iii) to acquire or decode a feedback information associated with the sidelink data transmission from the received sidelink feedback transmission. Furthermore, the CPU 308 can execute the program code 312 to perform all of the above-described actions and steps or others described herein.

In the context of the embodiments illustrated in FIGS. 30-31 and described in the text above, in one embodiment, the frequency region of sidelink data transmission may comprise full sub-channels or PRBs of the sidelink resource pool. The frequency region of sidelink feedback transmission may comprise a part of sub-channels or PRBs of the sidelink resource pool.

In one embodiment, within the symbol(s) of the sidelink feedback transmission, the other part, not comprised by the frequency region of sidelink feedback transmission, of sub-channels or PRBs of the sidelink resource pool can be utilized for sidelink data transmission. There may be a time gap between the frequency region of sidelink data transmission and the frequency region of associated sidelink feedback transmission. The frequency region of the sidelink feedback transmission may be in units of PRBs or in units of sub-channels, and/or the frequency region of the sidelink data transmission may be in units of PRBs or in unit of sub-channels.

In one embodiment, a sub-channel size for sidelink data transmission may be different from a sub-channel size for sidelink feedback transmission. Each sub-channel of the frequency region of the sidelink data transmission, noted as data sub-channel, may comprise a first number of PRBs, and each sub-channel of the frequency region of the sidelink feedback transmission, noted as feedback sub-channel, may comprise a second number of PRBs. The second number may be smaller than the first number.

In one embodiment, each data sub-channel could be associated with a feedback sub-channel. A data sub-channel and an associated feedback sub-channel may be within the same sub-channel index respectively. The resource unit for sidelink data transmission (such as sub-channel) could be different from resource unit for sidelink feedback transmission (such as PRB).

In one embodiment, the frequency region of the sidelink feedback transmission may be in units of PRBs or in units of REs, and/or the frequency region of the sidelink data transmission may be in units of PRBs or in units of sub-channels. Each sub-channel of the frequency region of the sidelink data transmission may be associated with a specific number of PRB for sidelink feedback transmission. One sub-channel of the sidelink data transmission is associated with one PRB for sidelink feedback transmission.

In one embodiment, when the first device receives the sidelink data transmission comprising a set of sub-channels, the first device could perform the sidelink feedback transmission within a set of associated PRBs. The first device could perform the sidelink feedback transmission on all or part of PRBs of the set of associated PRBs.

In one embodiment, when the second device transmits the sidelink data transmission comprising a set of sub-channels, the second device could receive the sidelink feedback transmission within a set of associated PRBs for acquiring feedback information.

In one embodiment, the frequency region of sidelink feedback transmission can be hopped in different TTIs. The frequency region size of sidelink feedback transmission in one TTI could be the same as the frequency region size of sidelink feedback transmission in another TTI. The frequency region location of sidelink feedback transmission in one TTI may be different from the frequency region location of sidelink feedback transmission in another TTI. There may be only one frequency region of sidelink data transmission in one TTI within one sidelink resource pool.

In one embodiment, within a TTI, there may be one frequency region of sidelink feedback transmission within one sidelink resource pool. Within a TTI, there may be multiple frequency regions of sidelink feedback transmission within one sidelink resource pool. The multiple frequency regions of sidelink feedback transmission may be non-overlapped with each other in frequency domain. The multiple frequency regions of sidelink feedback transmission may be with the same frequency region size in frequency domain. The multiple frequency regions of sidelink feedback transmission may be associated with frequency region of associated sidelink data transmission in multiple TTIs. A frequency region of associated sidelink feedback transmission could be associated with frequency region of associated sidelink feedback transmission in one TTI.

In one embodiment, within a TTI, there may be no frequency region of sidelink feedback transmission.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a first device to perform sidelink transmission, comprising:
   the first device is configured with a sidelink resource pool comprising a frequency region of sidelink data transmission and multiple frequency regions of sidelink feedback transmission, wherein the multiple frequency regions of sidelink feedback transmission in one TTI (Transmission Time Interval) are separately associated with the one frequency region of sidelink data transmission in multiple TTIs, and wherein the multiple frequency regions of sidelink feedback transmission in the one TTI are non-overlapped with each other in frequency domain and fully overlapped in time domain;
   the first device receives a first sidelink data transmission from a second device within the frequency region of sidelink data transmission in a first TTI;
   the first device generates a first feedback information associated with the first sidelink data transmission;
   the first device determines or derives a first sidelink feedback resource within one frequency region of sidelink feedback transmission among the multiple frequency regions of sidelink feedback transmission, wherein the one frequency region of sidelink feedback transmission is determined or derived based on association with the first TTI; and
   the first device performs a first sidelink feedback transmission for delivering the first feedback information to the second device on the first sidelink feedback resource.

2. The method of claim 1, wherein any two of the multiple frequency regions of sidelink feedback transmission in the one TTI are associated with sidelink data transmission in different TTIs.

3. The method of claim 1, wherein the multiple frequency regions of sidelink feedback transmission are present in part of TTIs of the sidelink resource pool, and for each one of the multiple frequency regions of sidelink feedback transmission, frequency size and frequency location in each TTI among the part of TTIs of the sidelink resource pool is the same.

4. The method of claim 1, wherein the frequency region of sidelink data transmission comprises full PRBs (Physical Resource Blocks) of the sidelink resource pool, and the frequency region of the sidelink data transmission is scheduled or arranged in unit of PRB or in units of sub-channels, wherein each sub-channel comprises multiple PRBs in a frequency domain, and
   wherein each of the multiple frequency regions of sidelink feedback transmission comprises a part of PRBs of the sidelink resource pool, and each of the frequency regions of the sidelink feedback transmission is scheduled or arranged in unit of PRB.

5. The method of claim 1, wherein a resource unit for the first sidelink data transmission is a sub-channel, and a resource unit for the first sidelink feedback transmission is PRB, and each sub-channel of the frequency region of the sidelink data transmission in the first TTI is associated with a specific number of PRB(s) for candidate or available sidelink feedback transmission, wherein the specific number of PRB(s) are within the associated one frequency region among the multiple frequency regions of sidelink feedback transmission.

6. The method of claim 5, wherein the first device receives the first sidelink data transmission comprising a first set of sub-channels, and the first sidelink feedback resource is on one or part of PRB(s) within a first set of associated PRBs, wherein the first set of associated PRBs comprises the specific number of PRB(s) associated to the first set of sub-channels.

7. The method of claim 1, further comprising:
   the first device receives a second sidelink data transmission from a third device within the frequency region of sidelink data transmission in the first TTI, wherein the second sidelink data transmission is non-overlapped with the first sidelink data transmission in frequency domain;
   the first device determines or derives a second sidelink feedback resource within the one frequency region of sidelink feedback transmission; and
   the first device performs a second sidelink feedback transmission for delivering the second feedback information to the third device on the second sidelink feedback resource.

8. The method of claim 7, wherein a resource unit for the second sidelink data transmission is a sub-channel, and a resource unit for the second sidelink feedback transmission is PRB, and each sub-channel of the frequency region of the sidelink data transmission in the first TTI is associated with a specific number of PRB(s) for candidate or available sidelink feedback transmission, wherein the specific number of PRB(s) are within the associated one frequency region among the multiple frequency regions of sidelink feedback transmission.

9. The method of claim 8, wherein the first device receives the second sidelink data transmission comprising a second set of sub-channels, and the second sidelink feedback resource is on one or part of PRB(s) within a second set of associated PRBs, wherein the second set of associated PRBs comprises the specific number of PRB(s) associated to the second set of sub-channels.

10. A method of a first device to perform sidelink transmission, comprising:
    the first device is configured with a sidelink resource pool comprising a frequency region of sidelink data transmission and at least a first frequency region of sidelink feedback transmission and a second frequency region of sidelink feedback transmission, wherein the first frequency region of sidelink feedback transmission and the second frequency region of sidelink feedback transmission are separately associated with the frequency region of sidelink data transmission in different TTIs (Transmission Time Intervals), and wherein the first frequency region of sidelink feedback transmission and the second frequency region of sidelink feedback transmission in one TTI are non-overlapped with each other in frequency domain and fully overlapped in time domain;
    the first device receives a first sidelink data transmission within the frequency region of sidelink data transmission in a first TTI;
    the first device generates a first feedback information associated with the first sidelink data transmission;
    the first device determines or derives a first sidelink feedback resource within the first frequency region of sidelink feedback transmission, wherein the first frequency region of sidelink feedback transmission is determined or derived based on the association with the first TTI;
the first device performs a first sidelink feedback transmission for delivering the first feedback information on the first sidelink feedback resource;
the first device receives a second sidelink data transmission within the frequency region of sidelink data transmission in a second TTI;
the first device generates a second feedback information associated with the second sidelink data transmission;
the first device determines or derives a second sidelink feedback resource within the second frequency region of sidelink feedback transmission, wherein the second frequency region of sidelink feedback transmission is determined or derived based on the association with the second TTI; and
the first device performs a second sidelink feedback transmission for delivering the second feedback information on the second sidelink feedback resource.

11. The method of claim 10, wherein the first frequency region of sidelink feedback transmission is associated with the frequency region of sidelink data transmission in a first set of TTIs, and the first TTI is within the first set of TTIs, and
wherein the second frequency region of sidelink feedback transmission is associated with the frequency region of sidelink data transmission in a second set of TTIs, and the second TTI is within the second set of TTIs, and
the first set of TTIs and the second set of TTIs are non-overlapped in time domain, wherein the sidelink resource pool comprises at least the first set of TTIs and the second set of TTIs.

12. The method of claim 10, wherein the first frequency region of sidelink feedback transmission and the second frequency region of sidelink feedback transmission are present in part of TTIs of the sidelink resource pool, and frequency size and frequency location of the first frequency region of sidelink feedback transmission in each TTI among the part of TTIs of the sidelink resource pool is the same and frequency size and frequency location of the second frequency region of sidelink feedback transmission in each TTI among the part of TTIs of the sidelink resource pool is the same.

13. The method of claim 10, wherein the frequency region of sidelink data transmission comprises full PRBs (Physical Resource Blocks) of the sidelink resource pool, and the frequency region of the sidelink data transmission is scheduled or arranged in units of PRBs or in unit of sub-channel, wherein each sub-channel comprises multiple PRBs in frequency domain.

14. The method of claim 10, wherein the first frequency region of sidelink feedback transmission comprises a first part of PRBs of the sidelink resource pool, and the first frequency region of the sidelink feedback transmission is scheduled or arranged in units of PRBs, and
wherein the second frequency region of sidelink feedback transmission comprises a second part of PRBs of the sidelink resource pool, and the second frequency region of the sidelink feedback transmission is scheduled or arranged in units of PRBs.

15. The method of claim 10, wherein a resource unit for the sidelink data transmission is a sub-channel, and
wherein a resource unit for the first sidelink feedback transmission is PRB, and each sub-channel of the frequency region of the sidelink data transmission in the first TTI is associated with a specific number of PRB(s) for candidate or available sidelink feedback transmission, wherein the specific number of PRB(s) are within the first frequency region, and
wherein a resource unit for the second sidelink feedback transmission is PRB, and each sub-channel of the frequency region of the sidelink data transmission in the second TTI is associated with a specific number of PRB(s) for candidate or available sidelink feedback transmission, wherein the specific number of PRB(s) are within the second frequency region.

16. The method of claim 15, wherein when the first device receives the first sidelink data transmission comprising a first set of sub-channels, the first sidelink feedback resource is on one or part of PRB(s) within a first set of associated PRBs, wherein the first set of associated PRBs comprises the specific number of PRB(s) associated to the first set of sub-channels, and
wherein when the first device receives the second sidelink data transmission comprising a second set of sub-channels, the second sidelink feedback resource is on one or part of PRB(s) within a second set of associated PRBs, wherein the second set of associated PRBs comprises the specific number of PRB(s) associated to the second set of sub-channels.

17. The method of claim 10, wherein when the first sidelink feedback transmission and the second sidelink feedback transmission are transmitted to the same second device, and when the first sidelink feedback resource and the second sidelink feedback resource are in the same TTI, the first device performs the first sidelink feedback transmission for delivering the first feedback information on the first sidelink feedback resource and performs the second sidelink feedback transmission for delivering the second feedback on the second sidelink feedback resource.

18. A method of a first device to perform sidelink transmission, comprising:
the first device is configured with a sidelink resource pool comprising a frequency region of sidelink data transmission and a frequency region of sidelink feedback transmission, wherein size of the frequency region of sidelink data transmission and size of the frequency region of sidelink feedback transmission are different;
the first device receives a sidelink data transmission from a second device within the frequency region of sidelink data transmission;
the first device generates a feedback information associated with the sidelink data transmission;
the first device determines or derives a sidelink feedback resource, wherein the sidelink feedback resource is restricted within the frequency region of associated sidelink feedback transmission; and
the first device performs a sidelink feedback transmission for delivering the feedback information to the second device on the sidelink feedback resource.

19. The method of claim 18, wherein within the symbol(s) of the sidelink feedback transmission, the other frequency part, not comprised by the frequency region of sidelink feedback transmission, of the sidelink resource pool is utilized for other sidelink transmission, instead of the sidelink feedback transmission.

20. The method of claim 18, wherein the frequency region of sidelink data transmission comprises full PRBs (Physical Resource Blocks) of the sidelink resource pool, and the frequency region of the sidelink data transmission is scheduled or arranged in units of PRBs or in units of sub-channels, wherein each sub-channel comprises multiple PRBs in frequency domain, and wherein the frequency region of sidelink feedback transmission comprises a part of PRBs of the sidelink resource pool, and the frequency regions of the sidelink feedback transmission is scheduled or arranged in units of PRBs.

21. The method of claim 18, wherein a resource unit for the sidelink data transmission is a sub-channel, and a resource unit for the sidelink feedback transmission is a PRB, and each sub-channel of the frequency region of the sidelink data transmission is associated with a specific number of PRB(s) for candidate or available sidelink feedback transmission, wherein the specific number of PRB(s) are within the frequency region of sidelink feedback transmission.

22. The method of claim 18, wherein when the first device receives the sidelink data transmission comprising a set of sub-channels, the sidelink feedback resource is on one or part of PRB(s) within a set of associated PRBs, wherein the set of associated PRBs comprises the specific number of PRB(s) associated to the set of sub-channels.

23. The method of claim 18, wherein there is one frequency region of sidelink feedback transmission within the sidelink resource pool, and the frequency region of sidelink feedback transmission is present in all or part of TTIs (Transmission Time Intervals) of the sidelink resource pool.

* * * * *